US009285040B2

(12) United States Patent
Forrest et al.

(10) Patent No.: US 9,285,040 B2
(45) Date of Patent: Mar. 15, 2016

(54) HIGH PRESSURE FLUID SYSTEM

(71) Applicant: PSI Pressure Systems Corp., Baytown, TX (US)

(72) Inventors: Jamie A. Forrest, Commerce Township, MI (US); Todd A. Shawver, Battle Creek, MI (US)

(73) Assignee: PSI Pressure Systems Corp., Baytown, TX (US)

( * ) Notice: Subject to any disclaimer, the term of this patent is extended or adjusted under 35 U.S.C. 154(b) by 0 days.

(21) Appl. No.: 14/509,578

(22) Filed: Oct. 8, 2014

(65) Prior Publication Data

US 2015/0101679 A1 Apr. 16, 2015

Related U.S. Application Data

(60) Provisional application No. 61/889,199, filed on Oct. 10, 2013.

(51) Int. Cl.
*F16K 5/22* (2006.01)
*F16K 27/00* (2006.01)
*F16K 43/00* (2006.01)
*B24C 7/00* (2006.01)
*B05B 9/04* (2006.01)
*F04B 53/16* (2006.01)
(Continued)

(52) U.S. Cl.
CPC ............... *F16K 5/22* (2013.01); *B05B 9/0413* (2013.01); *B24C 7/0015* (2013.01); *F04B 53/16* (2013.01); *F04B 53/164* (2013.01); *F04B 53/18* (2013.01); *F04B 53/22* (2013.01); *F16K 27/003* (2013.01); *F16K 43/00* (2013.01); *Y10T 137/4238* (2015.04); *Y10T 137/6011* (2015.04); *Y10T 137/877* (2015.04)

(58) Field of Classification Search
CPC ......... F16K 5/22; F16K 27/003; F16K 5/222; F04B 53/16; F04B 53/18; F04B 53/22
USPC .................................................. 137/237, 240
See application file for complete search history.

(56) References Cited

U.S. PATENT DOCUMENTS 1,831,572 A 11/1931 MacArthur
3,019,739 A 2/1962 Prosser
(Continued)

FOREIGN PATENT DOCUMENTS

CA 1134244 10/1982
WO 2014062768 4/2014

*Primary Examiner* — Kevin Lee
(74) *Attorney, Agent, or Firm* — Warner Norcross & Judd LLP

(57) ABSTRACT

A high pressure fluid system including enhanced safety, maintenance and servicing features. The system can include a CAM assembly module, having a valve seat assembly, seal cartridge assembly and inlet manifold, that is easily installed in and removed from a frame and/discharge manifold as a single unit. A discharge manifold can isolate different pressure rated passageways of the system, and multiple rupture discs associated with the same. A discharge manifold end plate can be included to provide ease of repair of discharge outlets and to establish a plumbing system for the rupture discs. A quick coupler can facilitate connection between a plunger of the seal cartridge assembly and a cross head stub connected to a power frame. A lubrication valve assembly can provide and meter lubrication from a high pressure inlet source to a plunger and packing of the seal cartridge assembly.

20 Claims, 23 Drawing Sheets

(51) Int. Cl.
*F04B 53/22* (2006.01)
*F04B 53/18* (2006.01)

(56) References Cited

U.S. PATENT DOCUMENTS

| | | | |
|---|---|---|---|
| 3,049,082 A | 8/1962 | Barry | |
| 3,785,659 A | 1/1974 | Maurer et al. | |
| 3,811,801 A * | 5/1974 | Buse | F04B 1/00 |
| | | | 417/454 |
| 3,870,439 A | 3/1975 | Stachowiak et al. | |
| 4,229,011 A | 10/1980 | Wikelski et al. | |
| 4,388,050 A | 6/1983 | Schuller | |
| 4,432,386 A | 2/1984 | Pacht | |
| 4,500,267 A | 2/1985 | Birdwell | |
| 4,551,077 A | 11/1985 | Pacht | |
| 4,618,316 A | 10/1986 | Elliott | |
| 4,758,135 A | 7/1988 | Woodward et al. | |
| 4,818,192 A | 4/1989 | Korthaus | |
| 4,858,828 A | 8/1989 | Stachowiak | |
| 4,878,815 A | 11/1989 | Stachowiak | |
| 5,024,382 A | 6/1991 | Shook et al. | |
| 5,086,974 A | 2/1992 | Henshaw | |
| 5,127,807 A | 7/1992 | Eslinger | |
| 5,135,238 A | 8/1992 | Wells et al. | |
| 5,171,136 A | 12/1992 | Pacht | |
| 5,207,201 A | 5/1993 | Schlagmuller et al. | |
| 5,217,163 A | 6/1993 | Henshaw | |
| 5,302,087 A | 4/1994 | Pacht | |
| 5,322,418 A | 6/1994 | Comer | |
| 5,382,057 A | 1/1995 | Richter | |
| 5,636,789 A | 6/1997 | Shook | |
| 5,636,975 A | 6/1997 | Tiffany et al. | |
| 5,904,297 A | 5/1999 | Kendrick, Jr. et al. | |
| 5,924,853 A | 7/1999 | Pacht | |
| 5,943,939 A * | 8/1999 | Orihara | F15B 15/223 |
| | | | 91/407 |
| 6,081,960 A | 7/2000 | Shook et al. | |
| 6,149,814 A * | 11/2000 | Allington | B01D 11/0203 |
| | | | 210/634 |
| 6,171,070 B1 | 1/2001 | Mitake | |
| 6,189,177 B1 | 2/2001 | Shook et al. | |
| 6,413,323 B2 | 7/2002 | Shook et al. | |
| 6,422,836 B1 | 7/2002 | Krueger et al. | |
| 6,425,715 B1 | 7/2002 | Sasanecki | |
| 6,431,214 B1 | 8/2002 | Herhold et al. | |
| 6,499,510 B2 | 12/2002 | Herhold et al. | |
| 6,517,330 B2 | 2/2003 | Hironaka et al. | |
| 6,544,012 B1 | 4/2003 | Blume | |
| 6,554,523 B2 | 4/2003 | Aday et al. | |
| 6,880,767 B2 | 4/2005 | Herhold | |
| 6,886,832 B2 | 5/2005 | Forrest | |
| 6,889,914 B2 | 5/2005 | Herhold | |
| 7,121,812 B2 | 10/2006 | Forrest | |
| 7,182,016 B2 | 2/2007 | Forrest | |
| 7,270,749 B1 | 9/2007 | Wall | |
| 7,335,002 B2 | 2/2008 | Vicars | |
| 7,600,700 B2 | 10/2009 | Trunick et al. | |
| 7,621,728 B2 | 11/2009 | Miller | |
| 8,221,100 B2 | 7/2012 | Forrest et al. | |
| 8,251,301 B2 | 8/2012 | Trunick et al. | |
| 8,298,349 B2 | 10/2012 | Wojciechowski, III et al. | |
| 8,465,268 B2 | 6/2013 | Baxter et al. | |
| 2002/0079383 A1 | 6/2002 | Forrest | |
| 2002/0112769 A1 | 8/2002 | Herhold et al. | |
| 2004/0161351 A1 | 8/2004 | Forrest | |
| 2004/0178285 A1 | 9/2004 | Forrest | |
| 2006/0289037 A1 | 12/2006 | Shook | |
| 2008/0054095 A1 | 3/2008 | Trunick et al. | |
| 2010/0140526 A1 | 6/2010 | Forrest et al. | |
| 2011/0189040 A1 | 8/2011 | Vicars | |
| 2013/0068092 A1 | 3/2013 | Marette | |

* cited by examiner

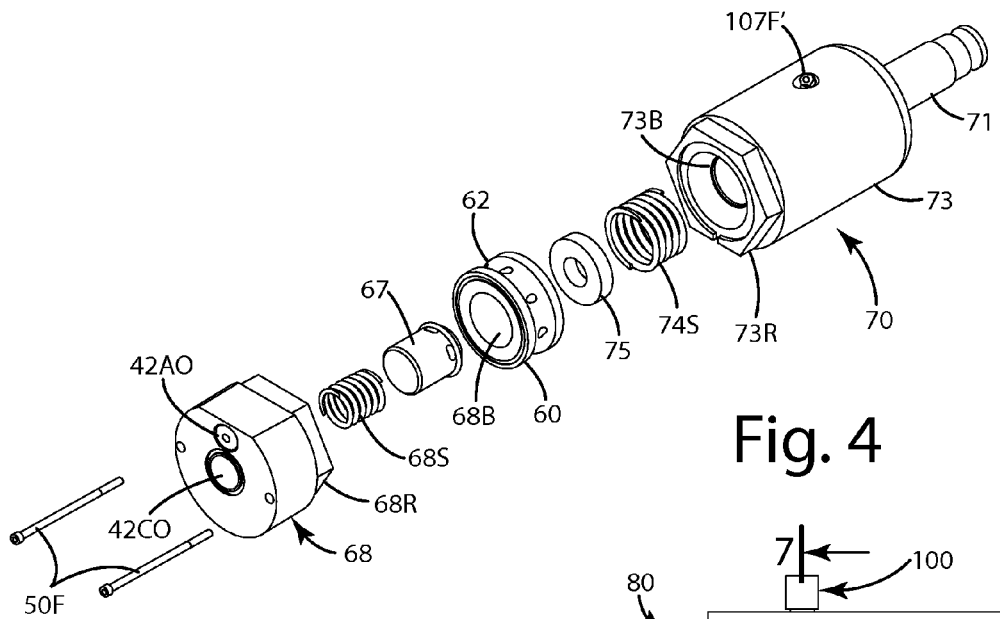
Fig. 4
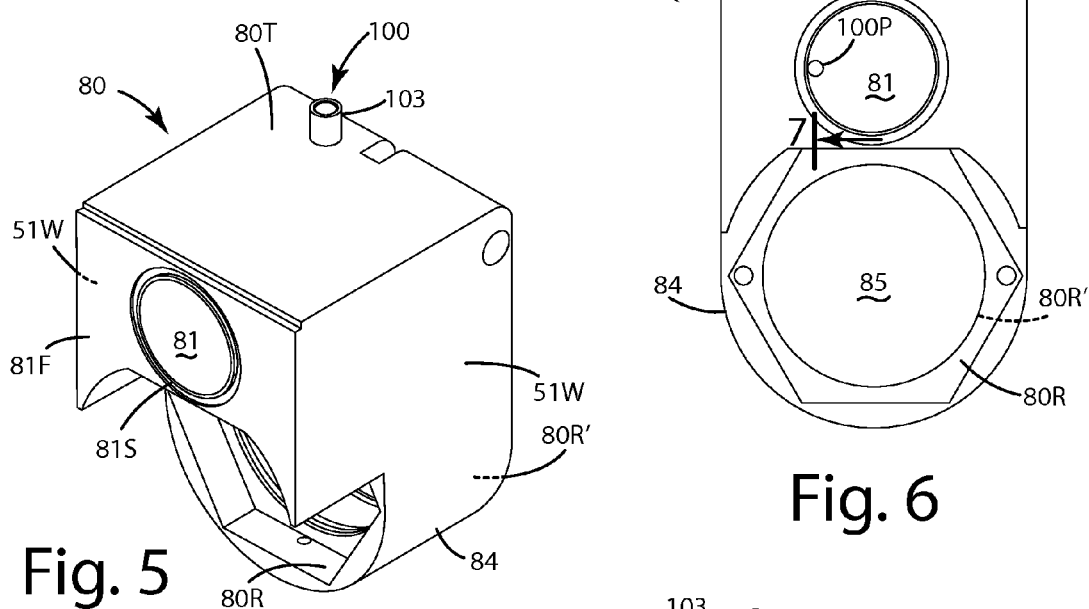
Fig. 5
Fig. 6
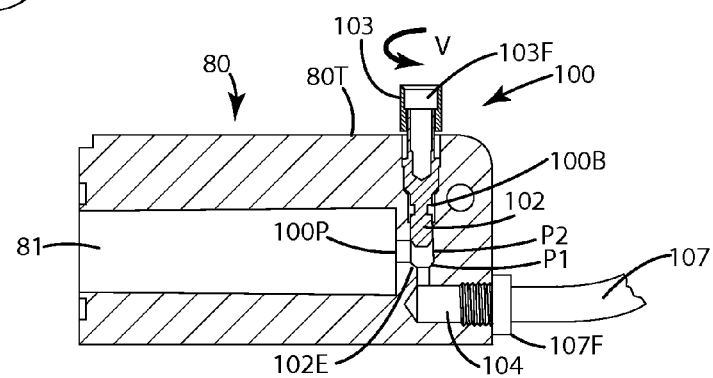
Fig. 7

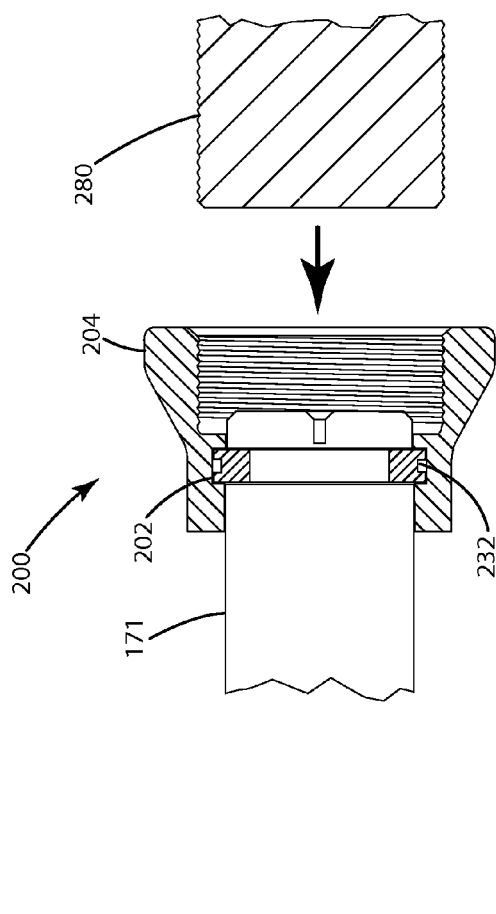
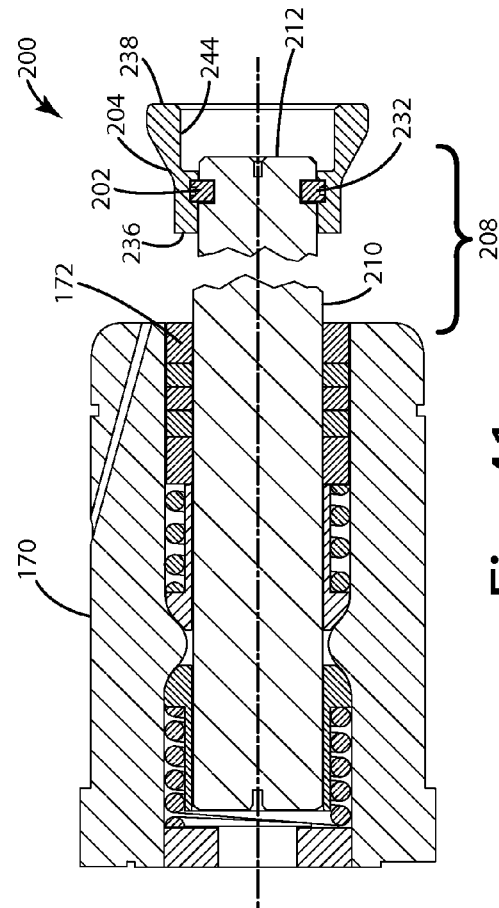
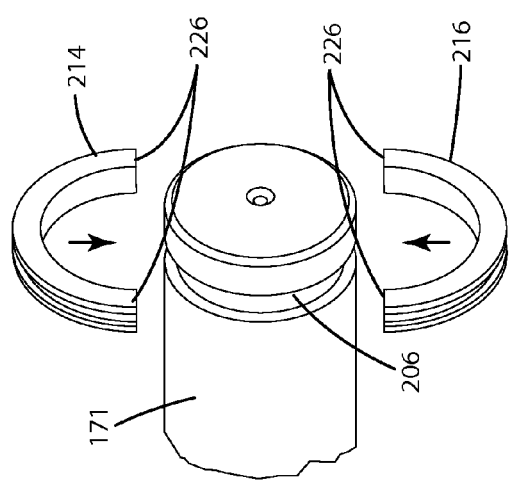

HIGH PRESSURE FLUID SYSTEM

BACKGROUND OF THE INVENTION

The present invention relates to a high pressure fluid system and more particularly to advancements in the safety, maintenance and servicing of the same.

High pressure fluid jetting systems are used in a variety of fluid jetting operations, such as cleaning, pipe clearing, cutting, removal of debris and coating, to name a few. Most such systems include a fluid end assembly, a drive assembly, a pressurized liquid supply and water blasting equipment, such as a spray gun. The drive assembly usually is in the form of an engine or motor coupled to a drive shaft that drives multiple plungers in a reciprocating manner within a fluid cylinder end. The multiple plungers force fluid, such as water, out of the spray gun at extremely high pressure. As the plungers reciprocate, the fluid cylinder assembly and its components cycle at an extremely high rate and fluctuate between atmospheric and maximum system pressure.

Because of the operation between high and low pressures, and the high rate of operation components of the fluid end assembly undergo extreme stress and wear. Typically, the high wear components of such an assembly or system are mounted deep within a fluid cylinder end, and are hard to access. This makes replacement and general service of these high wear components difficult and time consuming. Some service jobs take several hours to a full day, which means that the system is out of commission for extended durations. This can be very costly, particularly where the system is being used to clean a plant or facility that is off-line while the cleaning takes place.

To understand the difficulty of servicing conventional fluid end assemblies, one may look to their complexity. Most fluid end assemblies include a manifold that bolts to a frame with multiple bolts that extend through the entire assembly. To access and service the high wear components, such as a valve seat assembly and seal cartridge (or stuffing box) within the assembly, the multiple bolts (twelve or more) must be removed, so the manifold can be detached from the frame. The manifold itself weighs several hundred pounds, so its handling can be difficult alone. After the manifold is removed—which can be a several hour chore—the primary internal components can be accessed and serviced or replaced. After that is done, the unwieldy manifold then must be re-mounted to the frame, with the multiple bolts carefully tightened to a precise torque to ensure the assembly does not leak or fail. Thus, the servicing of conventional fluid end assemblies is extremely time consuming and difficult.

As mentioned above, the removable manifolds of fluid end assemblies are large and unwieldy. They also can present several other issues. For example, manifolds usually include a single discharge port which feeds to the water blasting equipment, such as a spray gun. The discharge port usually dictates the output of the manifold, and thus the fluid end assembly. With only one discharge port per manifold, customization is limited, and can require replacement of the entire manifold to provide variability. Further, the discharge port and end of the hose, to which the water blasting equipment is attached, are both threaded. Sometimes, the threads can become stripped or damaged due to careless handling or galling, in which case the entire manifold may need to be replaced or the port rethreaded. This can be extremely costly and time consuming.

Most fluid end assemblies include a rupture disc mounted in the manifold to provide protection against excessive pressure build-up in the water blasting equipment attached to the system. The rupture disc is carefully selected to match the output of the system and avoid a dangerous condition. For example, where a fluid end assembly is designed to output 10,000 psi (about 40 gpm), a 10,000 psi rupture disc matching that output should be installed to prevent over-pressurization of the system. If, instead, a rupture disc designed for a 40,000 psi (about 10 gpm) is erroneously used, the system could be over-pressurized and could fail, which could lead to great bodily injury to an operator of the blasting equipment or worse. During field service of the rupture disc, operator error in selecting the wrong rupture disc is frequently increased due to time, pressure and a sensory overloading environment.

Almost all modern fluid end assemblies include a collet connection between the plungers of the fluid end assembly and a cross-head stub in a power frame. The collet includes a collar and a forcing cone. The collar is tightened and untightened with a wrench to ensure the connection is secure between the elements. While this is a workable connection, it is time consuming and requires the use of an extra hand tool to service the connection.

As mentioned above, conventional fluid end assemblies operate at high rates, pressures and cycle times. Thus, the assemblies typically include lubricating or cooling plumbing to cool/lubricate the components. As an example, a plunger is lubricated with water via an intricate system of external hoses and valves coupled to a separate system designated to circulate liquid to the seal cartridge assembly, and in particular, the packing and the plunger. During service of the fluid end assembly, the external plumbing hoses and valves usually are disconnected and removed before access to the high wear components, such as the packing and plunger, can be achieved. This extra step involving the plumbing then is reversed upon re-assembly of the fluid end assembly. The uncoupling and re-coupling of these components is time consuming and can lead to system failure if improperly executed.

While conventional fluid end assemblies offer some level of serviceability and safety, some can fall short, and can present complex operation and servicing issues.

SUMMARY OF THE INVENTION

In one embodiment, a high pressure fluid end assembly or system is provided including at least one Cartridge Assembly Module (CAM), including a valve seat assembly and a seal cartridge, the CAM being selectively removable from a fluid end frame without removal of a discharge manifold associated with the frame.

In another embodiment, the CAM includes a CAM frame that captures the valve assembly and seal cartridge or equivalent components. The fluid end frame defines a loading opening, optionally atop the fluid end frame, and a retainer opening, optionally defined by a rear of the fluid end frame. The CAM frame and its components can be installed through the loading opening, tilted, partially positioned through the retainer opening, and tilted again to achieve a desired orientation relative to a discharge manifold and the frame opening in general.

In still another embodiment, at least a portion of a seal cartridge and/or an associated plunger extends through the retainer opening, and can be accessible in the open environment external to the fluid end frame. A retainer element can be included to positively hold, secure and/or clamp the CAM frame within the fluid end frame. The retainer element can be in the form of a nut threaded into the retainer opening.

In even another embodiment, the CAM can include a handle, optionally projecting from an upper portion of the CAM. The handle can offer an ergonomic element to lift and/or manually manipulate the CAM during installation, removal and transport. The handle can be movably joined with the CAM, so that the handle is adjustable from a generally vertical orientation to a generally horizontal orientation, and through a range of orientations therebetween. Optionally, the handle can be pivotally joined with a CAM inlet manifold, which generally enables water to enter into the CAM from the discharge manifold.

In a further embodiment, the handle can be operative to exert a force on the inlet manifold so that the inlet manifold engages and seals against a discharge manifold associated with the fluid end frame, while the CAM is installed in the frame opening. The handle can have a selectively variable length, so that it can be extended or retracted, optionally by rotating the handle about an axis of rotation. With the CAM installed, when extended, the end of the handle can engage and push against the frame thereby providing a desired contact force between the inlet manifold and discharge manifold.

In still a further embodiment, the fluid end assembly includes a discharge manifold joined with the frame, for example, by fasteners. Optionally, the discharge manifold and frame can be an integral, one piece construction, formed from a continuous piece of material. A discharge manifold end plate can be mounted to the discharge manifold and/or frame. The discharge manifold end plate can include one or more discharge outlets adapted to couple to blasting equipment or other components, so that fluid, such as water, can be conveyed under pressure from the CAM to the discharge manifold and out preselected ones of the discharge outlets. Optionally, the discharge manifold end plate can be removably mounted to the discharge manifold and/or frame so that it can be easily replaced, serviced or otherwise modified without having to remove the entire discharge manifold from the fluid end assembly frame.

In yet a further embodiment, the discharge outlets of the discharge manifold end plate can be sized and configured to accommodate different fluid discharge rates, pressures and flows from the system. For example, one outlet can be sized for flow at 10,000 psi, another at 20,000 psi, and another at 40,000 psi. The discharge manifold end plate can also include an inlet port adapted to allow a source of water to flow into the manifold for pressurization by the CAM.

In even a further embodiment, the one or more discharge outlets are selectively closable by placing plugs within the respective ports. When not in use, certain ports can be plugged so that flow only comes from a preselected one of the ports to operate blasting equipment attached to the discharge manifold.

In still another embodiment, the discharge manifold end plate, or optionally portions of the discharge manifold, can include one or more secondary ports in fluid communication with respective individual ones of the one or more discharge outlets. The secondary ports can accommodate rupture discs specifically calibrated to the discharge outlet with which the port is in communication. For example, where a discharge outlet is rated for 10,000 psi, the rupture disc can be calibrated to rupture when fluid in the discharge outlet exceeds the rated 10,000 psi to save the system from dangerous overpressure. Where the end plate includes a second discharge outlet rated for another flow, for example, one at 20,000 psi, another different rupture disc calibrated for rupture when pressure exceeds 20,000 psi, can be associated with a different secondary port that is in fluid communication with the second discharge outlet.

In yet another embodiment, the fluid end assembly can include a quick coupler configured to join a plunger of a seal cartridge with a cross-head stub, which is coupled to a drive transmission and/or drive unit. The plunger can define a recess or include an annular ring at a plunger end. The coupler can include retainer elements, such as balls or spheres each retained in a detent by a spring loaded sleeve that holds the balls in place. The retainer elements can be retracted by moving the sleeve to allow the retainer elements to withdraw from the recess or ride over the ring on the plunger. After the coupler is placed on the plunger, the sleeve can be released to secure the balls in relation to the ring or recess, thereby locking the coupler on the plunger. An opposite side of the coupler can be joined with the cross-head stub, which is further coupled to the drive assembly.

In still another further embodiment, a quick connect system is provided to couple the drive assembly to the fluid end assembly. The quick connect system can include a plunger extending from the seal cartridge, a retention ring within an annular recess in the plunger, and a retention nut or element extending over the plunger and the retention ring. The retention nut can include a small diameter portion and a large diameter portion. The small diameter portion can include an inner diameter that is less than the outer diameter of the retention ring, and the large diameter portion can include an inner diameter that is slightly larger than the outer diameter of the retention ring. The small and large diameter portions are joined by an annular shoulder that prevents removal of the retention nut during use. The retention ring optionally is formed of first and second ring segments that circumferentiate the plunger and that include an outer annular groove and an o-ring.

In even another embodiment, the fluid end assembly includes a lubrication valve assembly that regulates the flow of liquid lubricating and/or cooling the plunger and packing assembly of the seal cartridge. The lubrication valve can include an adjustment element mounted generally on an upper portion of an inlet manifold of the CAM, optionally to allow the operator to view it and adjust it simultaneously from the same operator position. The lubrication valve adjustment element can be adjusted by an operator to meter the flow from the inlet manifold to the seal cartridge packing assembly and plunger. The seal cartridge, CAM frame and/or retaining element can include a passageway extending to the plunger and/or packing assembly through which the fluid can flow, generally from the inlet manifold, through the lubrication valve.

In yet another further embodiment, the fluid end assembly includes a lubrication system that uses the pumping fluid to lubricate the packing. The lubrication system can include a lubrication flow path extending through the body of the housing and the body of the seal cartridge to the packing. The packing is optionally positioned in an annular cavity between the seal cartridge and the reciprocating plunger. The lubrication system can further include an adjustable valve in the lubrication flow path to control the flow of the pumping fluid to the packing. The valve is optionally positioned atop the housing for easy access by an operator.

In yet another embodiment, the fluid end frame defines one or more loading openings disposed adjacent a discharge manifold. Within the loading openings, the frame includes one or more movable mounting housings. The mounting housing can be disposed movably within the loading openings of the fluid end frame. The movable mounting housing is adapted to tilt and/or rotate about an axis from a closed position to an open position, where it is optionally locked in place.

In still another embodiment, the mounting housing can include a loading chamber. The cartridge assembly module can be selectively placed within and removable from the loading chamber. Optionally, the cartridge assembly module can include a registration feature, such as a male key or projection, adapted to engage a corresponding registration feature, such as a female keyhole or recess, of the loading chamber and/or mounting housing to align and register a discharge valve outlet of the valve seat assembly in a preselected, generally non-rotatable configuration relative to a discharge passageway defined by a discharge manifold proximate the single piece cartridge. Of course, the registration features can be reversed or altered as desired. With this registration, adequate fluid communication can be established between the discharge valve outlet of the valve seat assembly and the other passageway defined by the discharge manifold.

In a further embodiment, the one piece cartridge assembly module is assembled from parts that are uniquely matched with one another depending on identical pressure ratings. As an example, the valve seat assembly and the seal cartridge include specific assembly elements that only enable assembly of parts in a cartridge assembly module where all parts have the same pressure handling capabilities. Different pressure parts cannot be dangerously mixed and matched. The specific assembly elements that provide this safeguard optionally can be fastener or fastener hole patterns that are uniquely matched to specific pressure ratings being included with or defined by the valve seat assembly and seal cartridge. Unless the patterns match, the components cannot be assembled together. This can be an added safety feature that prevents valve seat assemblies and seal cartridges of different/varying pressure capabilities from being intermixed.

The present invention provides a high pressure fluid system including a number of features that enhance the safety, maintenance and servicing of the system. Where the system includes the CAM, that element can be quickly and easily replaced without manipulating multiple fasteners to remove a large, unwieldy discharge manifold. Instead, the CAM is placed within an opening in the system frame and retained primarily by a single retaining element fastened to the CAM at or near a rear of the frame. This construction can greatly reduce the amount of time to service high wear parts of the CAM, and to quickly convert the system among different pressure ranges depending on the application.

Further, in many cases with the CAM, all inlet, discharge, and plunger lubrication connections can be made and secured automatically when the CAM is installed in the frame, without additional external plumbing lines or hoses. Thus, where the CAM is implemented, the system can have fewer components so it can cost less to manufacture, assemble and service. It also can be faster and easier to convert from one pressure operation range to another.

Where the system includes a handle associated with the CAM, that handle can enable an operator to easily maneuver the CAM in a variety of positions quickly and efficiently. The handle also can function as an inlet seal force generator to properly seal the inlet manifold of the CAM and the discharge manifold depending on pressures and temperatures or other operating parameters of the system.

Where the system includes one or more discharge manifold end plates, damaged discharge ports can be easily selected and/or replaced. Further, where the discharge manifold end plates include safety rupture discs, specific discs can be dedicated to each pressure simultaneously and individually. Thus, no matter what pressure fluid is output to the discharge manifold, the correct rupture disc can always be in communication with that pressure. Further, the highest pressure rated passage can be common to all pressure ranges, and can be used for pressure setting or monitoring devices, or other accessories, such as pressure gauges, switches and by-pass or throttling valves. With the end plates, the proper fitting and rupture disc are utilized for each pressure range. This makes the system safer to operate than conventional fluid ends.

Where the system includes a quick connect coupler, the system can provide improved alignment, faster connection and fewer parts over existing couplers. Further, the quick connect coupler can permit alignment of the plunger within the plunger bore prior to attachment of the plunger to the drive assembly. The quick connect coupler can also facilitate the servicing and replacement of the plunger and the packing without the use of power tools.

Where the system includes a lubrication valve assembly, it can provide considerably less pressure drop between the valve and the lubrication points located inside the seal cartridge. Further, there are virtually no exposed tubes or plumbing present within the system or outside the frame to interfere with, or to require removal before service. This can reduce the likelihood of leakage or damage occurring, which might prevent the plungers and packing from receiving proper lubrication. It further can facilitate conversion of the fluid end system compared to existing fluid ends. The valve assembly also can generate a flow range with a maximum and minimum flow to maintain proper lubrication.

Where the system includes a lubrication system that uses the pumping fluid to lubricate the packing, it can provide a measured flow of high pressure fluid to the packing in the annular gap between the seal cartridge and the reciprocating plunger. The absence of external plumbing can minimize the likelihood of leakage or damage. By reclaiming the pumping fluid, the lubrication system avoids costs and complexities associated with a separate supply of lubricant or cooling liquids.

These and other objects, advantages, and features of the invention will be more fully understood and appreciated by reference to the description of the current embodiment and the drawings.

Before the embodiments are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 4 is an exploded view of a seal cartridge assembly, valve seat assembly and manifold seat of the CAM;

FIG. 5 is a front perspective view of an inlet manifold of the CAM;

FIG. 6 is a front view of the inlet manifold of the CAM;

FIG. 7 is a section view of a lubrication valve assembly taken along the line 7-7 of FIG. 6;

FIG. 39 is a partial section view of a quick connect system for use with the embodiments of the fluid end system herein;

FIG. 40 is an exploded view of a two piece ring associated with the quick connect system;

FIG. 41 is a section view of the quick connect retention nut and the quick connect retention ring installed on a plunger of a seal cartridge;

DETAILED DESCRIPTION OF THE CURRENT EMBODIMENTS

I. Overview

Figure 1:
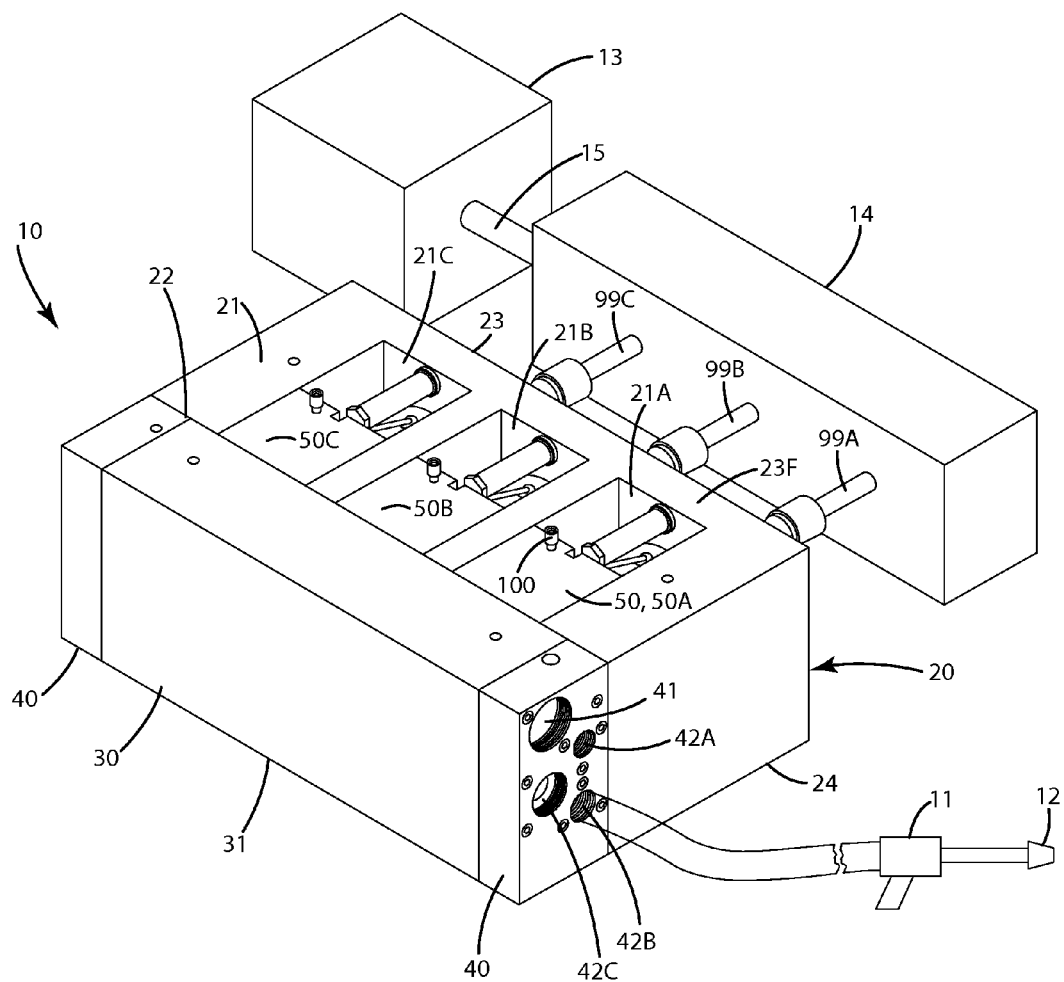
FIG. 1 is a front perspective view of a fluid end system including multiple installed CAMs.

A current embodiment of the high pressure fluid end system, also generally referred to as a fluid end, is shown in FIGS. 1-10 and generally designated 10. The fluid end system 10 can include multiple assemblies and other components. As shown, it includes a frame 20 to which a discharge manifold 30 is joined or monolithically formed therewith. The discharge manifold 30 includes a center manifold portion 31 and one or more discharge manifold end plates 40, mounted at opposite sides of the discharge manifold. The frame 20 can define multiple loading openings 21A-C which are sized and shaped to accommodate respective CAMs 50A-50C, which CAMs are generically referred to with the reference numeral 50. The respective CAMs 50A-50C interfit and are nested and secured within the openings 21A-21C of the frame 20. Generally, the CAMs can be selectively and easily removable and replaceable relative to the frame and openings. This facilitates replacement of the worn internal components of the CAMs, for example the valve seat assembly 60 and the seal cartridge assembly 70, also referred to as a stuffing box, and their respective components. Such components can be high wear components that are replaced or serviced on a routine basis.

In addition to the valve seat assembly 10, seat cartridge assembly 70, and optional manifold seat 68, the CAM 50 can also include an inlet manifold 80 which is secured to the seal cartridge assembly and valve seat assembly in a fixed and non-rotational manner as described further below. The inlet manifold can be outfitted with a lubrication valve assembly 100 which is in fluid communication with an inlet chamber 81 and meters flow of fluid from that inlet chamber to a plunger 71 and packing 72 associated with the seal cartridge assembly 70 to provide lubrication to those components.

Figure 21:
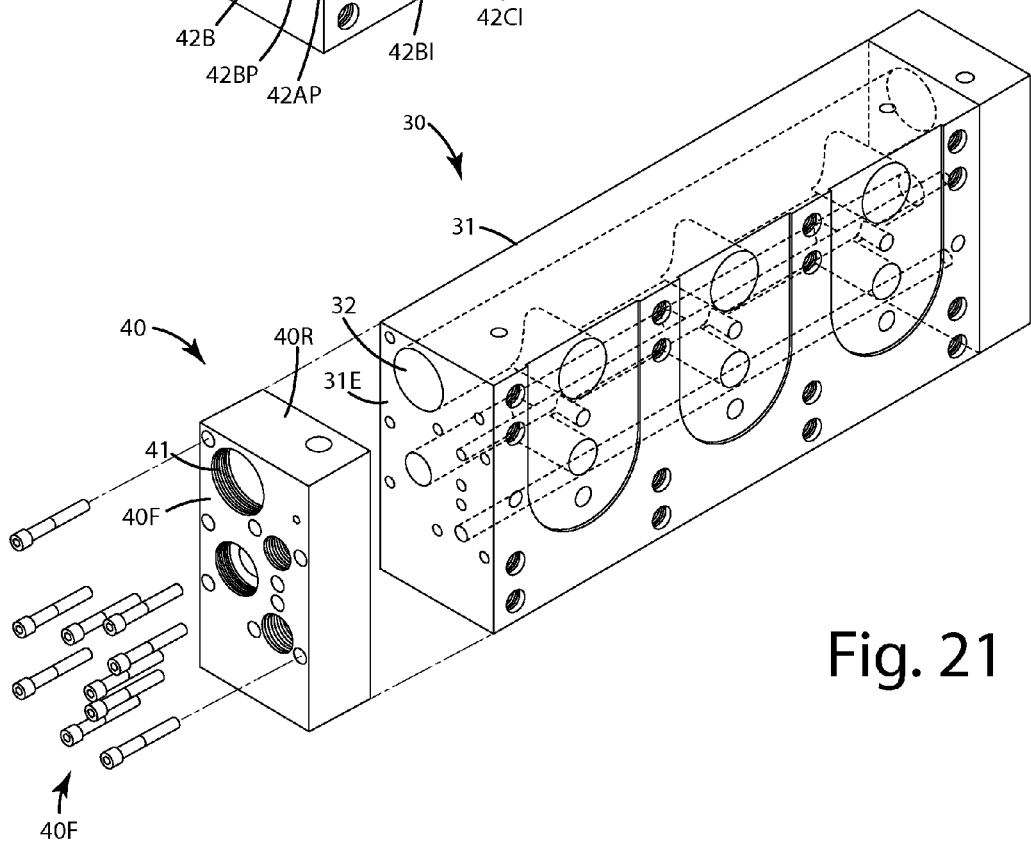
FIG. 21 is a perspective view of the center frame of the discharge manifold with an end plate removed.
Figure 22:
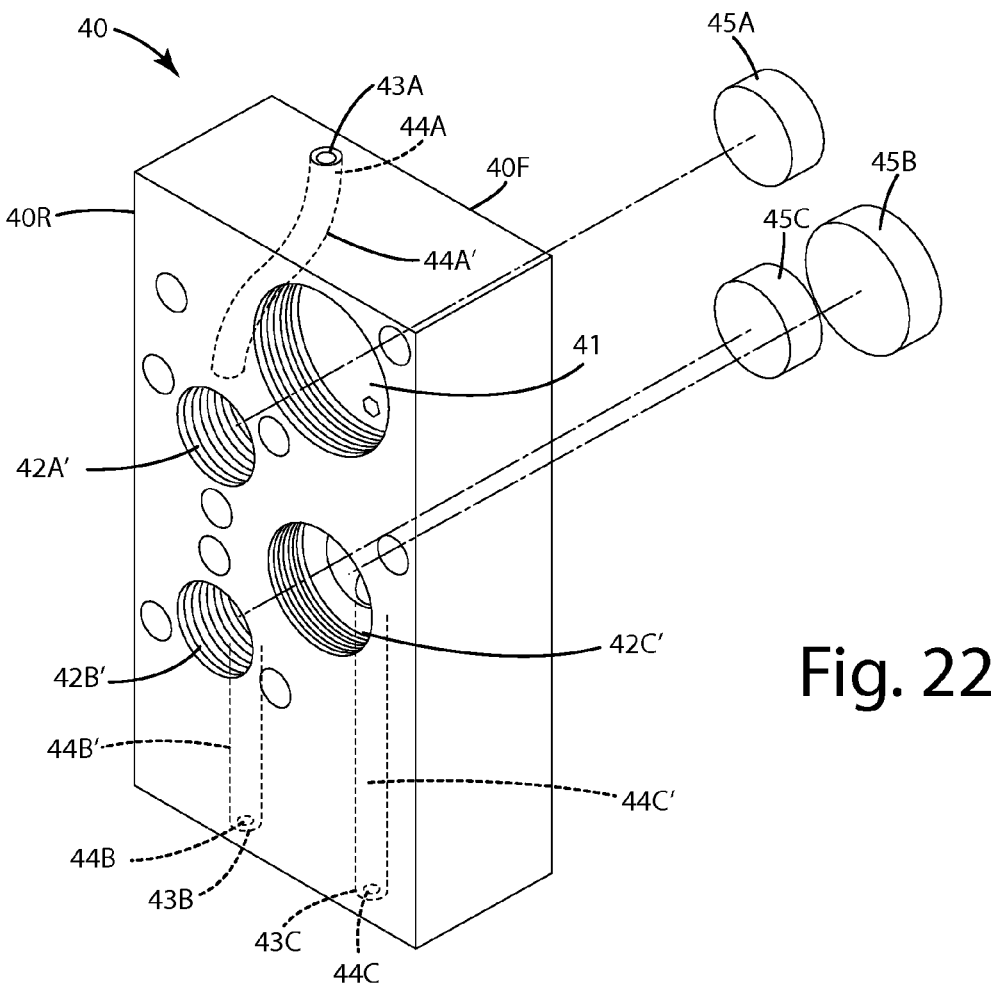
FIG. 22 is a close-up view of the discharge manifold end plate.

Returning to the frame 20 and discharge manifold 30, the manifold can be outfitted with one or more end plates 40. As shown in FIGS. 21-22, each of the end plates can define an inlet 41 that allows a source of water to be connected thereto to enable fluid, such as water or other liquid, to enter the discharge manifold 30, become pressurized in the fluid end 10, and ultimately to discharge through one or more of the first, second and/or third discharge outlets 42A'-42C', depending on the particular pressure range to be put through the blasting equipment 11 associated with any of those discharge outlets. As illustrated, the blasting equipment 11 can be in the form of an elongated high pressure hose or tube that is further joined with a spray gun or other spray apparatus, which is grasped and manipulated by an operator when performing a cleaning operation using the pressurized fluid, such as water, generated by the fluid end 10. The spray gun 10 can include a nozzle 12 that restricts flow of displaced fluid generated by the fluid end 10. Although it is described herein in connection with a fluid, the fluid end system in most cases can be utilized with a liquid, such as water. The water can be mixed with or substituted with other liquid chemicals for pressurized application via the fluid end system 10 and blasting equipment 11.

The end plate can include first, second and third secondary ports 43A-43C. These secondary ports can be uniquely and separately associated with the respective discharge outlets 42A'-42C' which accommodate different pressure ranges of liquid pumped through the fluid end 10. The secondary ports 43A-43B can be outfitted with special rupture discs 44A-44C, which also are uniquely associated with the respective pressure ranges of liquid discharged through the respective discharge outlets 42A-42C. Each rupture disc can be unique to the pressure range for which its respective that discharge outlet is designed to ensure safety to an operator. The end plate 40 also can include one or more plugs 45A-45C which can be secured in the respective discharge outlets 42A-42C to plug one or more of those outlets depending on the particular discharge outlet desired to be used with the respective blasting equipment 11. Optionally, when one discharge outlet, for example 42A, is coupled to blasting equipment, the other discharge outlets 42B and 42C are plugged with the respective plugs 45B and 45C.

Figure 25:
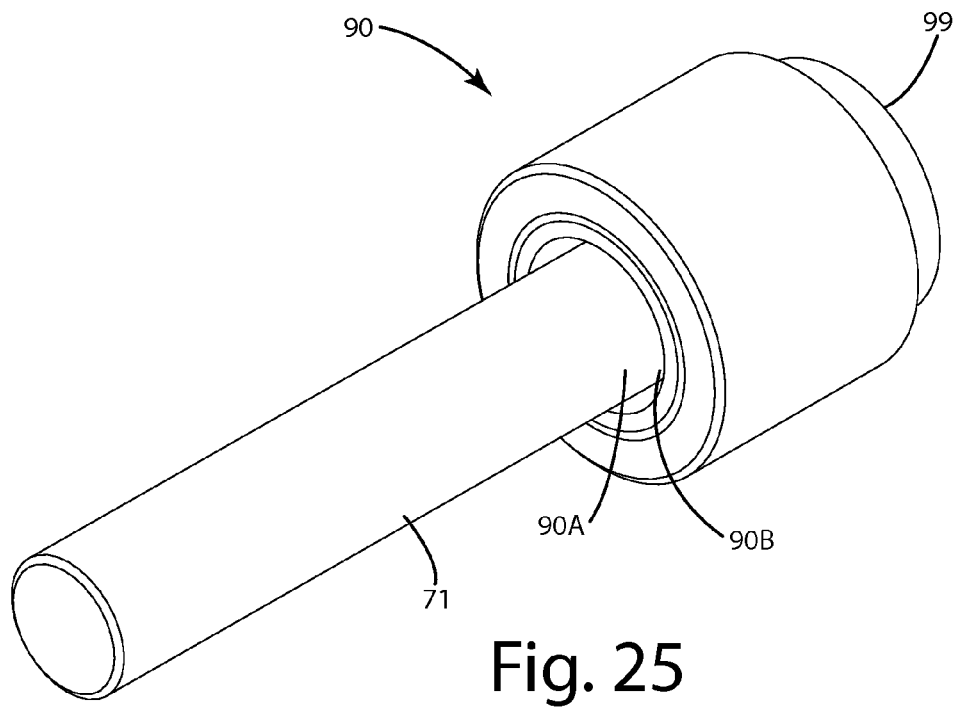
FIG. 25 is a front perspective view of a quick coupler configured to join a plunger of a CAM with a cross-head stub.
Figure 26:
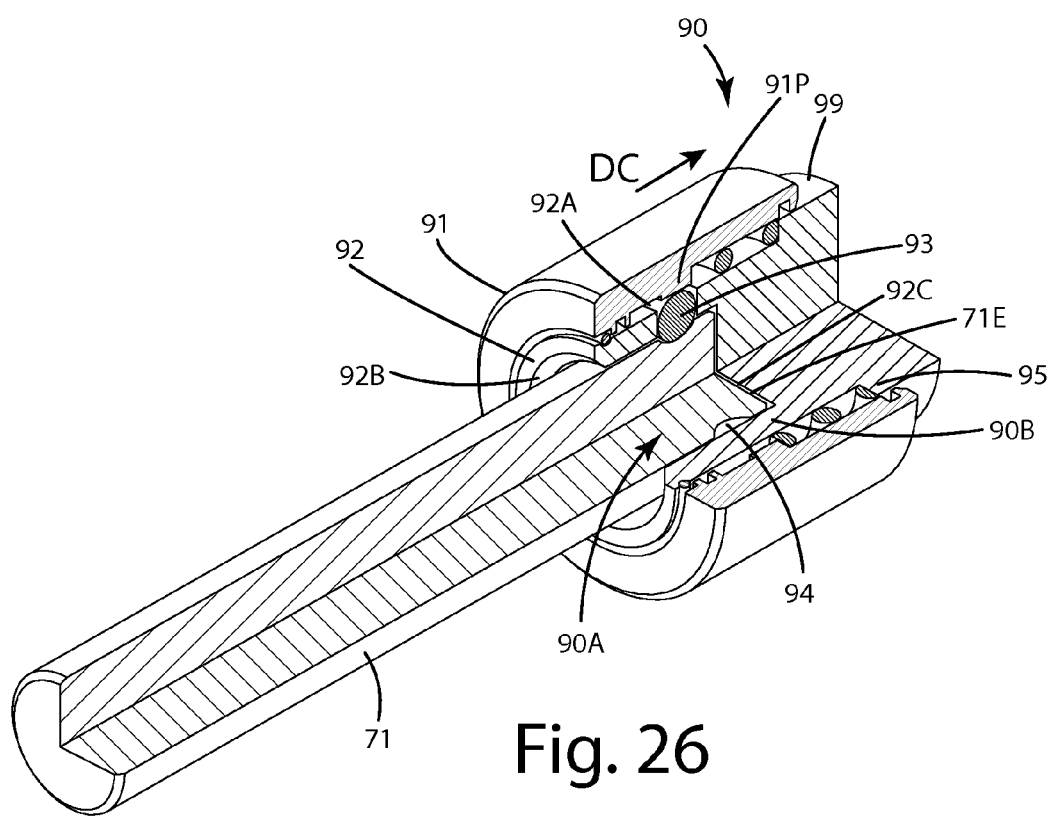
FIG. 26 is a section view of the quick coupler.

As shown in FIGS. 25 and 26, the fluid end system 10 can include a quick coupler 90 that attaches the plunger 71 to a cross-head stub 99. The quick coupler includes a sleeve 91 slidably mounted on a body 92. The sleeve can be manually operated by a user without tools to manipulate one or more retainer elements, for example, ball bearings 93, and selectively engage them with an annular recess or ring 94 defined by the plunger 71. By engaging or disengaging the retainer elements 93 with the plunger, an operator can quickly couple or decouple the plunger from the quick coupler, and thus the cross-head stub, making attachment of the fluid end to the cross-head stub and the drive system easily and rapidly modifiable.

II. Construction and Operation

The particular components and operation of the fluid end system 10 will now be described with reference to FIGS. 1-26. As shown in FIG. 1, the fluid end 10 can be attached or coupled to blasting equipment 11 in the form of a spray gun with a nozzle 12. The spray gun is manipulated by an operator to spray the highly pressurized fluid generated by the fluid end 10. The fluid end 10 is generally coupled to a drive unit 13, which is in the form of a diesel or electric powered motor, that drives a driveshaft 15 of a transmission 14. The driveshaft or other components generally engage the cross-head stubs 99, 99A-99C (FIG. 26) to reciprocally drive the plungers 71 and generate pressurized fluid flow from the discharge outlets and eventually into the water blasting equipment 11. The drive unit, transmission and cross-head stubs can be conventional and will not be described in further detail here.

The fluid end 10 includes a frame 20 having a front portion 22 and an opposing, a rear portion 23. The frame also can include a top portion 21 and opposing bottom portion 24. Optionally, all the different portions, top, bottom, front and rear can by monolithically formed as a single piece unit. Of course, in some cases, those different components and their respective parts can be separated into independent pieces that are bolted, fastened or otherwise joined with one another. The frame 20 defines at least one loading opening 21A-21C, which all can be generally identical. The loading openings 21A-21C form wells within which the CAMs 50A-50C can be placed. The openings 21A-21C are further illustrated in FIGS. 10 and 15, and can be of a polygonal shape, which is shown as a rectangular shape. The sidewalls 21W of the respective openings 21A-21C can be generally planar, but of course, can include other surface undulations or contours depending on the particular application. The sidewalls 21W can transition to a rear wall 21R of an opening. The rear wall is generally contiguous with the respective sidewalls 21W and extends downwardly to the bottom 21B of the openings. That wall 21R can generally be flat or planar, or of course, can be contoured and other configurations depending on the application. The sidewalls 21W also can transition to a rounded bottom 21B. The rounded bottom can generally be in the form of a partial cylinder and can mate with a substantially corresponding shape of the bottom of the CAM 50. For example, the bottom 51B of the CAM can be of a rounded or partially cylindrical shape that mates and fits within the rounded bottom 21B of the opening.

The CAM 50 also can include sidewalls 51W, which can be associated with or form part of the inlet manifold 80 of the CAM 50. These sidewalls 51W also can match the shape and size of corresponding parts of to the sidewalls 21W of the openings 21A-21C. Within the corresponding shapes of the CAM surfaces and the surfaces of the loading opening, the CAM 50 can be consistently and accurately placed within the loading opening so that respective passageways of the CAM and discharge manifold match up and align very well, which in turn prevents or impairs leakage during operation of the fluid end 10.

Figure 8:
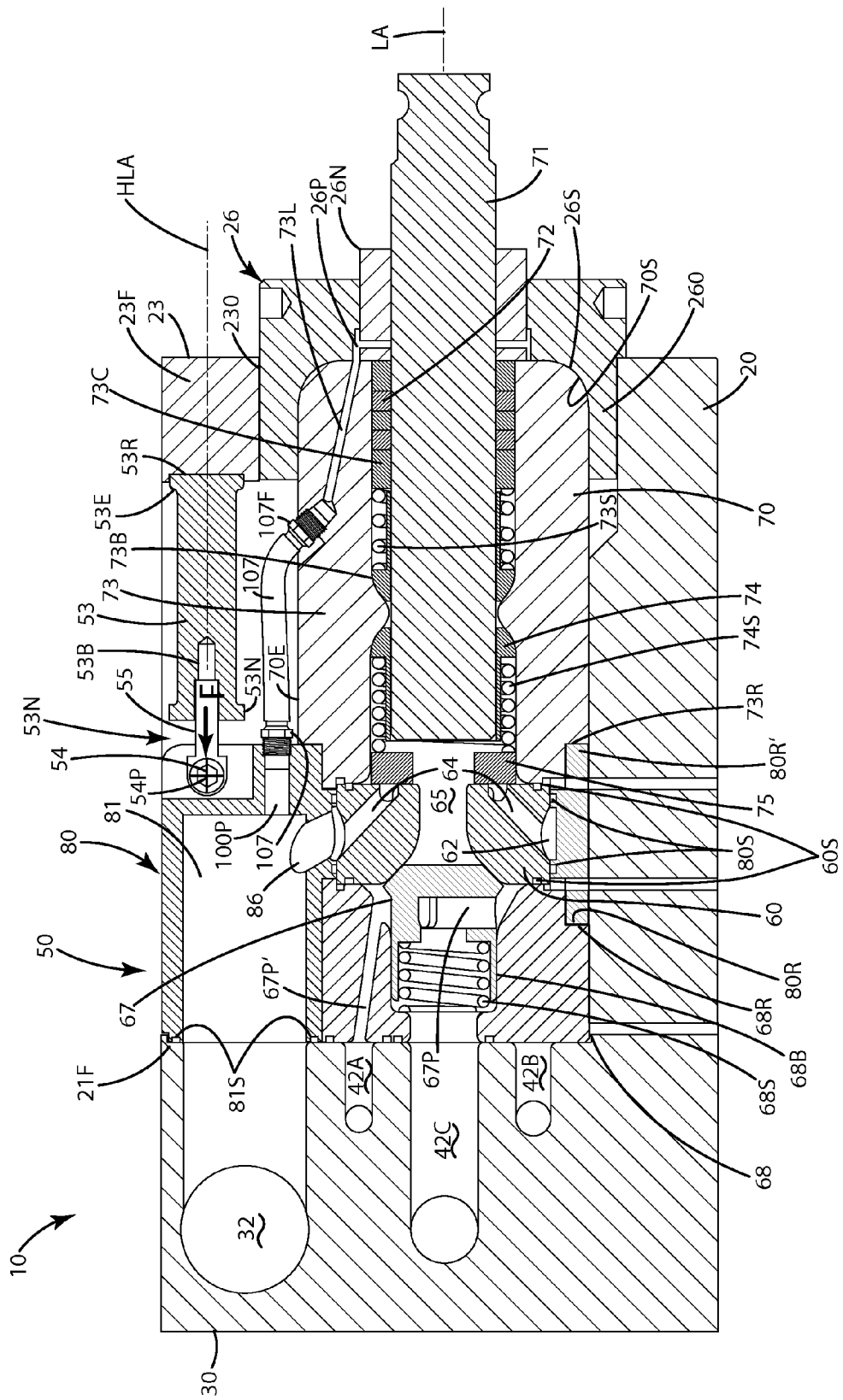
FIG. 8 is a cross section view of the CAM taken along line 8-8 of FIG. 2, but with the handle in a closed position.
Figure 15:
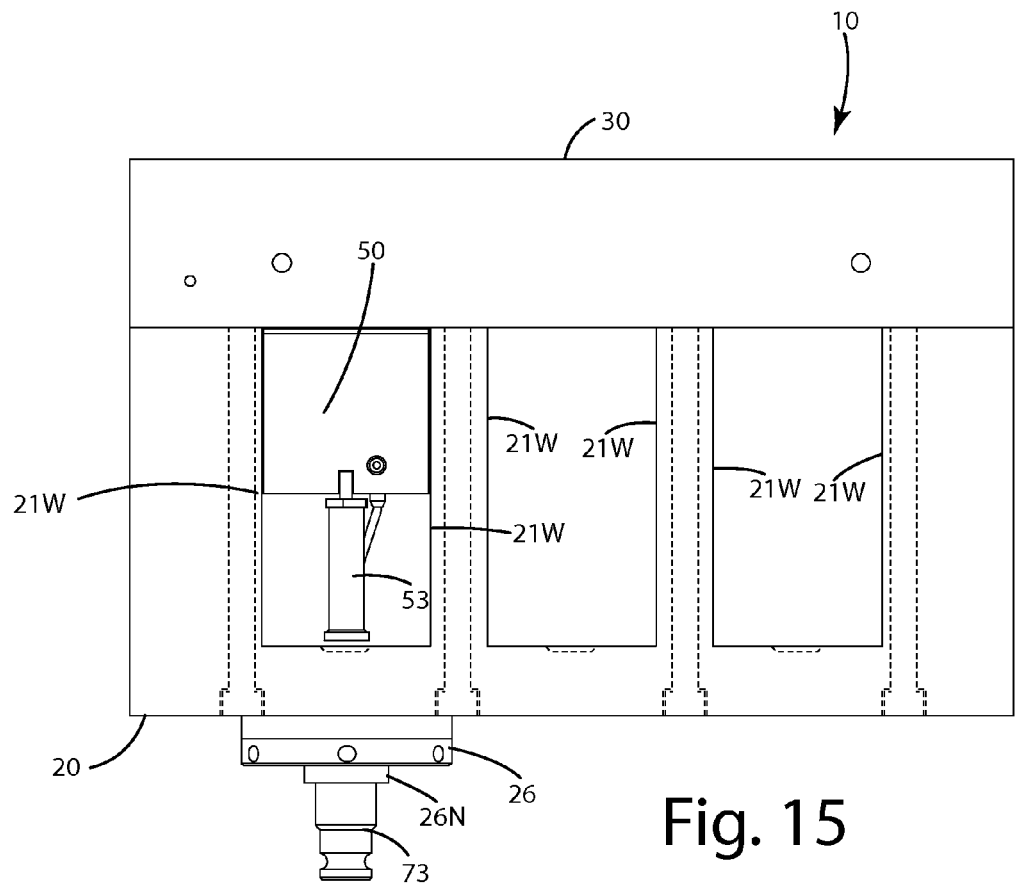
FIG. 15 is a top view of the CAM fully installed in the frame.

Returning to FIGS. 8-10, the frame 20 can include a frame retainer 23F along the rear portion 23 of the frame 20. Frame retainer 23F generally forms part of the rear portion 23. The frame retainer 23F and/or rear portion 23 can define a frame retainer opening 23O. The frame retainer opening 23O projects from and is contiguous with the loading opening, for example, 21C shown in FIG. 10 through the rear portion 23 of the frame 20. The frame retainer opening 23O can be of a rounded and/or cylindrical configuration. Of course, in other constructions and depending on attachment of the CAM to the frame, this shape can be modified to other shapes, for example polygonal shapes. The frame retainer opening 23O can be threaded with threads and adapted to receive a retainer element 26. The retainer element 26 can include similar threads and can be threaded into the frame retainer opening 23O as shown in FIGS. 8 and 15.

The retainer element 26 can include a retainer nut 26N. The retainer nut 26N can be configured so that it is manipulable and engageable with a tool. The retainer element 26 itself also can be engageable and rotatable with another tool or the same tool, depending on the application. The retainer element 26 can define a retainer element opening 26), as shown in FIG. 8. The retainer element opening 26O can be configured to receive at least a portion of the seal cartridge assembly 70 or otherwise engage that seal cartridge assembly. The retainer element opening 26O can be outfitted with and include a shoulder 26S which as shown can be rounded and/or chamfered. The shoulder 26S can mate with the corresponding shoulder 70S of the sealed cartridge assembly 70. Thus, when the retainer element 26 is tightened, the seal cartridge assembly 70 does not impair rotation of the retainer element 26, until the CAM 50 is sufficiently tightened by the retainer element 26 and secured within the fluid end to engage in a pumping operation. Optionally, the retainer element 26 can include a retainer element passageway 26P that extends toward and is in fluid communication with a lubrication valve assembly 90 as described in further detail below. In this construction, the retainer nut 26N can also define a portion of the passageway 26P. That passageway 26P can extend to and be in fluid communication with the plunger 71 and thus with the packing 72, as further described below. Although not shown, in some cases the retainer element passageway 26P can be eliminated and the lubrication passageway 73L can extend directly through the body 73 to the packing assembly 72.

Generally, as shown in FIGS. 9-15, the loading openings 21A-21C and the frame retainer opening 23O are sized and configured to enable the CAMs 50A-50C to be placed and tilted within the openings, with a plunger 71 and seal cartridge 70 effectively clearing the frame retainer 23F so that the CAM can be fully installed in the respective loading openings.

Figure 14:
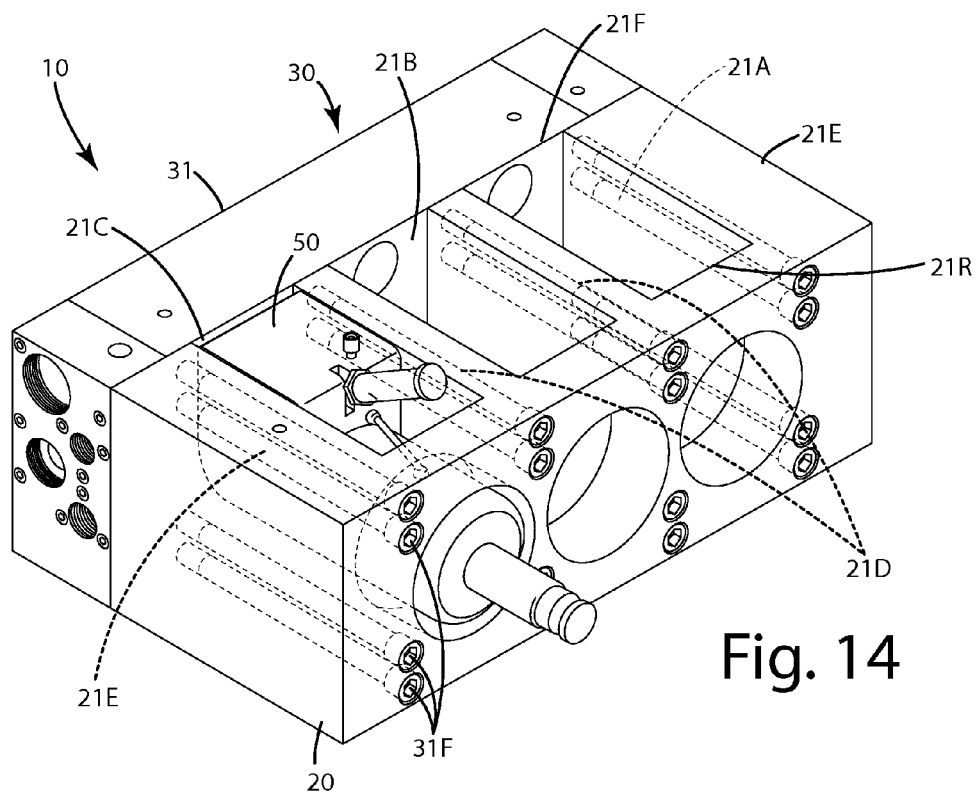
FIG. 14 is a rear perspective view of the CAM fully installed in the frame.
Figure 20:
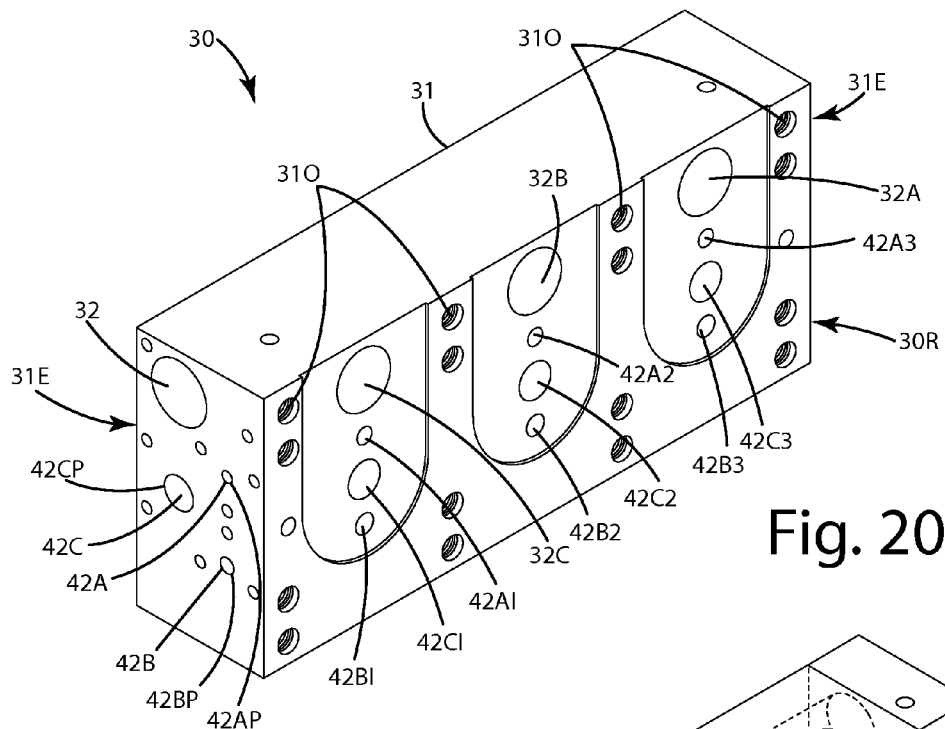
FIG. 20 is a perspective view of a center frame of the discharge manifold.

Returning to FIGS. 1 and 9-A1, the frame 20 can be joined at its front portion 22 with a discharge manifold 30. The discharge manifold 30 and particularly its center manifold portion 31 can define threaded openings 31O (FIG. 20). As shown in FIG. 14, these openings can be threaded to receive the fasteners 31F. Upon tightening of the fasteners 31F, the discharge manifold 30 is brought into engagement with the respective dividers 21D and ends 21E of the frame 20. As shown in FIG. 14, the dividers 21D can generally separate the respective loading openings 21A-C within which the CAMs 50A-50C are disposed. Collectively, the discharge center manifold portion 31, the respective sidewalls 21W, rear walls 21R and bottoms 21B can define those respective loading openings 21A-C. Generally the discharge manifold 30 and frame 20 collectively and cooperatively define each of the loading openings 21A-21C, with the discharge manifold closing off and forming the forward portion 21F of the opening opposite the rear 21R of the opening.

The discharge manifold 30 also is shown in FIGS. 20 and 21. There, it includes or defines a discharge manifold inlet chamber 32 which is in fluid communication with the multiple discharge manifold inlet chamber passageways 32A-32C. These discharge manifold inlet passageways 32A-32C are in fluid communication with the inlet manifold chamber 81 of the inlet manifold 80 of each respective CAM 50A-50C as further described below. The discharge inlet chamber 32 also can be in fluid communication with the inlet 41 of the end plate 40 which is further coupled to a conduit, such as a hose that is further joined with an external source of water.

Figure 16:
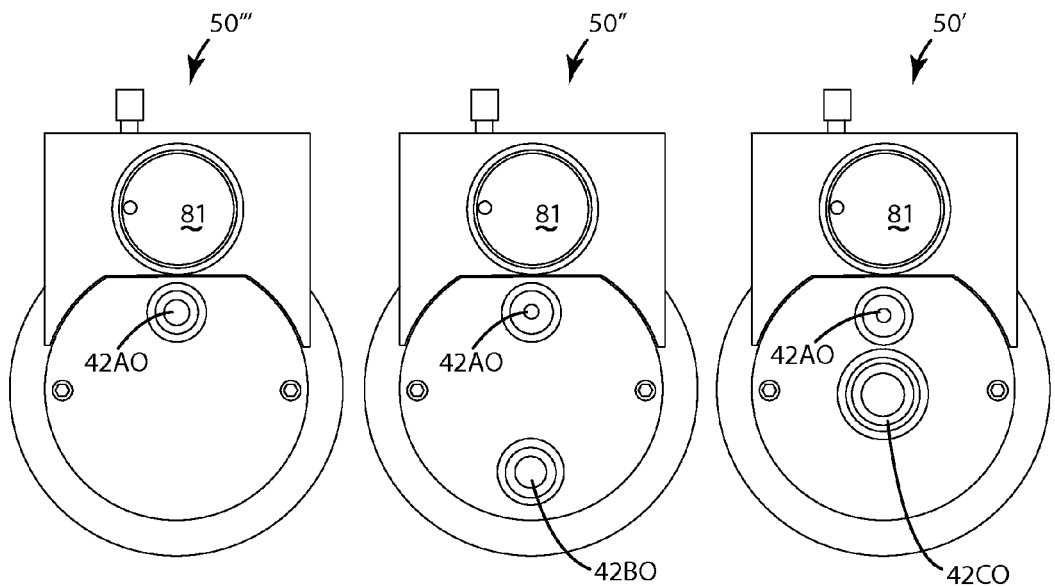
FIG. 16 is a front view of three different CAMs rated for different pressures for utilization with the fluid end system.

The discharge manifold 30 and discharge manifold center portion or center frame 31 can define multiple discharge passageways. For example, the discharge manifold can define a first discharge passageway 42C, a second discharge passageway 42B and a third discharge passageway 42A. The first discharge passageway can be designed for a first pressure range of liquid or fluid conveyed therethrough. As an example, the first discharge passageway 42C can be configured to convey and can be rated for up to 10,000 psi liquid flow therethrough. The first passageway 42C can terminate at one or more first discharge passageway ends 42C1, 42C2, 42C3. Such discharge passageway ends are adapted for placement adjacent a discharge valve outlet 42CO as shown in FIG. 16. This discharge valve outlet 42CO can be defined by the respective CAM 50' and will be further described below.

Optionally, the ends 42C1, 42C2, 42C3 are aligned with and project toward the loading openings 21A-21C so that when the respective CAM 50' (associated with the 10,000 psi pressure range) are installed the respective CAM 50' discharge valve outlet 42CO (FIG. 16) aligns with the ends so that fluid pumped from the discharge valve and generally through the CAM 50' can enter the discharge passageway 42C and be conveyed to the respective attached blasting equipment operable at pressures up to 10,000 psi.

The discharge manifold 30 can define a second discharge passageway 42B. This second passageway 42B can be different from the first discharge passageway 42C and can include a second cross section different from the first cross section. Optionally, the second cross section can be smaller than the first cross section. As a further example, the diameter of the respective passageway 42B can be smaller than the diameter of the first passageway 42C. The second passageway 42B can be rated for a second pressure range of fluid conveyed therethrough. This second pressure range can be greater than the first pressure range of the first passageway. As an example, the second discharge passageway 42B can be configured to convey and can be rated for up to 20,000 psi liquid flow therethrough. The second passageway 42B can terminate at one or more second discharge passageway ends 42B1, 42B2, 42B3. Such discharge passageway ends are adapted for placement adjacent a discharge valve outlet 42BO as shown in FIG. 16. This discharge outlet 42BO can be defined by the respective CAM as described further below.

Optionally, the ends 42B1, 42B2, 42B3 are aligned with and project toward the loading openings 21A1-21C so that when the respective CAMs (associated with the 20,000 psi pressure range) are installed, the respective CAM 50" discharge valve outlet 42BO (FIG. 16) aligns with the ends so that fluid pumped from the discharge valve generally through the CAM can enter the discharge passageway 42B and be conveyed out to the respective attached blasting equipment, operable at pressures up to 20,000 psi.

The discharge manifold 30 can define a third discharge passageway 42A. This third passageway 42A can be different from the first and second passageways. For example, it can include a third cross section different from the first cross section and second cross section. Optionally, the third cross section can be smaller than the first cross section and the second cross section. As a further example, the diameter of the respective passageway 42A can be smaller than the diameter of the first passageway 42C and the second passageway 42B. The second passageway can be rated for a third pressure range of fluid conveyed therethrough. This third pressure range can be greater than the first pressure rating or capacity of the first passageway and the second pressure rating of the second passageway. In this example, the third discharge passageway 142A can be configured to convey and rated for up to 40,000 psi liquid flow therethrough.

The third passageway can terminate at one or more third discharge passageway ends 42A1, 42A2, 42A3. Such passageways are adapted for placement adjacent the discharge valve outlet 42AO as shown in FIG. 16. This discharge valve outlet 42AO can be defined by the respective CAM 50''' and will further be described below. Optionally, the ends 42A1, 42A2, 42A3 are aligned with and project toward the loading openings 41A-41C so that when the respective CAM 50''' (associated with the 40,000 psi pressure range) are installed, the respective CAM 50''' discharge valve outlet 42AO (FIG.

16) aligns with the ends so that fluid pumped from the discharge valve and generally through the CAM 50''' can enter the discharge passageway 42A and can be conveyed out to the respective attached blasting equipment, operable at pressures up to 40,000 psi.

The above pressure range ratings are selected depending on the particular application. They may vary considerably from those noted above, and can be extended to higher or lower pressure ratings.

As shown in FIGS. 20-21, the first, second and third passageways 42C, 42B, 42A can lead to and terminate at an end 31E of the discharge manifold 30 distal from the respective discharge passageway ends as described above. Where they terminate at the end 31E of the discharge manifold 30 (which can be either or both ends of the discharge manifold), the discharge passageways 42A, 42B, 42C can terminate at ports 42AP, 42BP, 42CP. These ports can be aligned with the respective discharge outlets 42A', 42B', 42C' to establish fluid communication between these elements and thus between the discharge manifold and the blasting equipment.

Optionally, throughout the discharge manifold 30, each of the respective first, second and third discharge passageways are all fluidly isolated from one another, that is, fluid within one of the passageways does not enter into any of the other passageways when the fluid end is in operation or use. This can isolate the pressures associated with each of the fluids being conveyed through the respective first, second and/or third passageways. Thus, within the discharge manifold, fluids being pumped at certain pressures are not inadvertently routed to a mismatched rupture disc of the manifold or an end plate as described in further detail below.

The CAM of the fluid end system 10 will now be described in further detail with reference to FIGS. 3-8. Generally, the CAM 50 includes a valve seat assembly 60 that is joined with the seal cartridge assembly 70 to form a single unit. Optionally, the single unit includes the inlet manifold 80 which is in fluid communication with the valve seat assembly 60 and the discharge manifold when the CAM is installed in the frame. Further optionally, the single unit includes the manifold seat 68. The valve seat assembly 60 can be in direct fluid communication with the manifold seat 68.

Figure 3:
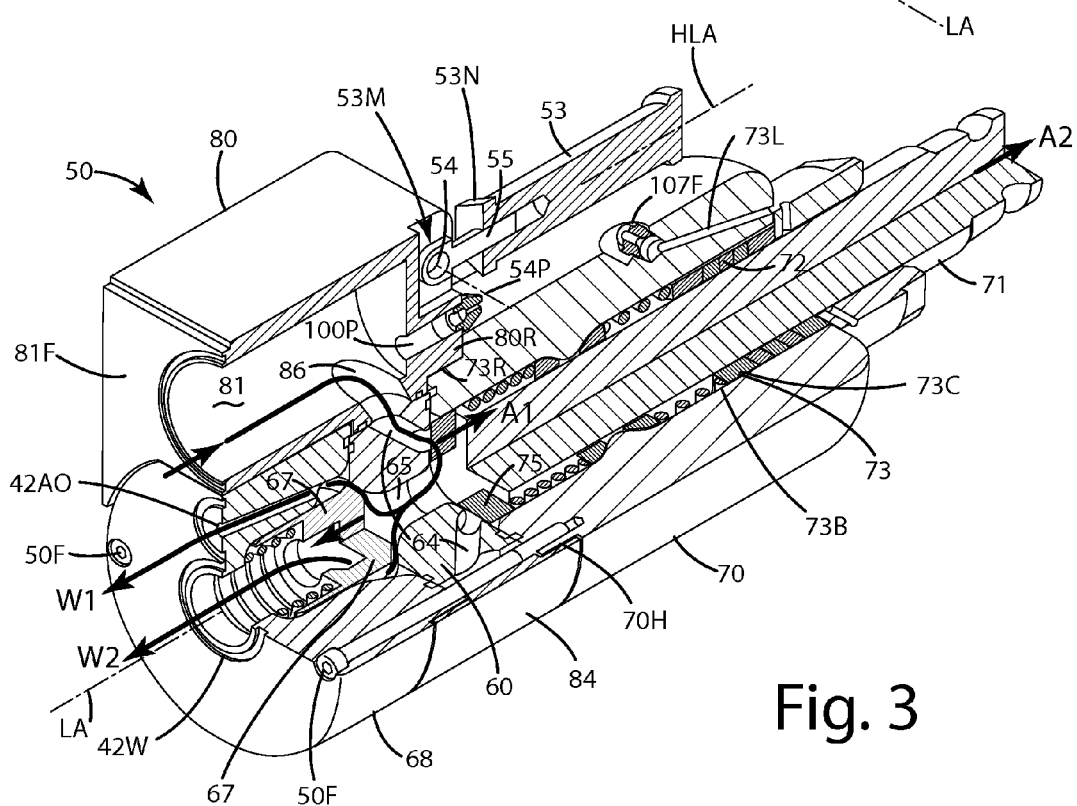
FIG. 3 is front perspective cross section view of the CAM.

The manifold seat 68, valve seat assembly 60 and seal cartridge assembly 70 can be fastened together with one or more fasteners 50F as shown in FIGS. 3 and 4. The respective manifold seat 68 and valve seat assembly 60 can define respective apertures through which the fasteners 50F are disposed. The fasteners 50F can be threaded at their ends and threaded into corresponding thread holes 70H defined by the seal cartridge assembly 70. Of course, if desired, other parts of these components can be threaded and fasteners utilized to join them in different manners. Optionally, the fasteners do not include any threaded portions that overlap different parts. For example, the threaded portion of the fastener can thread only into a threaded hole 70H in the sealed cartridge assembly 70. The other parts, that is, the valve seat assembly 60 and the manifold seat 68 are not threaded. This can allow for relative movement and/or compression of these different components along the longitudinal axis if desired. Further optionally, the fasteners 50F can be aligned with and parallel to a longitudinal axis LA of the CAM 50. The fasteners can be disposed on opposite sides of the single piece unit.

The seal cartridge 70, valve seat assembly 60 and manifold seat 68 are better understood with reference to FIGS. 3 and 8. Generally, the seal cartridge assembly 70 includes plunger 71 that is reciprocally mounted therein. The seal cartridge assembly also includes a seal cartridge body 73. The cartridge 73 defines a bore 73B within which the plunger 71 is reciprocally mounted. Within its bore 73B, the body 73 houses packing 72 that is disposed generally between the plunger 71 and the body 73. This packing 72 is generally conventional and provides cooling liquid and/or lubrication to the plunger 71 as it reciprocates at high frequencies.

The seal cartridge assembly 70 also can include a throat bushing 73C, which is generally disposed around the plunger 71 and located between the packing 72 and the spring stop 73S. The spring stop 73S includes a biasing spring, optionally in the form of a coil spring. The seal cartridge also can include a spring mount 74. The spring mount 74 can circumferentiate the plunger 71 and can extend toward the inlet valve 75. The inlet valve 75 as shown can generally be in the form of a washer or circular shape with a rounded hole defined centrally therein.

The plunger 71 of the seal cartridge assembly 70 can be sized and shaped so that it fits through the retainer element 26 and retainer nut 26N, when installed in the frame 20. Optionally, the tolerances can be very close between the inner diameter of the element 26 and the outer diameter of the plunger 71 to minimize leaking and provide a tight, functional construction. As mentioned above, the body 73 can be constructed to include a shoulder 70S which mates with and generally engages the shoulder 26S of the retainer element 26.

Although the seal cartridge assembly 70 is described as including the components above, it can include different components depending on the particular application and operating parameters thereof.

As shown in FIGS. 4 and 8, the seal cartridge assembly 70, and in particularly, the seal cartridge body 73 can define a registration feature 73R, which as shown, is generally in the form of a polygonal shape. Optionally, the feature 73R can be in the form of a hexagon. Other polygonal shapes, elliptical shapes, rounded shapes or otherwise can be substituted therefor. Generally, the purpose of this registration feature 73R is to mate with the corresponding registration feature 80R' on the inlet manifold 80. These registration features can prevent rotation of the inlet manifold 70 relative to the seal cartridge assembly, the valve seat assembly and/or the manifold seat. Accordingly, these components can consistently align with the loading opening.

Further, the respective discharge valve outlets 42AO, 42BO and 42CO can all be appropriately aligned with the respective discharge passageway ends 42A1-42A3, 42B1-42B3 and 42C1-42C3. In addition, the inlet discharge manifold outlets 32A-32C can be aligned with the inlet manifold chambers 81 of the CAMs 50A-50C when installed in the frame 20. This can provide and enhance the desired sealing effect between the respective components of the system 10. Optionally, in some cases, if desired, one or more registration features can be defined on the valve seat assembly 60, although this is not shown in the current embodiment.

As shown in FIGS. 3 and 8, the valve seat assembly 60 can be positioned between and can sealably engage the respective manifold seat 68 and the seal cartridge assembly 70. To provide fluid sealing, one or more seals 60S can be disposed between the valve seat assembly 60 and the seal cartridge assembly 70. The valve seat assembly 60 also can be in sealing engagement with the inlet manifold 80 via one or more additional seals 80S. These seals 80S can circumferentiate an annular recess 62 that circumferentiates the valve seat assembly 60. The recess 62 of the valve seat assembly 60 can be referred to as a plenum. It is configured to allow liquid to flow from the inlet chamber 81 through the inlet chamber outlet 86 and in through the plenum 62. From there, the liquid flows through the valve seat assembly passages 64 through and past the inlet valve 75 (when the spring 74S compresses)

and out the chamber 65. The chamber 65 can be selectively opened and closed via the discharge valve 67. The chamber itself 65 can widen from a reduced diameter to a larger diameter generally forming a tapered opening around the longitudinal axis adjacent the discharge valve 67.

As shown in FIGS. 3, 4 and 8, the discharge valve 67 can be mounted in relation to the manifold seat 68. The manifold seat 68 can define an internal bore 68B within which the discharge valve can be reciprocally mounted. A spring 68S can be mounted in the bore and can compress and decompress during operation of the discharge valve 67. The discharge valve can define a discharge valve passageway 67P for operation within certain pressure ranges as explained below. Generally, the discharge passageway 67P and any other discharge passageways 67P' where included can be further in fluid communication with the respective discharge passageways 42A, 42B, 42C of the discharge manifold 30 to establish fluid communication between the manifold seat and those passageways.

The manifold seat 68, as shown in FIGS. 3, 4 and 8 can also include a registration feature 68R in the form of a polygon, such as a hexagon. The registration feature can mate with and engagement with a corresponding registration feature 80R on the inlet manifold as illustrated in FIG. 5. The corresponding registration feature 80R can be the same as that described above in connection with the registration feature 80R'. As shown in FIG. 6, the registration features 80R and 80R' can be disposed on opposite sides of a central portion 84 of the inlet manifold 80. The central portion 84 can define an aperture 85 that is generally centered along the longitudinal LA (FIGS. 3, 8) of the CAM 50. The opening 85 can be sized so that the valve seat assembly 60 is at least partially disposed through the opening 85 of the inlet manifold 80. The center of the opening 85O can be concentric with the chamber 65 and/or the inlet valve 75 aperture.

Generally, with reference to FIGS. 3 and 4, the registration features 73R and 68R of the respective seal cartridge assembly 70 and manifold seat 68 can mate within the corresponding registration features 80R' and 80R of the inlet manifold 80 to secure those components in a fixed rotational relationship relative to one another and the longitudinal axis LA of the CAM. The registration features also can orient the walls 51W of the inlet manifold 80 so that when the CAM 50 is installed in a loading opening 21A-21C, those walls 51W will engage and/or be replaced adjacent the sidewalls 21W of the loading openings.

Figure 9:
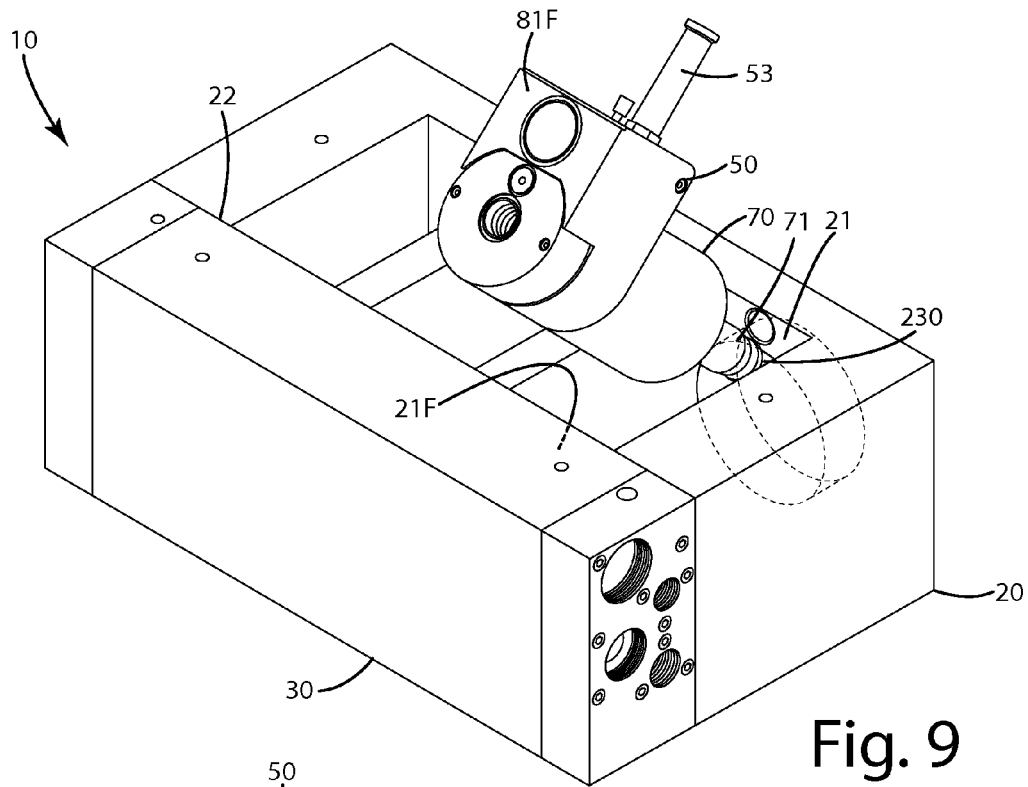
FIG. 9 is a front perspective view of a CAM being installed in a loading opening of the frame of the fluid end system.
Figure 10:
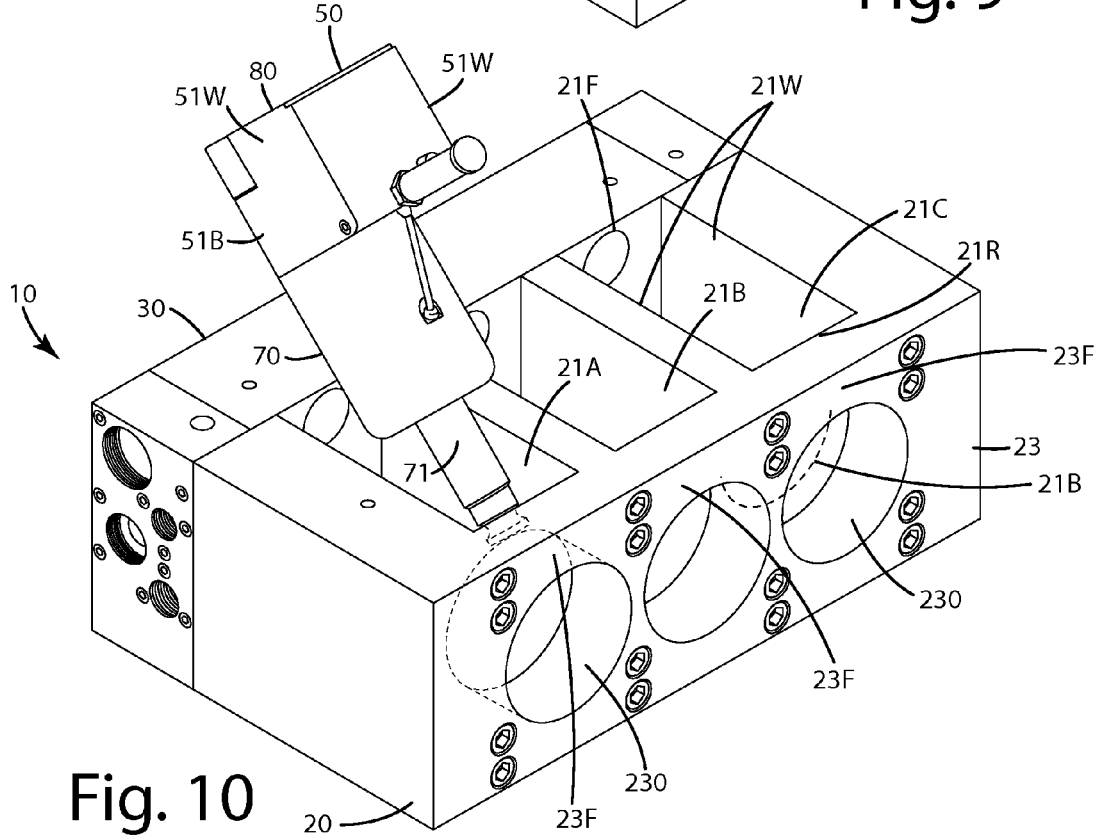
FIG. 10 is a rear perspective view of the CAM being installed in the loading opening of the frame.
Figure 11:
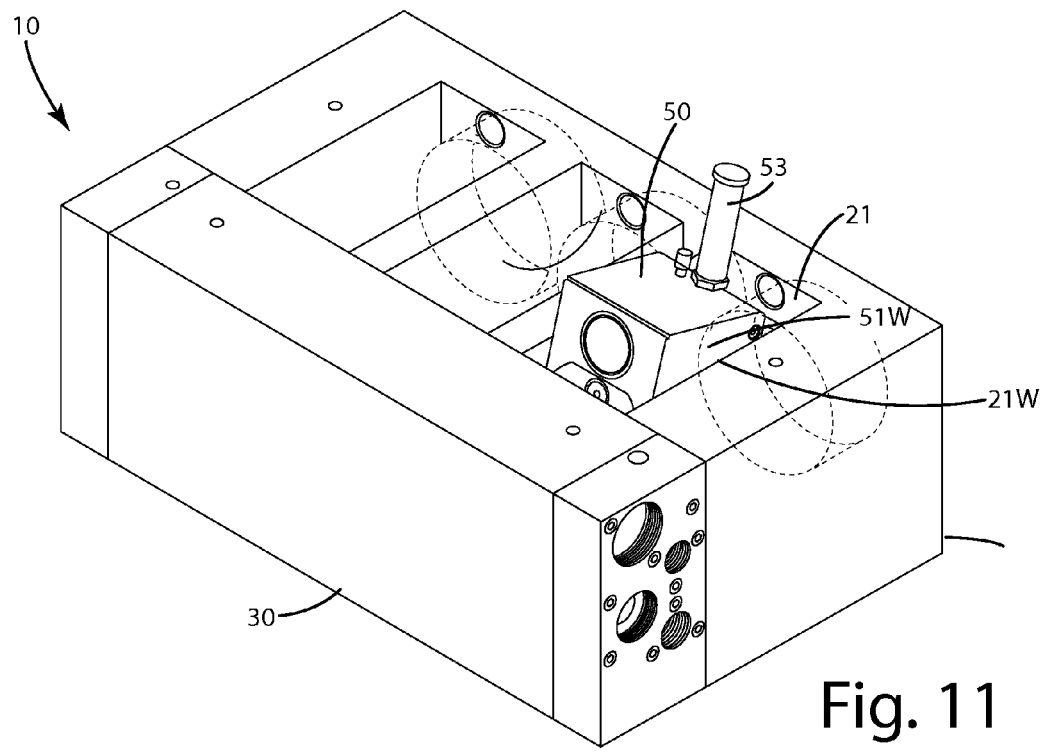
FIG. 11 is a front perspective view of the CAM being further installed in the frame.
Figure 12:
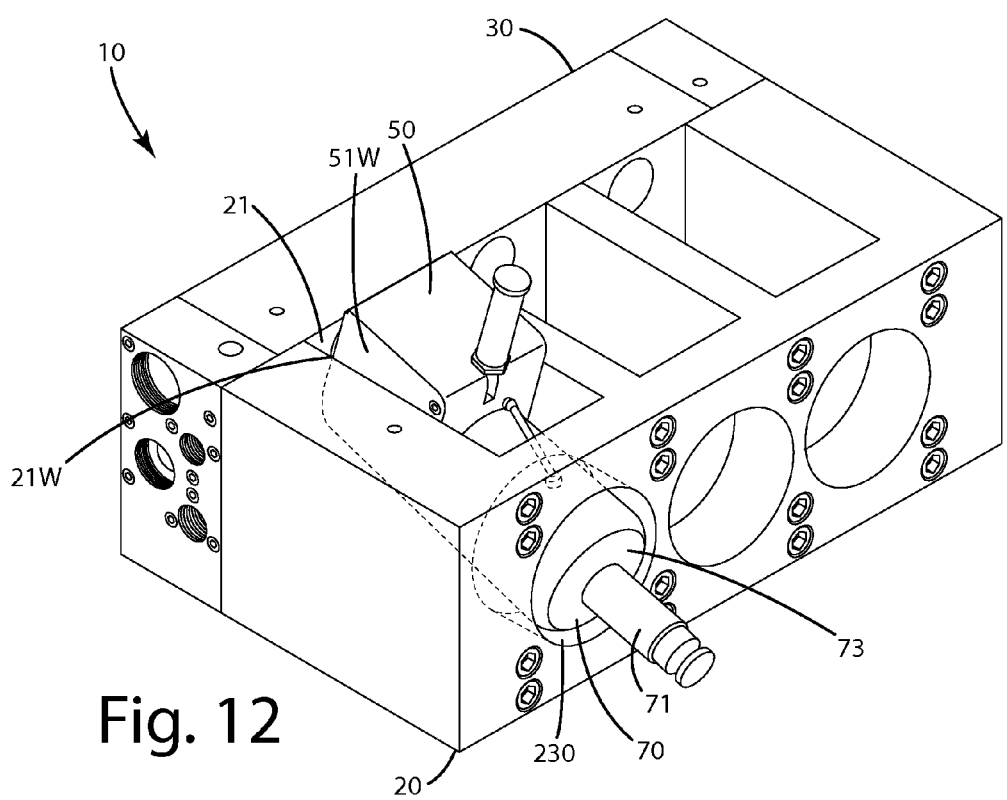
FIG. 12 is a rear perspective view of the CAM being further installed in the frame.

The inlet manifold 80, as explained above, includes the inlet chamber 81. This inlet chamber is adapted for placement and adjacent the discharge manifold inlet 32. The inlet manifold front face 81F as shown in FIGS. 5 and 9 can be configured so that it is adjacent and contacts the front face 21F of the loading opening, which optionally corresponds to the rear surface 30R (FIG. 20) of the discharge manifold 30. The front face 81F, as shown in FIGS. 5 and 8 can include a seal 81S. The seal 81S can be concentrically arranged about the inlet chamber 81 to provide a seal between the inlet manifold 80 and the discharge manifold 30 so that liquid can be conveyed from the inlet 32 to the inlet chamber 81 of an inlet manifold 80 without leaking.

The inlet manifold 80 defines an inlet passageway 86 that is in fluid communication with the valve seat assembly 60, and in particular the valve seat assembly passageway 64. This inlet passageway 86 provides fluid communication between the inlet chamber 81 and the plenum 62 as well as the internal passageway 64 of the valve seat assembly 60. As mentioned above, the seals 80S can operate to provide a seal around the inlet chamber opening 86 to prevent liquid from leaking past the inlet manifold there.

Generally, as shown in FIG. 3, the CAM operates to enable liquid to enter from the discharge manifold inlet passageway 32 into the inlet manifold 80 and specifically the inlet chamber 81. From the inlet chamber 81, the liquid travels along the paths W1 and W2 through the CAM 50. These paths can be affected by the liquid flowing first through the inlet chamber opening 86 through the passageways 64, and past the inlet valve 75. When the inlet valve moves in the direction A1 upon reciprocal motion of the plunger in direction A2 along the path, the water can continue through the valve seat assembly chamber 65 and pass the discharge valve 67 generally through the discharge valve outlets 42CO and 42AO. From there, the liquid can be conveyed through the passageways defined by the discharge manifold 30.

Figure 2:
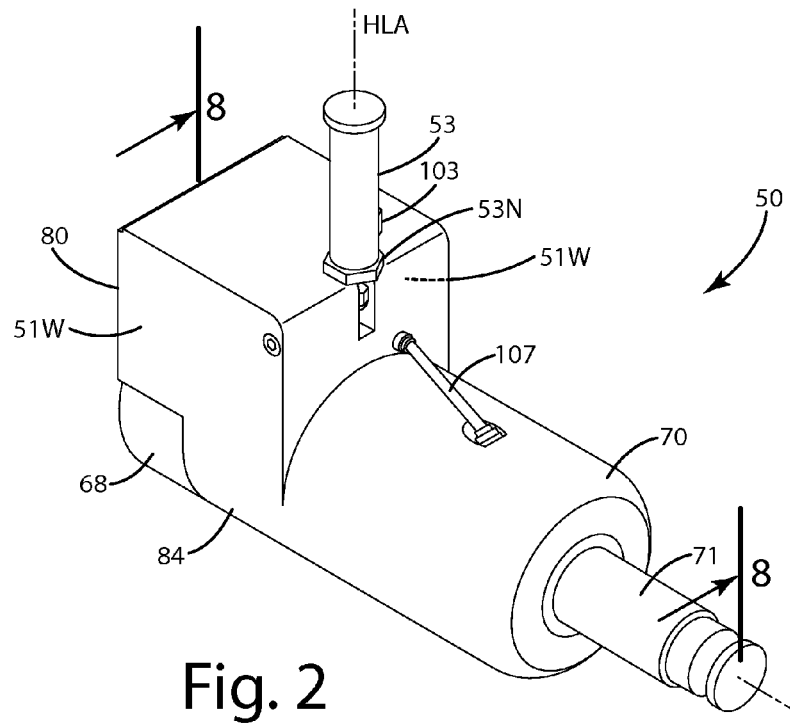
FIG. 2 is a rear perspective view of a CAM.

With reference to FIGS. 2, 3 and 8, each CAM 50 can be outfitted with a handle 53. The handle 53 as illustrated is of a cylindrical shape, however any other shape will work, for example, polygonal, elliptical, rounded, or other shapes provided they are easily and readily manually graspable by an operator's hand. The handle can be pivotally joined with the CAM and optionally the inlet manifold 80 via a fastener 54. The fastener can be in the form of a bolt, pin or rivet or any other type of fastening device. Generally, the bolt is coupled to an adjustor element 55, which is further joined with the handle 53. The adjustor element, the bolt and/or the handle 53 can all be configured to pivot or rotate about the pivot axis 54P. This pivot axis 54P about which the handle can be selectively pivoted, can be transverse or perpendicular to the longitudinal axis LA of the CAM 50. The handle 53 is thus selectively pivotable from a first position shown in FIG. 3 to a second position shown in FIG. 2, and throughout a number of positions therebetween. Generally, in the first position shown in FIG. 3, the length of the handle 53 along the handle longitudinal axis HLA is substantially parallel to the longitudinal axis LA of the CAM 50. In the second position, shown in FIG. 2, the handle 53 and the handle longitudinal axis HLA are substantially transverse to the longitudinal axis LA of the CAM. Optionally, the handle and the handle longitudinal axis HLA can be perpendicular to or generally upwardly angled relative to the longitudinal axis LA of the CAM.

With this selectively pivotable feature, the CAM 50 can be easily manipulated by an operator when handle 53 is in the position shown in FIG. 2. For example, the CAM 50 can be installed in the frame 20 as shown in FIGS. 9-15. The handle also offers a way to easily manually manipulate the CAM to get it into position and insert it into the loading opening. After the CAM is installed or in storage, the handle 53 can be rotated about the pivot axis 54P, generally downwardly to the position shown in FIGS. 3 and 8. When in this lowered or second position, the handle is generally out of the way and not easily snagged by any hoses, plumbing or other materials in or around the fluid end 10.

Optionally, the handle 53 can be selectively extendable along the handle longitudinal axis HLA or some other axis. This functionality can be provided via an extension mechanism 53M. The mechanism can include a bore 53B defined by the handle 53 being threaded, and the adjuster element 55 being threaded in a likewise manner. By rotating the handle clockwise or counter-clockwise, the handle can extend away from or toward the inlet manifold 80 as generally shown in FIG. 8. If desired, the handle 53 can include a tool-compatible portion 53N which can be configured to accommodate some sort of tool, such as a box end tool, in case an operator does not have sufficient gripping strength to rotate the handle.

The frame element 23F can define a handle recess 53R as shown in FIG. 8. This handle recess 53R can be shaped to receive an end 53E of the handle. In operation, the handle 53 can be selectively extended along the longitudinal axis HLA by rotating it about the adjuster element 55. In turn the handle distances itself further from the inlet manifold 80. The handle engagement end 53E of the handle 53 can engage the frame 20 and in particular the recess 53R defined by the frame 23F. The handle 53 can continue to be rotated so that it continues to extend. As it extends, it pushes the inlet manifold 80 against the discharge manifold 30. Where seals 81S are included on the opposite face of the manifold 80, those seals are brought into sealing engagement with the front face 21F of the load opening. Of course, where the front face 21F of the loading opening is part of the discharge manifold 30, the seal and inlet manifold 80 are pushed against the discharge manifold via the extension of the handle. Where the frame includes some other structure between the inlet manifold and the discharge manifold, the seal 81S and inlet manifold 80 can be pushed against the portion of the frame as well.

Generally, the extension of the handle along the longitudinal axis HLA extends the handle away from the pivot or attachment point 54P. In turn, the handle exerts a force F on that pivot point 54P which is transferred to the inlet manifold 81 and the remainder of the CAM 50. This can push the inlet manifold into sealing engagement with the front face 21F of the loading opening and in particular, seal the seals 81S around the chamber 81.

Installation of a CAM 50 within the frame 20 is shown in FIGS. 9-15. The CAM 50 can be grasped manually by a user at the handle 53. The user can insert the CAM 60 into the loading opening 21. The CAM 50 can be tilted at or to a predetermined angle relative to horizontal, so that the plunger 71 and the seal assembly 70 are aimed to project through the frame retainer opening 23O defined by the frame 20. After the plunger 71 and portion of the seal cartridge assembly 70 clear the opening 23O, they begin to project through that frame retainer opening. This is shown further in FIGS. 11 and 12 where the plunger 71 and body 73 of the seal cartridge assembly 70 are projecting into and at least partially through the opening 23O. As the CAM 50 enters the opening 21, the sidewalls 21W of the opening 21 are immediately adjacent and optionally contacting the wall 51W of the CAM 50. This interaction assists in guiding the CAM 50 down into the loading openings 21A-21C. After the CAM 50 is tilted down so that it rests in the bottom 21B of the loading opening, the respective discharge manifold inlet 32 is generally aligned with the chamber 81 of the inlet manifold 80 of the CAM 50. Further, the respective passageway 67P' and 67P are aligned with respective discharge passageway ends 42A1 and 42C1.

Figure 13:
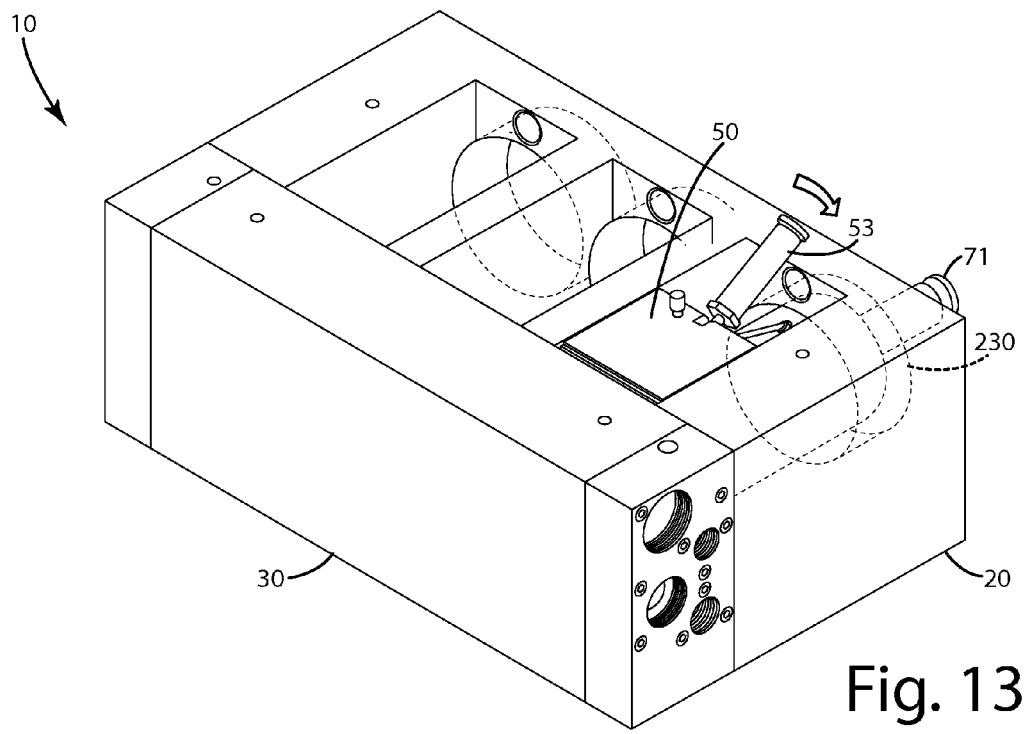
FIG. 13 is a front perspective view of the CAM fully installed in the frame.

As shown in FIG. 13, the handle 53 can be pivoted downward in the direction of the arrow to a closed or lowered position. The retainer element 26 can be joined with the frame retainer 23F. As an example, the frame retainer 26 can be threaded into the opening 23O. As this occurs, the shoulders 26S of the retainer element engage the shoulders 70S of the seal cartridge assembly 70. This can assist in centering and generally urging the CAM toward the front face 21F of the opening 21. The retainer element 26 can be manually installed initially. However, after becoming tightened manually, it can be tightened with a tool which can engage the retainer element 26 directly or the retainer element nut 26N. The retainer element and retainer element nut can be tightened down to a pre-specified torque sufficient to hold the manifold seat and inlet manifold 81 in sufficient engagement with the discharge manifold and/or frame during operation of the fluid end under high pressure. As mentioned above, the seals adjacent the front face 21F shown in FIG. 8 can seal around the respective passageways to prevent leakage from those interfaces.

The fluid end system 10 described herein is contemplated to be operated at multiple different pressures. To do so, the system can be outfitted with different pressure rated CAMs. The CAMs can be outfitted with seal cartridge assemblies, valve seat assemblies and manifold seats and their respective components to generate liquids within different pressure ranges. In one embodiment, the pressure ranges of certain CAMs can be rated at 10,000 psi, other CAMs can be rated for 20,000 psi and yet other CAMs can be rated for 40,000 psi. Of course, other operating pressures can be selected as desired.

The CAMs are configured so that the respective manifold seats, valve seat assemblies, and seal cartridge assemblies are all secured to one another as a single piece unit. Accordingly, different seal cartridge assemblies, valve seat assemblies and manifold seats rated for different pressure ranges are difficult to mix and match (which could present safety hazards if different pressure components are mixed)—again because they come preassembled as one single piece unit in each of the CAMs. Being a single piece unit, all of the components are attached to one another, and thus are installed and removed together simultaneously from the frame of the fluid end. The system offers significantly improved safety characteristics. For example, a CAM rated for 10,000 psi installed in the fluid end 10 is configured to operate only at that 10,000 psi pressure rating and is interfaced with the correct, same pressure passageway 42C1-42C3 of the discharge manifold 30 so that liquid under that pressure is transferred to the discharge manifold through the end plate 40 and ultimately to the blasting equipment 11. Typically, the same type of CAM is installed in each of the loading openings of the frame 20.

In FIG. 16, three different CAMs, 50', 50'', 50''', rated for operation at different pressure ratings, are illustrated. All three of the CAMs 50', 50'', 50''' include an inlet 81 configured to be placed adjacent and receive water from inlet manifold discharge passageways 32A-32C of the discharge manifold 30 (FIG. 20). The discharge valve outlets of the different CAMs differ, again, depending on their pressure ratings. For example, the CAM 50' includes a first discharge outlet 42CO and a second discharge outlet 42AO. The first discharge valve outlet 42CO is configured to convey liquid from the CAM to the discharge manifold at a first pressure, for example, 10,000 psi. The second discharge valve outlet 42AO can be configured to establish communication between that valve outlet 42AO and the respective passageways 42A1-A3. Effectively, this CAM 50' offers an operating pressure range of up to 10,000 psi to the respective blasting equipment 11. If desired, the outlet 42AO can be deleted, however, as explained below, in this embodiment, that outlet is in fluid communication with a port in which a pressure gauge, pressure switch or other monitoring device optionally can be installed. Generally, even though this discharge outlet 42AO is rated for a higher pressure, the CAM cannot generate liquid through it at that pressure.

As shown in FIG. 16, the CAM 50'' includes a second discharge valve outlet 42BO, as well as the other discharge valve outlet 42AO. In this configuration, the CAM is configured to pressurize water up to 20,000 psi which can be conveyed to the CAM discharge manifold 30 and through the blasting equipment 11. The illustrated additional discharge valve outlet 42AO if desired could be deleted as discussed above in connection with the first CAM 50'. FIG. 16 also illustrates the third CAM 50''' which includes a single discharge valve outlet 42AO. This CAM is configured to pump liquid up to 40,000 psi throughout the CAM into the discharge manifold, and ultimately through the blasting equipment 11.

Figure 17:
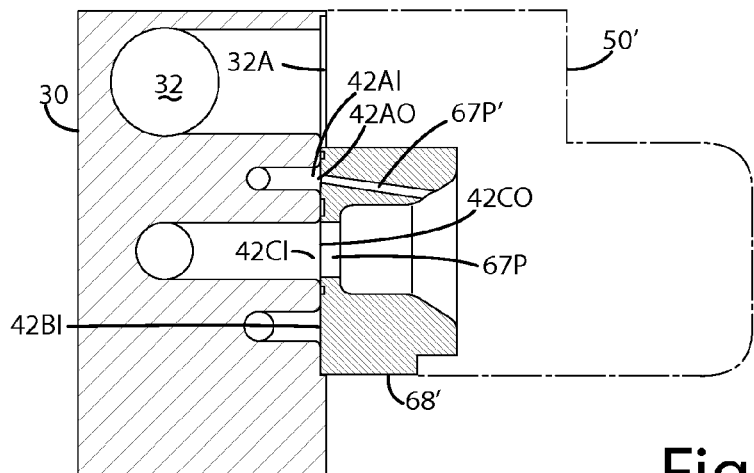
FIG. 17 is a section view of a discharge manifold and manifold seat of an exemplary 10,000 psi CAM.
Figure 18:
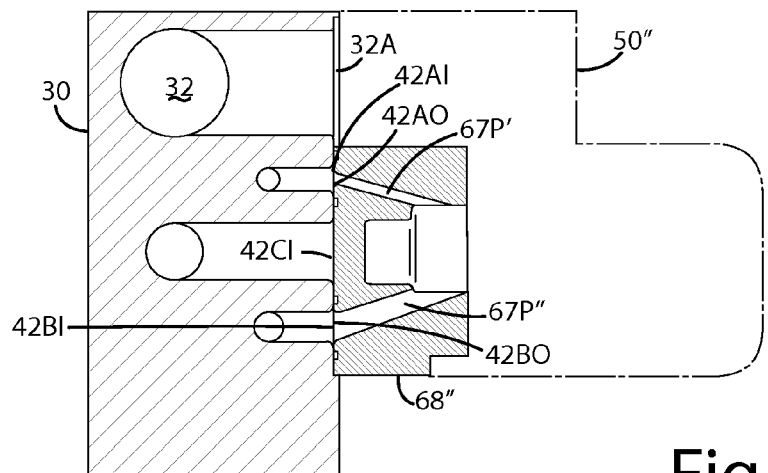
FIG. 18 is a section view of a discharge manifold and manifold seat of an exemplary 20,000 psi CAM.
Figure 19:
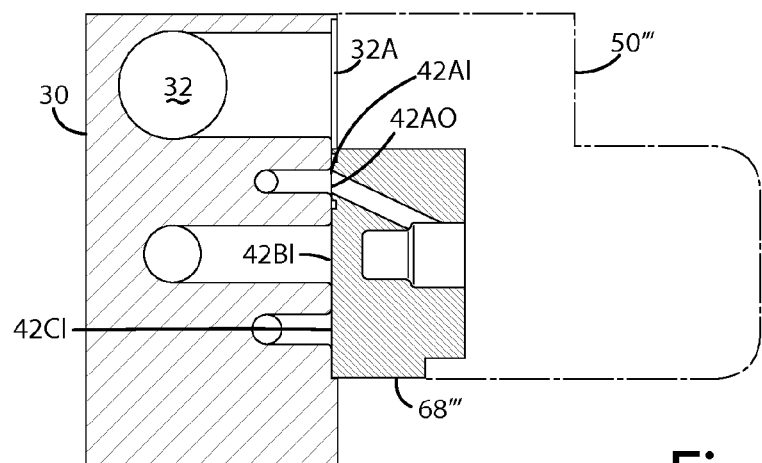
FIG. 19 is a section view of a discharge manifold and manifold seat of an exemplary 40,000 psi CAM.

The relationship between the different pressure rated CAMs 50', 50", and 50''' and the discharge manifold 30 is further understood to reference to FIGS. 17-19. For simplification, the manifold seat is the only fully illustrated portion of the respective CAMs 50', 50", 50'''. In FIG. 17, the CAM 50' which is rated for pumping liquid at pressures up to 10,000 psi, includes a manifold seat 68' including discharge passageways 67P and 67P'. The seat is configured to provide high flow rate of about 40 GPM of liquid from the CAM 50'. This passageway is in fluid communication with the first discharge manifold passageway 42C1 which leads to the discharge manifold outlet 42C. This outlet 42C is generally aligned with the end plate discharge outlet 42B', which can be attached to blasting equipment rated up to 10,000 psi.

As shown in FIG. 17, the CAM 50' also includes another passageway 67P' which transfers fluid through the discharge valve outlet 42AO to the discharge manifold passageway 42A1 and subsequently to the respective opening 42A' of the end plate. While this passageway 67P' pumps fluid into that discharge passageway 42A1, that the fluid so pumped is at or below 10,000 psi due to the simultaneous common pumping through the passageway 42C. The passageway 42B1 however, is blocked by the manifold seat 68 so that no fluid is pumped into it. Thus, with this particular manifold seat 68, the CAM 50' only pumps liquid into the discharge manifold 30 at the pre-selected pressure, that is in the illustrated example, 10,000 psi.

As shown in FIG. 18, the CAM 50" includes a passageway 67P''' and another passageway 67P'. The passageway 67P''' opens to the discharge valve outlet opening 42BO which is in fluid communication with the discharge manifold passageway 42B1 and its respective end. The passageway 42C1 of the discharge manifold, however, is closed off by the manifold seat 68" and therefore cannot receive fluid from the CAM 50". The respective passageways 42B1 and 42A1 are in fluid communication with the respective discharge outlets 42B' and 42A' of the end plate 40.

FIG. 19 illustrates a CAM 50''' configured to pump fluid from the system at up to 40,000 psi. As shown there, only a single passageway 42AO of the manifold seat 68''' is in fluid communication with the discharge manifold 30, and in particular, the passageway 42A1. The other passageways 42B1 and 42C1 are not in fluid communication and therefore cannot receive pumped fluid from the CAM 50'''.

Again, with the different configurations of the manifold seat and the dedicated passageways for each, the respective CAMs 50', 50", and 50''' can only pump liquid or fluid in a designated pressure range. In this manner, there is minimal operator error possible in mismatching internal working components, for example a seal cartridge assembly and/or a valve seat assembly of a CAM rated for different pressure ranges. In addition, each of the respective CAMs 50', 50", and 50''' can be outfitted with a pressure reading designation or a particular color to indicate their operating pressure range. As an example, the CAM 50' can be red, the CAM 50" can be blue, and the CAM 50''' can be white to designate the different pressure ranges at which the respective CAMs operate and thus the blasting equipment compatible with those CAMs. Further, the blasting equipment itself can include like-color designations to indicate their operating pressure to ensure that an operator matches the correct blasting equipment with the correct CAMs installed in the fluid system 10.

As explained above, the fluid end system 10 can include a discharge manifold configured so that the respective passageways that discharge manifold are rated for specific pressures and/or pressure ranges. Those passageways can be isolated from one another and selectively and independently placed in fluid communication with respective, appropriate passageways leading from the CAMs 50. Further, the discharge manifold 30 can be outfitted with a specialized mounting end plate which enhances safety and serviceability of the discharge manifold. As an example, with reference to FIGS. 20-22, the end plate 40 can be a relatively small and inconsequential part of the discharge manifold 30. It can be configured so it does not include the extensive internal passageways that the discharge manifold includes, nor does it interface directly with the CAMs when placed in the frame. Thus, the end plate 40 can serve as the main connection between the blasting equipment 11 and the fluid end system 10, as shown in FIG. 1, but can be readily and easily replaceable and/or removable. Many times, an operator inadvertently damages such connections, for example, threads in the end plate. In some cases, when chemical mixtures are pumped through the fluid end the discharge outlets 42A', 42B' and 42C' can become galled and otherwise unusable and unconnectable to the blasting equipment 11. With the specialized end plate 40, when damaged, it can simply be replaced by removing the fasteners 40F (FIG. 21) to disconnect the end plate 40 from the manifold 30. A new end plate can replace that worn or damaged end plate very quickly and the fasteners reattached.

The discharge manifold end plate 40 can include an end plate engagement surface 40R and an outwardly facing surface 40F. The engagement surface 40R generally is adjacent the end 31E of the discharge manifold 30 when the end plate 40 is secured with the fasteners 40F. These fasteners can be in the form of bolts, screws, or any other easily removable type of fastener. The end plate, as mentioned above, can include an end plate inlet 41 and multiple discharge outlets 42A', 42B', and 42C'. The end plate inlet 41 can be configured to transfer water from an external source through the inlet passageway 32 of the discharge manifold 31. The end plate inlet 41 can be configured with threads so that a nozzle or connector can be threaded into the inlet 41.

In addition, the discharge outlets 42A', 42B', and 42C' can likewise be threaded for independent and selective attachment to a conduit associated with the blasting equipment 11. The conduit can be any hose, line, tube or other structure capable of transferring pressurized fluid from the fluid end 10 to the blasting equipment 11.

Optionally, the end plate can come with a set of plugs 45A, 45B, and 45C which are configured to selectively plug one or more of the end plate discharge outlets 42A', 42B', and 42C' respectively. The plugs can be outfitted with threads that mate with corresponding threads on the interior, of the discharge outlets as mentioned above. In operation, for example where the fluid end is operating to generate liquid and transfer liquid to the blasting equipment at a pressure of up to 10,000 psi, the blasting equipment can be hooked up unitarily to the discharge outlet 42C'. The other two ports, 42A' and 42B' are plugged respectively by the plugs 45A and 45B. Thus, these other discharge outlets 42A' and 42B' of the end plate 40 do not come into play in providing pressurized fluid to the blasting equipment 11. With this construction, an operator can plug selected ones of the discharge outlets with respective plugs, and hook-up the blasting equipment to the remaining open discharge outlet to provide a desired pressure range of liquid to the blasting equipment. Generally the respective plugs, 45A, 45B and 45C are selectively disposable within the respective discharge outlet when selected ones of those discharge outlets are not in use and other ones are in use and coupled to blasting equipment operable in the respective pressure ranges.

As shown in FIGS. 21 and 22, the end plate 40 optionally can be outfitted with special safety features. Specifically, the end plate 40 can be configured so that separate, different, and independent failure rupture discs are uniquely associated with each of the respective discharge outlets 42A', 42B' and 42C'. Thus, the end plate 40 and generally the manifold 30 incorporate separate rupture discs for each pressure range of liquid conveyed there through simultaneously.

Optionally, the highest pressure rated passageway, for example 42A', is common to all pressure ranges and includes communication with all of the other passageways in the discharge manifold, the CAM, and the system in general. Further optionally, the first rupture disc 43A can be in fluid communication with all of the different discharge passageways of the discharge manifold during operation of the system under all different pressures at which the system may operate, however, the second and third rupture discs, 43B and 43C, may not be in fluid communication with those passageways. This is so that an associated secondary port 44A can be utilized with pressure setting or monitoring devices across all ranges of pressures. Such devices include but are not limited to pressure gauges, switches, bypass or throttling valves, or pressure relief valves. Unlike conventional designs, it is optionally unnecessary to change out or replace these devices in the conversion of a pump from one pressure range to another.

Returning to the separate independent and isolated rupture discs, reference is made to FIGS. 21 and 22. As shown there, the end plate 40 defines a secondary port 44A that is in fluid communication with the third discharge outlet 42A'. This communication can be effected provided via the accessory passageway 44A'. Although shown as a curved passageway, this passageway typically can be in the form of a straight line bore directly from the upper surface of the end plate to the discharge outlet 42A'. Likewise, the discharge outlet 42B', rated for a different pressure, and 42C', rated for yet a different pressure, are in fluid communication with secondary ports 43B and 43C via the accessory passageways 44B' and 44C' respectively. Although shown as projecting from specific top, bottom, or side surfaces of the end plate 40, these ports can be disposed on any of the respective surfaces of the end plate, provided they can be accessed and serviced. Each of the respective secondary ports can be in communication with respective discharge outlets including rupture discs operable to rupture when pressure of fluid, for example, liquid conveyed through the respective discharge outlets and the respective discharge passageways of the discharge manifold 30 exceeds a pre-selected pressure or pressure range.

The rupture discs 43A, 43B and 43C are generally rated for specific and different pressure ranges. When those pressure ranges are exceeded by fluid pressurized within the respective discharge outlets or discharge passageways, the rupture discs will fail so that fluid under the excess pressure within the discharge manifold, or the fluid end in general, is discharged through the accessory passageways 44A, 44B, and 44C. This relief of excess pressure can prevent that excess pressure from being relieved through other outlets, for example, the blasting equipment 11. This can prevent that blasting equipment from failing, and in some cases catastrophically failing, which could present risk of serious bodily injury or death to the operator of the equipment.

The rupture discs herein can be any conventional rupture disc structure, valve or other structure to relieve excess pressure within a conduit by rupturing or failing so that the fluid in the conduit escapes the system through the rupture disc. Again, although referred to as a rupture disc, this component can be any type of device, such as a pressure relief valve or other device capable of relieving pressurized fluid from a conduit or system at or exceeding a predetermined pressure or pressure range.

The first, second, and third rupture discs 43A, 43B, and 43C can be rated for a variety of different pressure ranges. For example, the first pressure disc can be rated for 40,000 psi, the second rupture disc 43B can be rated for 20,000 psi and the third rupture disc 43C can be rated for a pressure of 10,000 psi. Generally, the first rupture disc can be rated for failure at a higher pressure than the second and third rupture discs. The second rupture disc 43B can be rated to fail at a lower pressure range than the first disc 43A, yet a higher pressure than the third rupture disc 43C. The third rupture disc can be rated to fail at a pressure than both the first rupture disc 43A and 43B.

The rupture discs can be configured to relieve system pressure in the event of a continued or instantaneous exceeding of the fluid end system 10 maximum operating pressure, determined by the blasting equipment 11 and in part by the respective CAMs installed in the system.

Figures 23, 24:
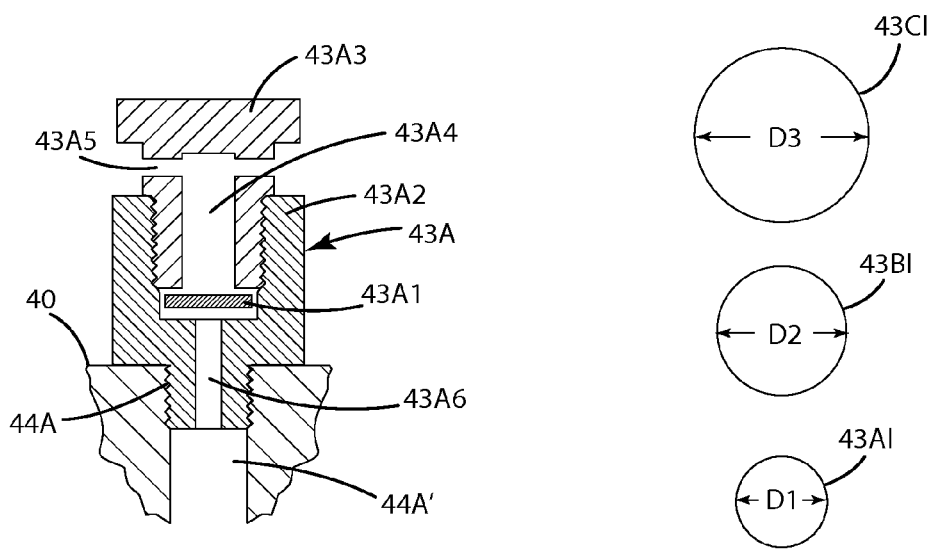
FIG. 23 is a section view of an optional rupture disc assembly.
FIG. 24 is a top view of visually different rupture discs for use with particular pressures.

With reference to FIG. 23, an exemplary rupture disc 43A can generally be in the form of a rupture disc assembly including several components, one of which is the physical disc-shaped rupture disc element 43A1. This rupture disc can be mounted within a base 43A2. The base can define a base passageway 43A6 that is in fluid communication with the accessory passageway 44A' so that fluid within the passageway 44A' is in direct contact with the rupture disc element 43A1. The base 43A2 can generally be in the form of a nut, or other manual or tool manipulable structure. The base can include threads and can be threaded into the end plate 40, and more particularly into the secondary port 44A. The rupture disc 43A also can include a relief discharge element which is shown in a form of an elongated hollowed bolt 43A3. The relief discharge element can define an internal bore 43A4 which is in fluid communication with relief ports 43A5. The relief element 43A3 is threaded into the base 43A2 to capture the rupture disc element 43A1 therein. When the rupture disc 43A1 ruptures, liquid or fluid can be conveyed through the internal bore 43A4 and out the respective relief ports 43A5.

Optionally, with further reference to FIG. 24, the rupture discs of the current embodiment can be differentiated from one another. For example, the rupture discs, and in particular the rupture disc elements, can be constructed so that they are of a different sizes, dimensions, shapes, colors, or other visually distinguishing characteristics. In FIG. 24, the first rupture disc element 43A1 is of a first diameter D1, the second rupture disc element 43B1 is of a second diameter D2, and the third rupture disc element 43C1 is of a third diameter D3. The three diameters can all be different. For example, diameter D1 can be less than D3 and D2. Diameter D2 can be greater than D1 and less than diameter D3. And diameter D3 can be greater than diameters D1 and D2.

These respective diameters D1, D2, D3 can be associated with rupture discs that are to be used only in specific pressure ranges. For example, diameter D1 can be associated with systems to operate at maximum pressures of about 40,000 psi. Thus, this rupture disc element 43A1 will be utilized in a rupture disc 43A and placed in fluid communication with a discharge manifold passageway and discharge outlet 43A' operating within that pressure range, that is, up to 40,000 psi. The second rupture disc element 43B1 with a diameter D2 can be specifically dedicated for use at a second different pressure range, for example, a lower pressure range such as 20,000 psi. Thus, the rupture disc element 43B1 can be utilized in the rupture disc 43B associated with the discharge manifold passageway and discharge outlet 43B' operating generally up to a maximum pressure of 20,000 psi. The rupture disc 43C can include a third rupture disc element 43C1 having a diameter D3. This rupture disc element 43C1 can be configured to fail at a third pressure, different from the first and second pressures with which the rupture disc element 43B1 and 43A1 are utilized, for example, at a lower pressure. As an example, this rupture disc element 43C1 can be configured to rupture when pressure exceeds 10,000 psi. Thus, this rupture disc element can be used in the rupture disc 43C and can be in fluid communication with the discharge outlet 42C' and thus the associated discharge outlet 42C of the discharge manifold. Although not shown, each of the rupture disc elements 43A1, 43B1, and 43C1 can be laser engraved, etched or specifically color coded to indicate the respective pressure range in addition to including a different diameter. The rupture disc elements 43A1, 43B1 and 43C1 and rupture discs in general can be sold and offered in kits so that the user can select a single kit that includes a rupture disc sufficient to operate the fluid end system 10 at a variety of different pressures and have replacement rupture discs on hand in the field when needed.

With reference to FIGS. 1, 25 and 26, the high pressure fluid end system 10 optionally can be equipped with a quick coupler assembly 90 to facilitate connection of a plunger 71 to a cross head stub 99. The cross head stub as mentioned above can be the cross head stub elements 99A, 99B, and 99C joined with a transmission 14 and are generally associated with the drive unit 13, as illustrated in FIG. 1. The cross head stub generally operates in a reciprocating manner and that motion is transferred to the plunger 71 of the seal cartridge assembly 70 of the CAM 50 to pump fluid at high pressures through the system 10. The quick coupler assembly 90 can be constructed so that it is manually operable without the use of tools to connect and disconnect the plunger 71 from the cross head stub 99. The quick coupler assembly 90 can include a male connection end 90A and a female connection end 90B. The male connection end 90A can generally include the plunger 71. The plunger 71 can be in the form of a cylindrical construction as mentioned above although other constructions and shapes are possible. At its end 71E, the plunger 71 can define an annular ring or recess 94 that extends at least partially around the circumference or outer boundary of the plunger 71. As shown in FIG. 26, the annular recess 94 is of a partially curved cross section. Although not shown, the annular recess can be replaced with an annular ring, in the form of a projection or ridge extending circumferentially around the end 71E of the plunger 71.

The female connection end 90B generally includes a coupler body 93, a sleeve 91 slidably mounted on the body 92 and retained on the body, and one or more retainer elements 93 disposed within the body and a spring 95. The sleeve as illustrated can generally be in the form of a cylindrical shape, however, other shapes such as polygonal, rounded, or otherwise can be implemented. The sleeve can also be knurled to enhance an operator's manual grip on the sleeve for operation thereof.

The body 92 can define a bore 92B which is sized to receive the plunger end 71. Thus, the male connection end 90A can be disposed within the female connection end 90B. The bore 92B includes a bottom 92C which generally faces, is contacting and/or adjacent the end 71E of the plunger 71. The body 92 also defines one or more apertures 92A. Within the apertures, the coupler retainer elements 93 are disposed. The apertures 92A can be in the form of small recesses. The coupler retainer elements 93 can be in the form of spheres or balls, for example, ball bearings located within the apertures 92 and selectively projecting inwardly and into and past the body bore 92B.

The sleeve 91 can include a grippable exterior surface so that it can be manually operated without the use of tools. The sleeve can be urged into the position shown in FIGS. 25 and 26 via the biasing element 95. The biasing element can generally be in the form of a coil spring mounted to urge the sleeve 91 to that position. In this position, the sleeve, and in particular a projection 91P extending within the sleeve, engages the retainer elements 93 and locks them within the apertures 92A so that they project into the interior cavity formed within the body bore 92B. When the plunger end 71E is placed within the bore 92B, those retainer elements 93 engage and are seated within the annular recess 94. Via this connection, the plunger 71 is effectively locked and secured in connection with the cross head stub 99.

To remove the cross head stub 99 from the plunger 71, the sleeve can be moved in direction DC to decouple those elements from one another. In so moving, the biasing element 95 is compressed and the projection 91P moves so that the retainer elements 93 no longer securely retain plunger end 71E in connection with the cross head stub 99. Accordingly, the cross head stub 99 and plunger 71 can be decoupled from one another. Generally the sleeve 91 can conceal and house the body, retainer elements and spring so that they are not subjected to the operating environment around the fluid end system.

The current embodiment of the high pressure fluid system 10 optionally can be equipped with a lubrication valve assembly 100. Generally, this lubrication valve assembly 100 can provide fluid communication between the inlet chamber 81 of the inlet manifold 80 and the packing 72, the plunger 71, and in general the seal cartridge assembly 70. By lubrication, it is meant that the fluid within that inlet chamber, such as water, can be transferred to the packing 72 and the plunger 71 to provide some cooling and/or general reduction of heat buildup within the plunger 71 and/or generally within the seal cartridge assembly. In some cases, the liquid can also provide lubrication between the moving elements, the packing and other components.

Returning to FIGS. 2, 3, and 5-8, the lubrication valve assembly 100 generally is in fluid communication with a port 100P that leads to the inlet chamber 81 of the CAM 50. The port 100P is in fluid communication with a metering valve 102. The metering valve as shown in FIG. 7 includes an end 102E that is adjustable between position P1 and P2 so that the port can be selectively placed in and taken out of fluid communication with the inlet manifold lubrication passageway 104. For example, in position P1, the valve 102 effectively closes off the port 100P from fluid communication with the inlet manifold lubrication passageway 104. In position P2, the valve 102 and the respective end 102E, are moved sufficiently to establish fluid communication through the port 100P to the inlet manifold lubrication passageway 104. Thus, liquid or fluid within the manifold chamber 81 can be transferred to the inlet manifold lubrication passageway 104.

As shown in FIG. 7, the inlet valve 102 can be slidably and/or reciprocally received within a bore 100B defined by the inlet manifold 80. The bore 100B can be stepped to receive the valve 102 and can extend upwardly to the upper or top surface 80T of the inlet manifold 80. The valve 102 can be joined with an actuator 103. The actuator 103 can be in the form of a knurled post as shown in FIG. 5 extending upwardly and out of the top surface 80T of the inlet manifold 80. If desired, the actuator 103 can include a fastener 103F that fastens the actuator to the valve. The actuator 103 can be manually graspable by user so that the user can rotate the actuator 103 in direction V or in a counter direction. By this rotation, the valve 102 is reciprocally moved within the bore 100B to open and close or otherwise establish and eliminate fluid communication in the chamber 81 and the inlet manifold lubrication passageway 104. Generally, an operator can adjust the actuator 103 to meter a flow of fluid from the inlet manifold to the seal cartridge packing assembly and plunger of the seal cartridge 70 so that the seal cartridge packing assembly and plunger in general can be lubricated by the fluid in the inlet chamber 81.

The adjuster and generally the lubrication valve assembly can be located on top of the intake manifold 80. Again as illustrated and described above, the actuator 103 projects from the top surface 80T of the inlet manifold, out the top of the CAM 50. The lubrication valve assembly also can include a lubrication conduit 107 that is joined with the inlet manifold passageway 104 via a fitting 107F. The fitting can be a general fitting adapted to join a conduit and a passageway. The lubrication conduit 107 extends across an exterior 70E of the seal cartridge assembly 70 as shown in FIG. 8. The lubrication conduit 107 is generally located below and directly under the handle 53 when the handle is in the closed mode shown in FIG. 8. The lubrication conduit 107 can be constructed from a clear material, such as a clear plastic or polymeric material. In this manner, fluid flowing through the lubrication conduit can be directly viewed by an operator. The operator can effectively adjust flow through the valve assembly 100 with the actuator manipulating the actuator 103F and simultaneously viewing the flow through the lubrication conduit 107. This manipulation can occur generally while the handle is in the configuration in FIG. 2. The conduit 107 can be sufficiently placed below the handle so that it is not inadvertently tugged or pulled on when the handle 53 is manipulated.

The lubrication valve assembly 100 can be in further fluid communication with the lubrication passageway 73L of the seal cartridge assembly 70. Generally, that lubrication conduit 107 can be joined with the seal cartridge body 73 via a fitting 107F. The fitting 107F' can generally be referred to as a seal cartridge assembly fitting 107F'. As shown in FIGS. 3 and 8, the lubrication passageway 73L can extend from near the fitting 107F to the retainer passageway 26P, through the body 73 of the seal cartridge assembly. The lubrication passageway 73L can be aligned with, parallel to and in the same plane as the longitudinal axis LA of the CAM 50. Of course, it can be offset from that axis or located in different positions depending on the particular application.

Optionally, the lubrication conduit can be located in the vertical space between the handle 53 and the seal cartridge assembly 70. In this location the conduit can be protected from unintentional dislodgement from the vertical space. Further, with the lubrication conduit not extending above the CAM, it is not outside the loading opening 21, and thus can be secured from dislodgement.

In operation, the lubrication valve assembly 100 can be actuated via the actuator 103, optionally manually and without the use of tools. The lubrication valve assembly can establish fluid communication between the inlet port 100P and the lubrication conduit 107, lubrication passageway 73L and retainer passage 26P, so that fluid can flow generally from the inlet chamber 81 to the plunger 71 and packing assembly 72, generally lubricating these components. While making this adjustment to the adjustor 103, the operator can view the fluid flowing through the lubrication conduit 107 and make the adjustment accordingly.

First Alternative Embodiment

A first alternative embodiment of the high pressure fluid end system with its components is shown in FIGS. 27-41 and generally designated 110. This fluid end is similar and/or identical in structure, function and components to the embodiment described above with several exceptions. For example, the fluid end system 110 includes a frame 120 to which a discharge manifold 130 is joined or monolithically formed therewith. The discharge manifold alternatively can be bolted on with a series of bolts able to withstand the extreme pressures at which the fluid end system operates.

Figure 29:
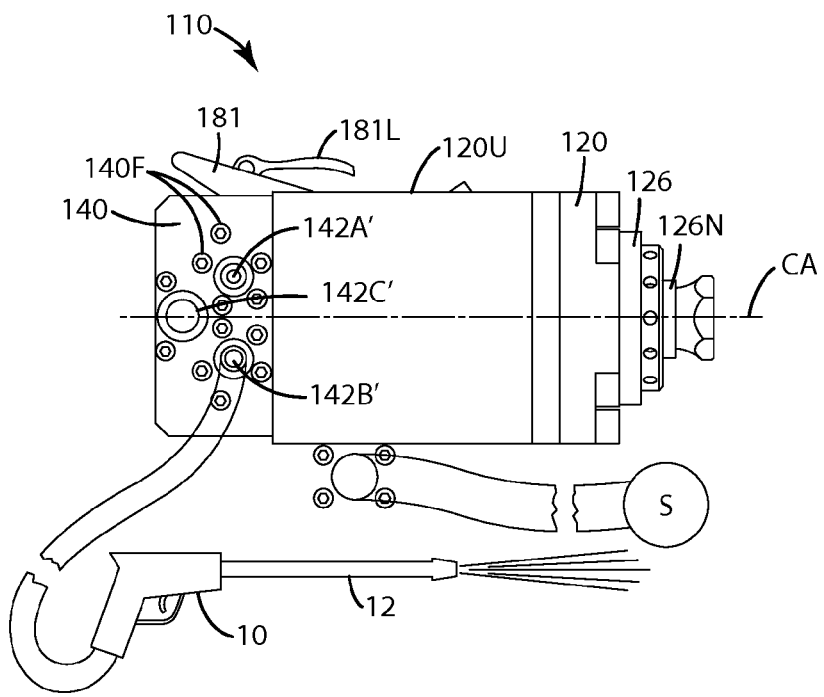
FIG. 29 is a side view of the fluid end system of the first alternative embodiment.

Like the embodiment above, the fluid end system can 110 be configured for attachment to a drive unit via a transmission and multiple cross head stubs (not shown). The fluid end system 110 also is configured for attachment to blasting equipment 10, for example, a spray gun having a nozzle 12 for shooting liquid at high pressures as shown in FIG. 29. This blasting equipment, as mentioned in the embodiment above, can be specifically rated for different pressures, for example, some can be rated for a maximum of 10,000 psi, some can be rated for a maximum of 20,000 psi and others can be rated for a maximum of 40,000 psi. Of course, the blasting equipment can be rated for other incremental ranges depending on the particular application.

The fluid end system 10 also can include multiple cartridge assembly modules (CAMs) 150. These CAMs are in the form of a single piece unit or cartridge having two primary components, specifically, a valve seat assembly 160 and a seal cartridge 170 securely fastened to or joined with one another so that when a user moves either the valve seat assembly or the seal cartridge, the other component moves along with it simultaneously. The valve seat assembly 160 and seal cartridge 170 can be similar to the valve seat and seal cartridge described in the embodiment above with several exceptions as explained further below. The single piece cartridge assembly module including the valve seat assembly and seal cartridge is selectively removable from the fluid end frame 120 without removal of the discharge manifold 130 associated with the frame. As with the embodiment above, the discharge manifold can be left intact and secured to the fluid end frame 120 as the CAM 150 is removed, replaced and/or serviced from the fluid end system 110.

Figure 27:
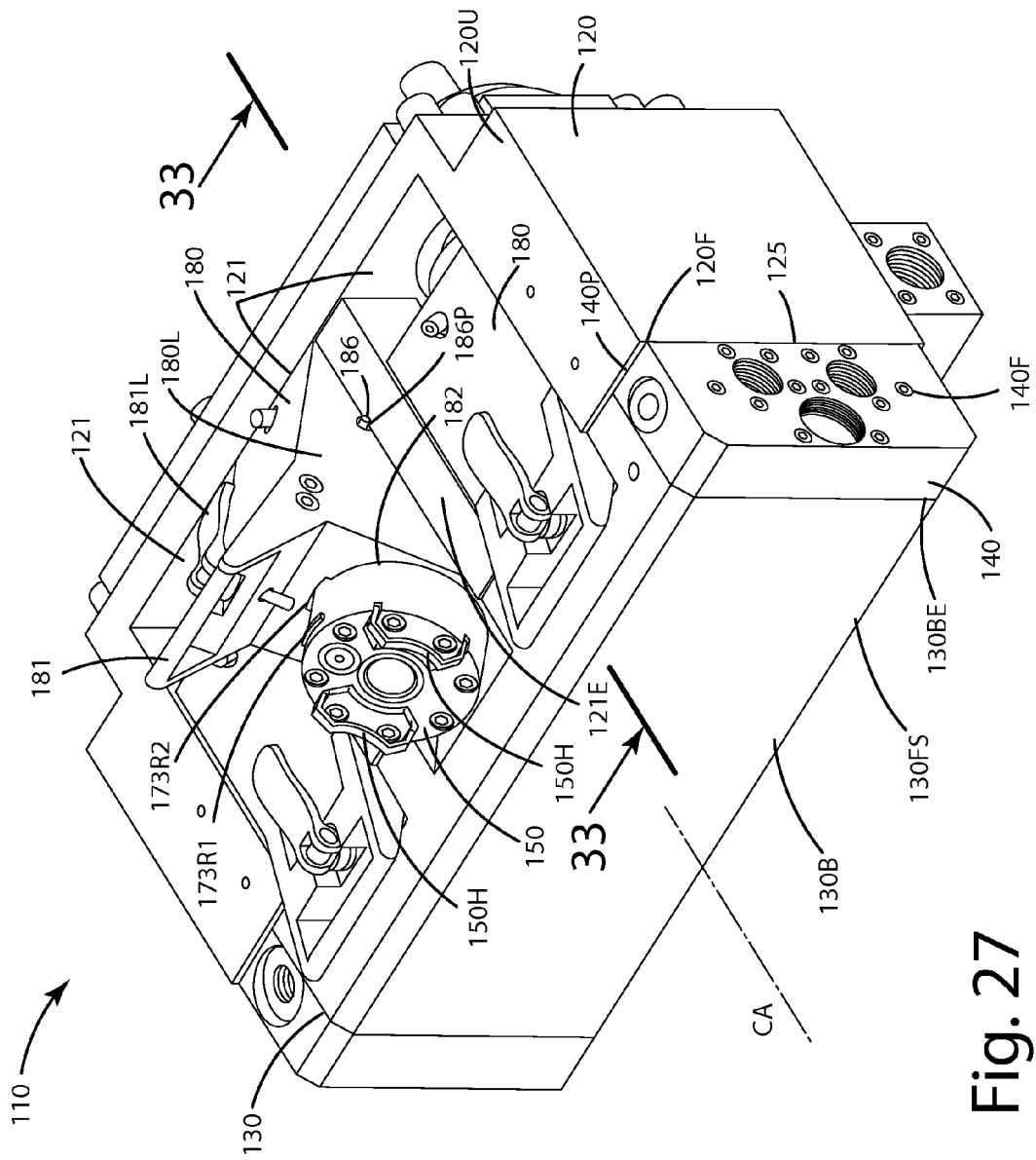
FIG. 27 is front perspective view of a fluid end system including multiple installed CAMs of a first alternative embodiment.

The fluid end frame 110 defines one or more loading openings 121 which are sized and adapted to accommodate respective mounting housings 121. The loading openings 121 can be occupied at least in part by mounting housings 180. Of course, there can be any multiple of loading openings and mounting housings associated with the frame. As shown in FIG. 27, there are three, but of course, there may be four, five or more or fewer depending on the particular application. Generally, the mounting housings 180 are configured to define a loading chamber 182 within which the cartridge assembly module 150 is removably and replaceably disposed. Accordingly, the loading chamber also is moveable relative to the frame 120 and discharge manifold 130 to provide access to the cartridge assembly module 150 therein. The loading chamber optionally can be slidable and/or tiltable; pivotable about an axis.

The fluid end system 110 can be configured with end plates 140 which are similar to the end plates of the embodiments above and therefore will not be described in significant detail again here. Suffice it to say that the end plates 140 can be joined with a main body 130B of the discharge manifold 130 so that a plurality of discharge outlets defined by the end plate 140 can align with a plurality of corresponding discharge passageways defined by the discharge manifold. The main body 130B can define ends 130BE. The ends can be disposed on opposite sides of a central axis CA of the discharge manifold, which generally bisects the manifold into equal sized left and right parts, and upper and lower parts as shown in FIGS. 27-39. The ends can be joined with fasteners directly to the end plates 130.

Figure 33:
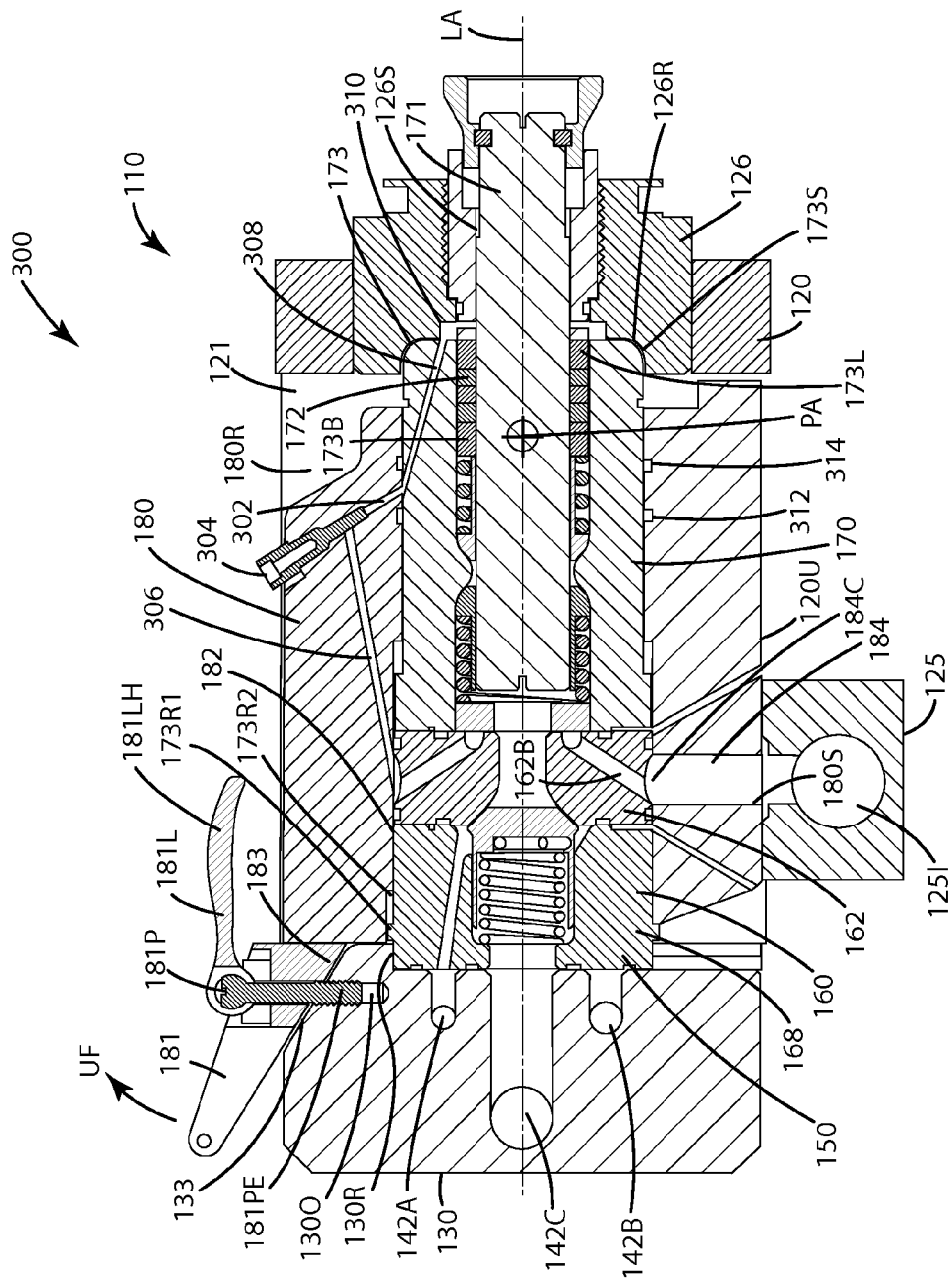
FIG. 33 is a cross section view of the fluid end system of the first alternative embodiment illustrating the internal components of the CAM, the mounting housing, the discharge manifold and the inlet manifold.

Like the embodiment above, the discharge manifold 130 can define, as shown in FIG. 33, a first discharge passageway 142C, a second discharge passageway 142B and a third discharge passageway 142A. These passageways are configured and sized to enable fluid or liquids forcibly expelled from valve discharge inlets of the CAMs 150 to enter the discharge manifold 130 under high pressure for conveyance out to blasting equipment. Optionally, none of these discharge passageways, nor the discharge manifold, supplies fluid into the CAMs from a supply of fluid or liquid.

Figure 36:
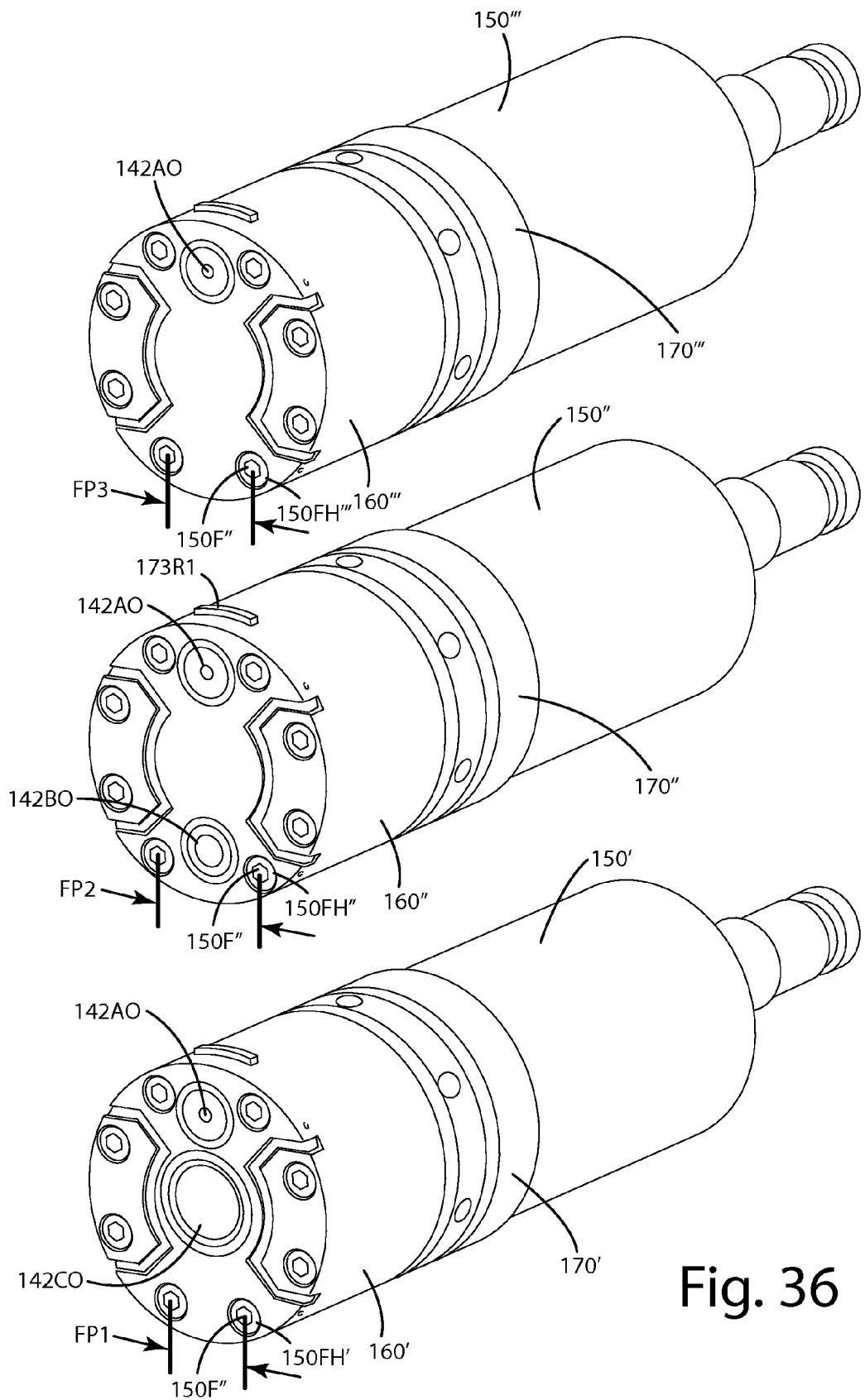
FIG. 36 is a perspective end view of different pressure rated single piece cartridges for use with the fluid end system of the first alternative embodiment.
Figure 37:
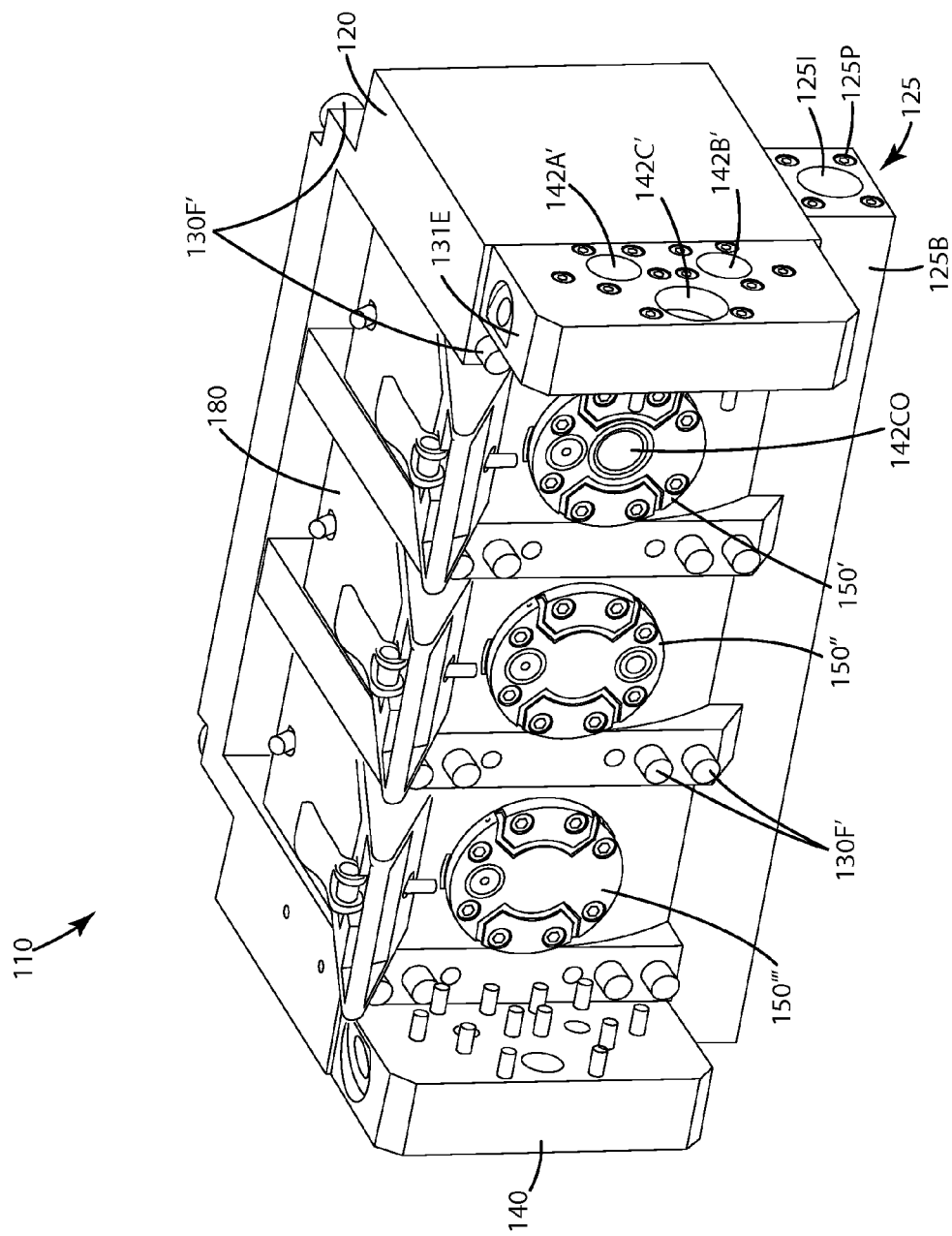
FIG. 37 is a perspective view of the fluid end system of the first alternative embodiment with the discharge manifold removed from the system to illustrate the different pressure rated single piece cartridges installed in different mounting housings.
Figure 38:
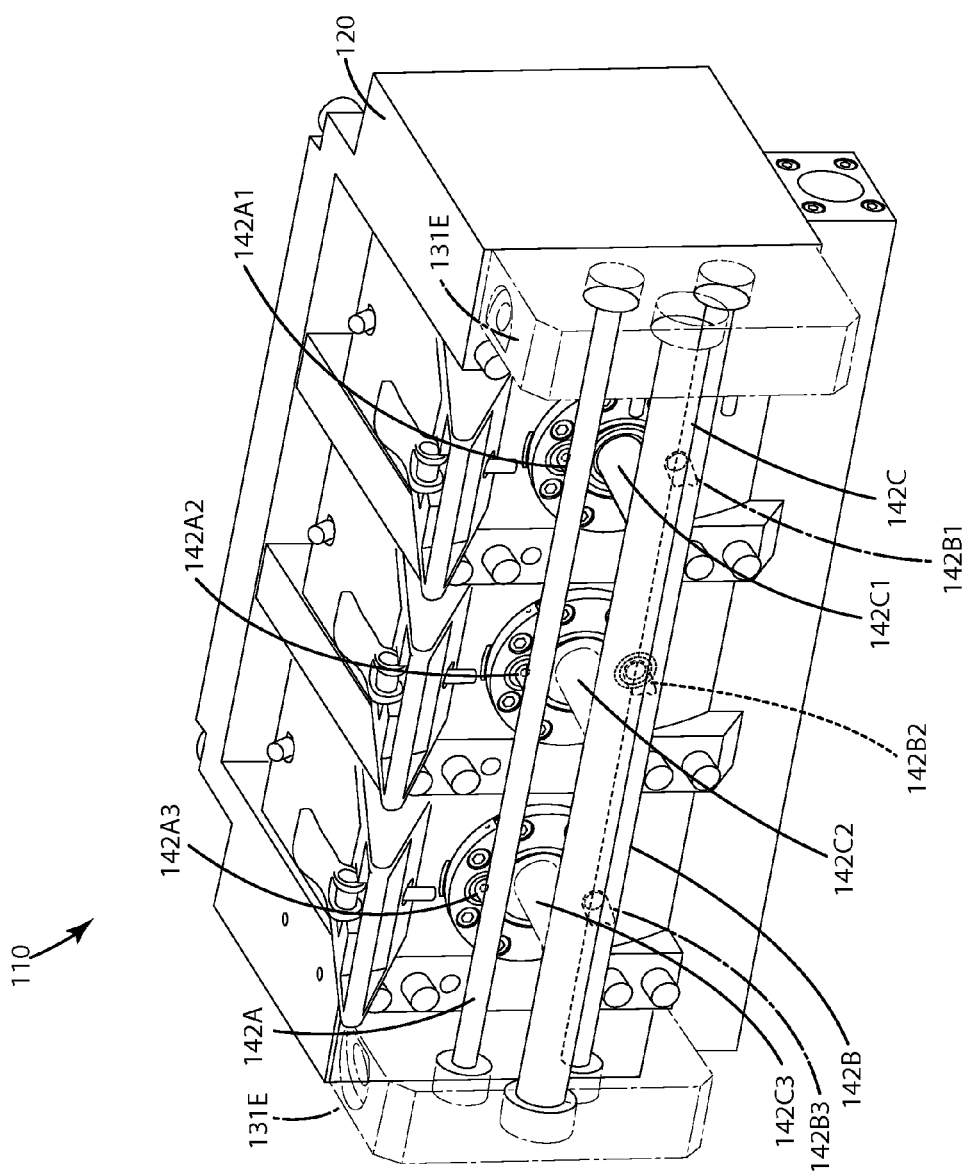
FIG. 38 is a partial view of the different internal discharge passageways of a discharge manifold isolated from one another in the first alternative embodiment of the fluid end system.
Figure 42:
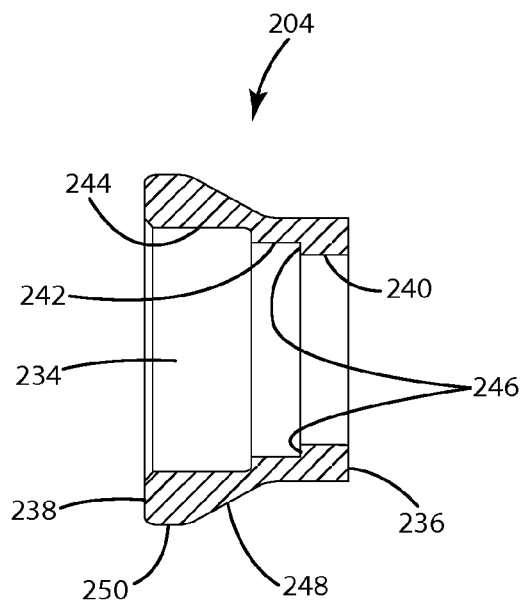
FIG. 42 is a section view of the quick connect retention nut.
Figure 43:
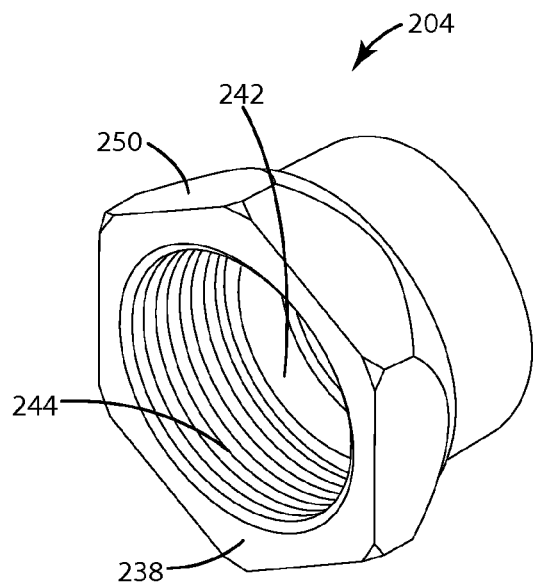
FIG. 43 is a perspective view of the quick connect retention nut.

The first passageway can be designed for a first pressure range of liquid or fluid conveyed there through. As an example, the first discharge passageway 142C can be configured to convey and can be rated for up to 10,000 psi liquid flow therethrough. The first passageway 142C can terminate at one or more first discharge passageway ends 142C1, 142C2, and 142C3, as shown in FIG. 38. Such discharge passageway ends are adapted for placement adjacent a discharge valve outlet 142CO as shown in FIGS. 36-38. This discharge valve outlet 142CO can be defined by the respective 10,000 psi pressure rated CAM as described in the current embodiment above. The ends 142C1, 142C2, and 142C3 can be aligned with and project toward loading openings of the frame so that when the respective CAMs 150' (FIGS. 36, 37) associated with the 10,000 psi pressure range are installed, the respective CAM 150' discharge valve outlets 142CO align with the ends 142C1, 142C2, and 142C3 so that fluid expelled from the discharge valve outlet, generally from the CAM 150' can enter into the discharge passageway 142C under pressure and can be conveyed to the respective attached blasting equipment which is operable at pressures up to 10,000 psi, or some other applicable pressure rating.

The discharge manifold 130 can define a second discharge passageway 142B. The second discharge passageway 142B can be different from the first discharge passageway 142C and can include a cross section different from the first cross section. Optionally, the second cross section can be smaller than the first cross section. As a further example, the diameter of the respective passageway 142B can be smaller than a diameter of the first passageway 142C. The second passageway 142B can be rated for a second pressure range of fluid conveyed there through. The second pressure range can be greater than the first pressure range of the first passageway. As an example, the second discharge passageway 142B can be configured to convey and can be rated for up to 20,000 psi liquid flow there through. The second passageway 142B can terminate at one or more discharge passageway ends 142B1, 142B2 and 142B3. Such discharge passageway ends can be adapted for placement adjacent a discharge valve outlet 142BO as shown in FIGS. 36-38. This discharge outlet 142BO can be defined by the respective CAM 150" as described further below.

Optionally, the ends 142B1, 142B2 and 142B3 are aligned with and project toward loading openings 121 so that when the respective CAM 150" (all associated with the maximum 20,000 psi pressure range) are installed, the CAM discharge valve outlet 42BO aligns with the ends so that fluid forcibly expelled from the discharge valve outlet from the CAM 150" can enter the discharge passageway 142B under pressure and can be conveyed to the respective attached blasting equipment which is operable at pressures up to 20,000 psi.

The discharge manifold 130 can define a third discharge passageway 142A. This third passageway 142A can be different from the first and second passageways. For example, it can include a third cross section different from the first cross section and the second cross section. Optionally, the third cross section can be smaller than the first cross section and the second cross section. As a further example, the diameter of the respective passageway 142A can be smaller than the diameter of the first passageway 142C and the diameter of the second passageway 142B. The third passageway 142A can be rated for a third pressure range of fluid conveyed there through. This third pressure range can be greater than the pressure rating or capacity of the first passageway, and greater than the second pressure rating of the second passageway. In this embodiment, the third discharge passageway 142A can be configured to convey and can be rated for up to 40,000 psi liquid flow therethrough.

The third passageway 142A can terminate at one or more third discharge passageway ends 142A1, 142A2, 142A3. Such passageway ends are adapted for placement adjacent the discharge valve outlet 142AO of CAM 150" as shown in FIG. 36, where such CAM is loaded in the loading chambers of the fluid end 110. This discharge valve outlet 142AO can be defined by the respective CAM 150'", and optionally, the second discharge valve outlet 142AO on the other pressure rated CAM 150" and/or the outlet 142AO on the first CAM 150'. Optionally, all of these discharge valve outlets 142AO of all the different pressure rated CAMs can be in communication with the third discharge passageway 142A. In this manner, the highest pressure rated passageway, for example, the third discharge passageway 142A, optionally can always be in communication with the other passageways of different pressure ratings. In this manner, this third passageway 142A can be utilized and connected to monitoring devices such as those described above in connection with the current embodiment, regardless of the pressure at which the system is operating. Because this is rated at the highest pressure rating passageway, the equipment can be operated safely.

Further optionally, the ends 142A1, 142A2, 142A3 can be aligned with and project toward a loading openings 121 so that when the respective CAM 150" (associated with the 40,000 psi pressure range) are installed, the CAM discharge valve outlet 142AO (FIGS. 36-38) aligns with the ends 142A1, 142A2, 142A3 so that fluid forcibly expelled from the discharge valve outlet and generally through the CAM 150' can enter the discharge passageway 142A and can be conveyed out to the respective blasting equipment, which is safely operable at pressures up to 40,000 psi. Again, the above pressure range ratings are selected depending on the particular application. They may vary considerably from those noted above, and can be extended to higher or lower pressure ratings.

As shown in some of the figures, for example, FIGS. 37-38, all three different pressure rated CAMs 150', 150" and 150'" as well as in the current embodiment above, are illustrated as being installed in the frame. In normal use, this would not be the case. As explained in the embodiment above, typically when the CAMs 150', 150" and 150'" are installed in the respective loading openings and loading chambers in the monitoring hardship 180 in the frame, the operator will install all of the same pressure rated CAM assemblies therein. For example, all three installed will be either the CAM 150', or the CAM 150" or the CAM 150'". In this manner, all of the CAMs are matched with the same pressure rating for use with similarly rated blasting equipment.

Optionally, the different discharge valve outlets 142AO, 142BO and 142CO can all be color coded so that a user can readily distinguish CAMs 150', 150" and 150'" rated for the different pressure ratings, and can install all similar CAMs in the frame at the same time to avoid lower pressure output errors. The first, second and third passageways 142C, 142B and 142A can lead to and terminate at the ends 131E of the discharge manifold distal from the respective discharge passageway ends as described above. Where they terminate at the end 131E of the discharge manifold 130 (which can be either both ends of the discharge manifold), the discharge passageways can terminate at ports aligned with respective discharge outlets 142A', 142B', 142C' to establish fluid communication between these elements and thus between the discharge manifold and the respective blasting equipment ports.

As with the current embodiment above, throughout the discharge manifold 130, each of the respective first, second and third discharge passageways can be fluidly isolated from one another, that is, fluid communication is not established between the respective passageways. Further optionally, fluid within one of the passageways does not enter into any of the other passageways when the fluid end is in operation or use. This can isolate the pressure associated with each of the fluids being conveyed to the respective first, second and/or third passageways. Thus, within the discharge manifold, fluids being pumped at certain pressures are not inadvertently routed to a mismatched rupture disc of the discharge manifold or end plate. However, as mentioned above, the highest pressure rated passageway can be associated with one or more of the other passageways, optionally both of them, so as to provide a way to associate monitoring devices with the discharge manifold similar to those described above in connection with the current embodiment.

Optionally, the fluid end system can include a discharge manifold including multiple isolated discharge passageways that are configured to convey fluid pumped with CAMs operating at a variety of different pressure ranges. To promote safe operation within a pressure range, the discharge manifold 130 and/or associated end plates 140 can include multiple pressure rupture disks as explained in connection with the current embodiment above. The construction of these end plates and discharge manifolds and rupture disks 10 similar to that of the embodiment above, and will only be described briefly here. The end plates 140, or optionally a portion of the discharge manifold, can include various discharge outlets 142A', 142B', 142C' associated with the discharge passageways 142A, 142B, 142C of different operating pressures, for example, 10,000 psi, 20,000 psi and 40,000 psi.

Each of these discharge outlets can be in further communication with secondary ports that exit to the environment. These secondary ports can be defined by portions of the discharge manifold and/or the end plates. Each of the secondary ports has included within it a rupture disk that is specifically rated for a matching discharge passageway pressure capacity or range. As an example, a 40,000 psi rupture disk is associated with a secondary port that is in fluid communication with the 40,000 psi discharge passageway and/or outlet 142A; a 20,000 psi rupture disk and a 10,000 rupture disk are in fluid communication with the 20,000 psi discharge outlet 142B and the 10,000 psi pressure outlet passageway 142C, respectively. With a specific rupture disk dedicated to each discharge outlet and discharge passageway at each respective pressure simultaneously and individually, no matter what pressure fluid is output through the discharge manifold in the respective passageways and outlets, the correct rupture disk in always in fluid communication with the fluid under that particular pressure. Thus, the system always can operate at a safe pressure. If pressure in the discharge manifold exceeds whatever pressure the rupture disks are rated for, the system ruptures the disk and prevents unsafe operating pressures of associated blasting equipment that is coupled to the discharge manifold.

Figure 28:
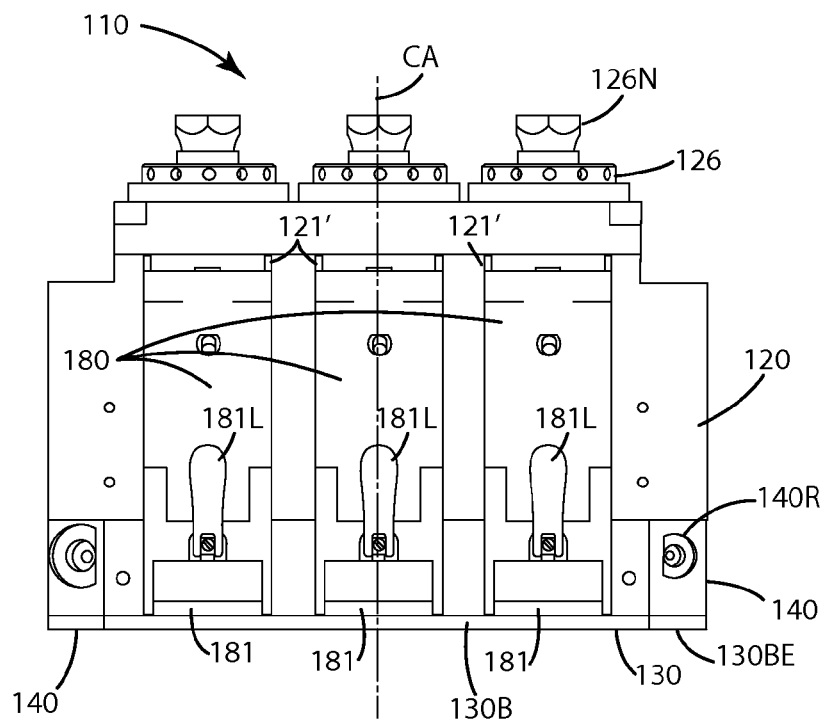
FIG. 28 is a top plan view of the CAMs installed in loading openings of the frame of the first alternative embodiment.
Figure 30:
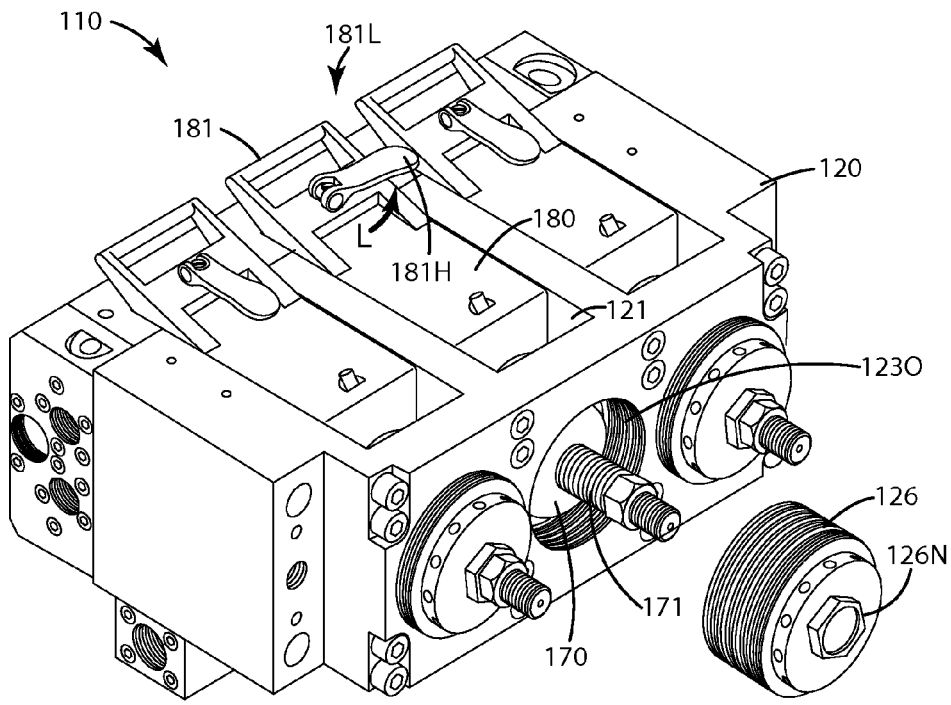
FIG. 30 is an upper perspective view of a retaining element being removed for replacement or servicing of a CAM of the first alternative embodiment.

Returning to FIG. 27, the fluid end system 110 includes the frame 120 as mentioned above. This frame can be similar and can include the same components, structure and function as the current embodiment described above. One exception, however, is the addition of one or more mounting housings 180 movably disposed in the loading openings 121 as shown in FIGS. 27 and 28. Generally, the mounting housings can include a handle 181 and a latch 181L. The handle can project upwardly, away from the uppermost surface 120U of the frame 120 as shown in FIG. 29. This handle can be readily graspable by a user to move the mounting housing 180 from a closed position. As shown in FIG. 30 to an open position, as shown in the middle loading opening illustrated in FIGS. 27 and 31, so that the CAM 50 of the fluid end system 10 can be removed, serviced or replaced relative to the fluid end system 110.

Figure 31:
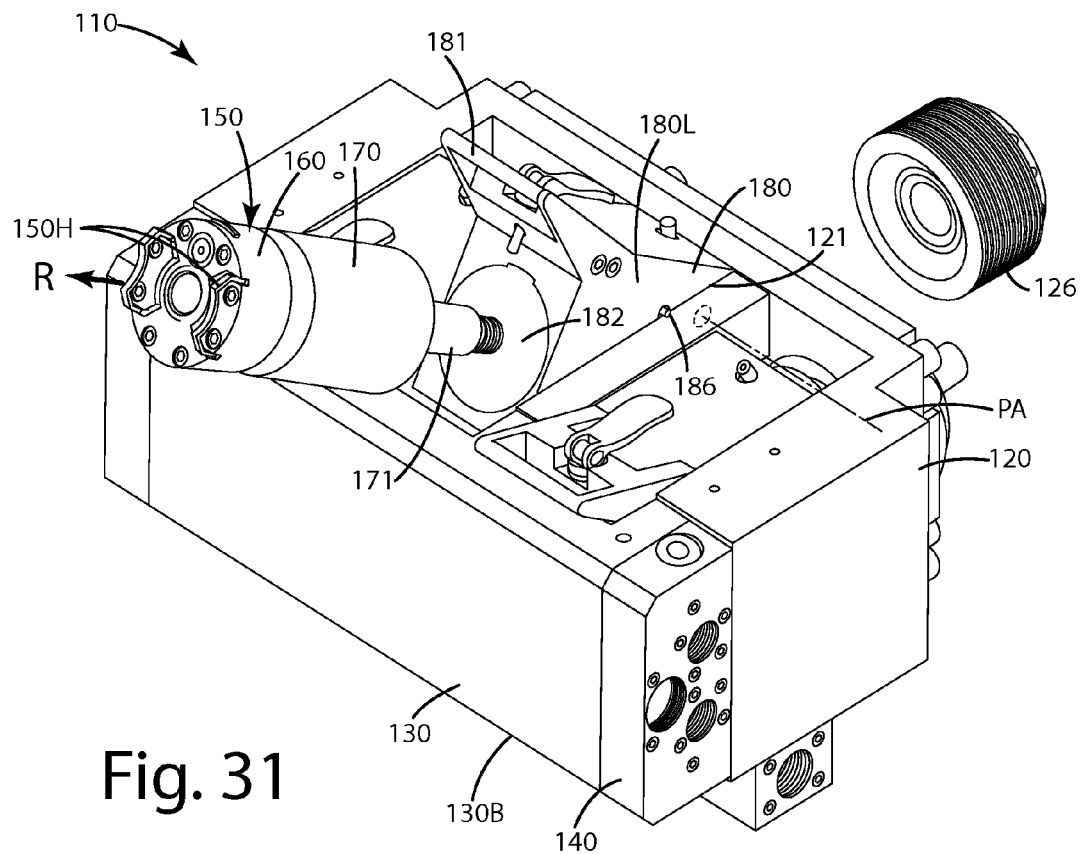
FIG. 31 is a perspective view of a CAM being removed from a moveable mounting housing disposed within the fluid end system of the first alternative embodiment.

Optionally, the mounting housing 185 can be configured to rotate above a pivot axis PA as shown in FIG. 33. Although shown with a pivot axis apparently associated with the plunger 171 of the seal cartridge 170, there this pivot axis PA is actually a bore, pin or bolt defined by or extending from a lateral side 180L of the mounting housing 180 as shown in FIGS. 27 and 31. The frame can define a corresponding hole, pin or bolt to provide a desired pivoting action, rotation or tilting of the mounting housing 180 above the pivot axis PA. Of course, although described in connection with a pivoting action, the mounting housing can be otherwise moveably mounted in the loading opening 121. For example, the mounting housing can be slidably mounted within a loading opening 121 so that it can be pulled upward, sliding or moving away from the central axis CA and removed from the loading opening 121 and/or frame 120.

Optionally, the system can be configured so that the longitudinal axis LA of the CAM 150 is generally aligned with a central axis CA (FIG. 29) of the respective loading opening and/or frame when the CAM is fully loaded in the opening. Removing the CAM 150 from the loading opening, the longitudinal axis LA can be angled, tilted or moved relative to the central axis CA, instead of being moved along and in parallel to that central axis CA. In such removal, the longitudinal axis LA of the CAM 150 becomes angled and nonparallel to the central axis CA.

As shown in FIGS. 27 and 33, the housing 180 also can include a latch 181L. This latch can include a handle 181LH. The handle can be pivotally joined with an operating pin 181P. The operating pin 181P can include threads at the end 181PE thereof that engage an opening 130O defined by the discharge manifold 130. Optionally, the threads can include a partial thread configuration so that upon rotation of the latch handle 181LH through an angle L, for example 90° as shown in FIG. 30, the threads at the end 181PE disengage the corresponding threads in the opening 130O. A user can then apply upward force UF to the handle 181 as shown in FIG. 33 and lift the mounting housing 180 from the closed position shown in FIG. 33 to the open position shown in FIG. 27 to provide access to the CAM 150. Closing of the housing to the closed position in FIG. 33, as well as locking of the latch 181L, can be the reverse process from that described above.

Optionally, the latch and pin closure construction above can be replaced with other mechanisms. For example, the mounting housing can include a simple bolt that threads into an opening in the frame or discharge manifold. Alternatively, a movable, rigid bar can be placed across the tops of all CAMs to hold them in the closed position. Other mechanisms are also contemplated.

The mounting housing 180 can define a land 183. This land can engage the corresponding land 133 of the discharge manifold 130 in a precise manner so as to properly place the mounting housing 180 in the closed position as shown in FIG. 33. The interaction of the lands can also precisely align the respective discharge valve outlets of the CAM 150 with the discharge passageways of the discharge manifold 130.

The mounting housing 180 can also define a mounting housing clearance recess 180R that is disposed generally toward the rearward portion of the frame 120. This recess 180R can provide the mounting housing 180 the appropriate clearance relative to the frame and loading opening so that the mounting housing can be pivoted to an open position as shown in FIGS. 27 and 31, without the rear portion of the mounting housing 180 interfering with the opening or frame.

As shown in FIG. 27, the mounting housing 180 optionally can include an open lock 186. This open lock 186 can be in the form of a plunger 186P mounted in an aperture defined by the mounting housing 180. The plunger can be associated with a biasing member, such as a spring (not shown) that biases the plunger 186P to an extended position, extending outwardly from the lateral side 180L of the housing 180 after the plunger 186P clears an upper edge 121E of the frame 120. Upon extension, the plunger 186P can engage the upper edge 121E and hold the mounting housing 180 in the open position as shown in FIGS. 27 and 31. This can enable the operator to remove the CAM 150 without having to manually hold the housing open.

As shown in FIG. 33, the mounting housing 180 can define a mounting housing fluid inlet passageway 184. This mounting housing inlet passageway 184 generally extends from the valve seat assembly 160 of the CAM 150. The mounting housing inlet passageway 184 can be an inlet passageway that provides fluid communication from a supply of fluid S shown in FIG. 29 to the inlet manifold 125 joined with the underside 120U of the frame 120. This mounting housing inlet passageway 184 can be in fluid communication with the plenum 162 of the valve seat assembly and the respective ports therein. In this location, the inlet passageway 184 can be in sealed communication with the inlet 125I of the inlet manifold 125 via a system of seals 180S optionally in the form of O rings that are disposed around the passageways where the components are mated to one another. The discharge end 184E of the inlet passageway 184 can be in direct fluid communication with the ports in passageways 162P in the plenum 162. Additional seals can be disposed adjacent the plenum and the discharge end 184E of the passageway 184 to provide sealed fluid communication between the passageway 184 and the port 162P.

Although shown with the passageway 184 being defined on the lower portion or underside of the mounting housing, this passageway 184 can be defined elsewhere depending on the particular application. For example, it can be mounted atop the frame, more toward the rear of the frame, or the front of the frame. Further optionally, although shown as a separate inlet manifold 125, this manifold 125 can be associated with the discharge manifold 130, with the mounting housing 180 defining an appropriate inlet passageway to establish fluid communication between the supply and the valve seat assembly 160 to provide a source of fluid or liquid to the CAM 150.

Figure 32:
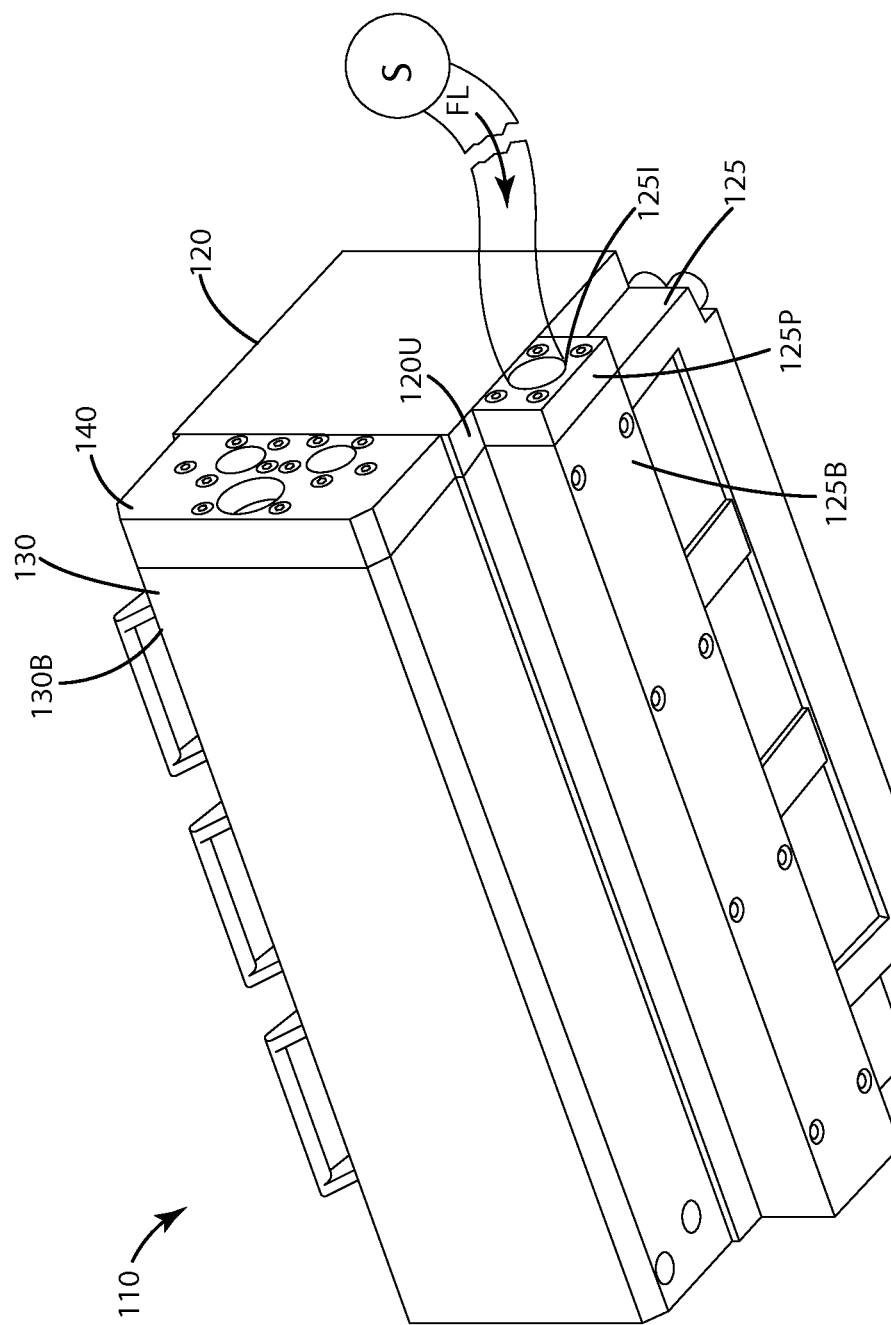
FIG. 32 is a lower perspective view of an inlet manifold disposed on a lower portion of a frame of the fluid end system of the first alternative embodiment.

As shown in FIGS. 27, 32 and 33, the inlet manifold 125 is separate and distal from the discharge manifold 130. The discharge manifold 130 is attached to the forward face of the frame 120 while the inlet manifold is associated with the underside 120U of the frame 120. The inlet manifold 125 can include a connector that joins a fluid line FL with a source of fluid. Optionally, the end plate 125P can be threaded and the fluid line FL can include a fitting that threads into the end plate. The end plate 125P can be removably and replaceably fastened to the main body 125B so that if the threads are ever stripped, galled or damaged this component can be replaced easily and quickly as shown in FIG. 32.

The mounting housing 180 is configured so that after the CAM 150 is installed, it can be closed to the closed position shown in FIG. 33. In this closed position, as the retainer element 126 is installed, all inlet, discharge and optional seal cartridge lubrication connections are made automatically. In turn, the fluid end 110 includes fewer components and costs less while being faster and easier to convert and change out CAMs of different operating pressures with minimal or no use of hand tools.

The end plate 140 as shown in FIGS. 27-30 and 37 can be similar or identical to the end plate 40 described above and therefore will not be described again in detail here. Suffice it to say that the end plate is easily removable and readily replaceable so that if the connections at the respective ports 142A', 142C', 142B' become worn, stripped and/or galled, the end plate 140 can be replaced quickly and easily by removing the respective fasteners, without removing the entire discharge manifold 130. This can make a previously laborious task (changing the entire discharge manifold) easy, particularly where blasting equipment is repeatedly being removed and replaced relative to the connection elements and end plate, which subjects those components to wear and stripping.

Optionally, the end plate 140 can be disposed within an end plate recess 140P as shown in FIGS. 27 and 28. This recess can be formed by an end 130BE of the manifold body 130B and a forward or front portion of the frame 120F. These two elements can generally come together at a right angle. The end plate 140 can be disposed within that recess 140P. Optionally, the end plate 140 is directly fastened with fasteners 140F. These fasteners can be threaded into corresponding thread holes defined by the main body 130B of the discharge manifold 130. With the end plates 140 associated with the main body 130B, the discharge manifold can be considered multicomponent, with the end plates being replaceable and removable relative to the main body 130B. Again, this can facilitate an easy replacement of high wear component such as the threaded openings or connectors of the end plate. As further shown in FIGS. 27 and 28, the end plates 140 can be disposed on opposite sides of the discharge manifold main body 130B, generally opposite one another across the central axis CA of the fluid in the frame. Further optionally, the exterior portions of the plates can be generally flush with the front surface 130FS of the discharge manifold body 130B and/or the outer surface 120OS of the frame 120. In this manner, the end plates do not obstructively protrude from the frame and/or discharge manifold which can lead to those components being more readily damaged.

As illustrated in FIGS. 27-29 and 37, the discharge manifold 130 is a separate component from the frame 120. The discharge manifold can be joined with fasteners 130F' to the frame 120 as shown in FIG. 37. Generally, the fasteners 130F' can extend completely through the frame 120. When tightened down, the fasteners 130F' can fixedly secure the discharge manifold 130 against the front face of the frame 120 in a fixed orientation even under extremely high pressures, as those pressures are generated by fluids pumped by the respective CAMs 150. Generally, the discharge manifold 130 is forward of the frame and does not form a part of the loading opening 121, except for a small recess 130R that receives a forward portion of the CAM 150 as shown in FIG. 33 and described in further detail below. In this manner, the discharge manifold is generally distal from the loading opening but adjacent to the same.

Further optionally, as shown in FIGS. 27-29 and 37, the discharge manifold can be configured so that it aligns with the frame 120 in a single orientation when fastened down using the fasteners 130F'. In this manner, the discharge manifold 130 is not pivotable, rotatable or movable relative to the frame while the discharge manifold is attached in any manner to the frame. Alternatively, the discharge manifold 130 can have a pivot element joined to a lower portion thereof (not shown) so that after the fasteners 130F are removed, the discharge manifold can swing downward. Of course, this construction in some cases might be considered superfluous to the current embodiments of the fluid end system 110 because of the ease of replacement of the respective CAMs and associated valve seat assemblies and seal cartridge assemblies.

With the illustrated configuration of the discharge manifold relative to the frame, when the CAMs, or in general the valve seat assembly and sealed cartridge assembly units, are removed from the fluid end system, the discharge manifold remains in a single orientation, generally, fully affixed, immovably and nonpivotally secured to the front of the frame 120. Again, because the user need not remove the discharge manifold to access the CAMs, the extra laborious step of removing the fasteners 130F' need not be undertaken. Indeed, the fasteners 130F' remain installed in the frame, securing the discharge manifold to the frame in a fixed, single orientation throughout the replacement, servicing and/or removal of the associated CAMs.

As shown in FIG. 33, the fluid end system 110 is configured so that the seal cartridge assembly and its associated reciprocating plunger 171 are mounted distal from and completely outside the confines of the discharge manifold 130. Indeed, the seal cartridge assembly 170 and discharge manifold 130 are separated from one another by at least the valve seat assembly 160 disposed therebetween. The seal cartridge assembly 170 and its components such as the plunger, do not engage or otherwise contact the discharge manifold 130. Further, the seal cartridge assembly 170 can be mounted outside the discharge manifold, generally within the housing and/or frame. In turn, this component as well as the CAM, can be readily disengaged from the fluid end system 110 without manipulating, moving, changing, altering or modifying the attachment or securement of the discharge manifold 130 to the frame 120.

The CAM assembly module 150 of the fluid end system 110 will now be described in further detail reference to FIGS. 33-36. The CAM 150 can be similar in function, structure and components to the CAM 50 described in the current embodiment above with several exceptions. For example, the inlet manifold 80 can be absent from the CAM 150, and the CAM 150 is configured to insert into a mounting housing 180, in a loading opening, rather than directly into the loading opening. Optionally, the single unit cartridge 150 includes a manifold seat 168 which is attached to the plenum 162 or valve seat, which is further joined with the seal cartridge assembly 170. These components can be the only components that make up the CAM 150, along with some fasteners joining the components. For example, all of these components can be joined or fastened semi-permanently or permanently to one another using fasteners or other mechanisms. As a further example, the valve seat assembly 160 and seal cartridge assembly 170 can be fastened together with fasteners 150F. The respective valve seat assembly 160 and plenum 162 or valve seat can define respective apertures or holes through which the fasteners 150F are disposed. As used herein, the holes can be in the form of openings, recesses, apertures, and can be threaded or not depending on the particular application.

Figure 34:
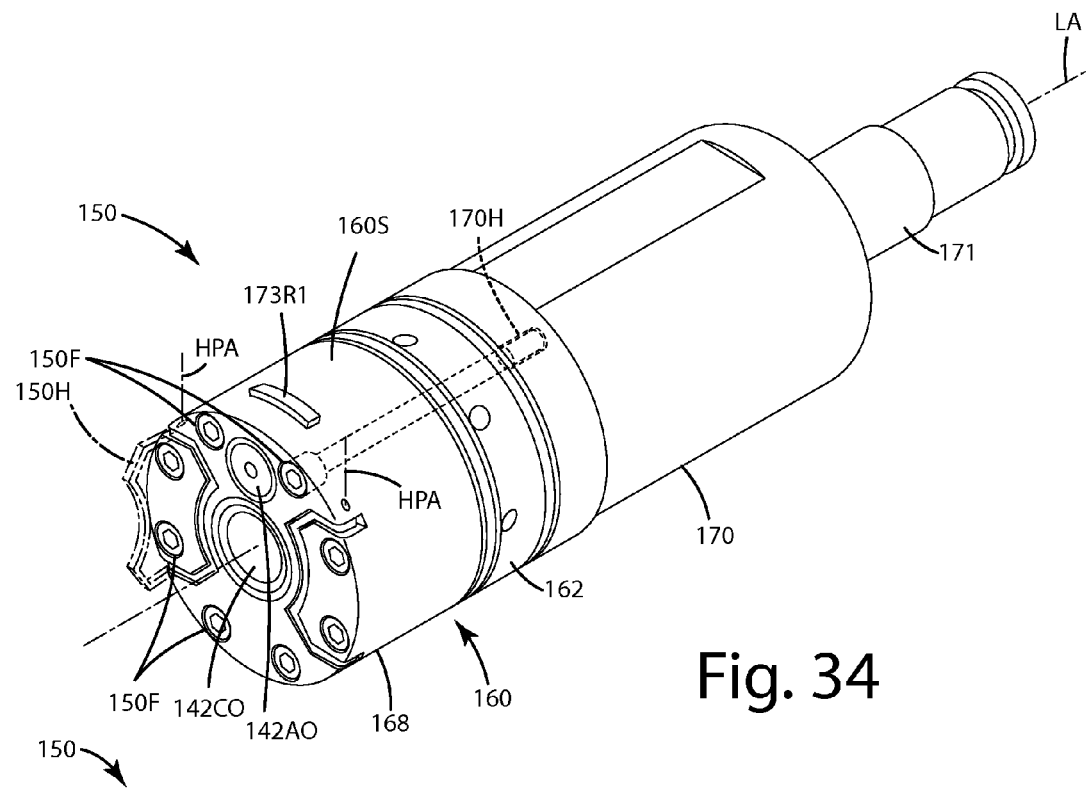
FIG. 34 is a perspective view of a single piece CAM including a discharge valve assembly, a valve seat, and a seal cartridge of the first alternative embodiment.

In the embodiments shown, the fasteners 150F can be threaded at their ends and threaded into corresponding thread holes 170H defined by the seal cartridge assembly 170 as shown in FIG. 34. These fasteners 150F can be referred to as CAM retaining fasteners. Of course, if desired, other parts of these components can be threaded to accept fasteners and join them in different manners. Optionally, the fasteners 150F do not include any threaded portions that overlap different parts. For example, the threaded portion of a fastener can thread only into the thread hole 170H in the seal cartridge assembly 170. The other portion of the fastener shaft, for example, the shaft adjacent the valve seat assembly are not threaded. This can allow for relative movement and/or compression of these different components along the longitudinal axis LA of the CAM when the fasteners 150F are tightened.

Generally, the retaining fasteners 150F can be aligned with and parallel to the longitudinal axis LA of the CAM 150. The fasteners can be disposed on opposite sides of the single piece unit. The retaining fasteners and associated holes also can play a role as an assembly element that can ensure that valve seat assemblies and seal cartridges of matching pressures are safely assembled, and/or that seal cartridge assemblies and valve seat assemblies of different or mismatched pressures are not advertently assembled, which can create a potentially dangerous situation. As an example, the valve seat assembly can include a first assembly element in the form of a first pattern of fastener holes. The first pattern holes can be uniquely associated with a first pressure rating.

With further reference to FIG. 36, the fastener holes of a first CAM 150' associated with a maximum pressure rating of 10,000 psi, can include a first fastener pattern FP1. This first fastener pattern FP1 can include fastener holes 150FH' centered or spaced at a first distance relative to one another. These fastener holes 150FH' optionally can be nonthreaded and can be distanced from one another in the pattern FP1. The seal cartridge 170' can include corresponding threaded holes also disposed at the same distance from one another in the first pattern FP1. In this manner, when the fasteners 150F' are disposed in the fastener holes 150FH' of the valve seat assembly 160', they will only match with corresponding holes in the particular seal cartridge 170'. They will not match holes of a seal cartridge assembly 170" of a second pattern FP2 of another CAM 150" which can, for example, have a different pressure rating, such as up to 20,000 psi. The seal cartridge assembly 170" of that other pressure rated CAM 150" therefore cannot be joined in place of the seal cartridge 170' with the valve seat assembly 160' having the first pattern of holes or elements FP1. In this manner, the valve seat assembly 160' cannot be joined with the seal cartridge 170".

The same is true in that with regard to the components of the CAM 150''' having a pressure rating up to 40,000 psi. In that CAM 150''', the valve seat assembly 160''' includes a third assembly element on a third pattern FP3 that is different from the first pattern FP1 and the second pattern FP2 of the other CAMs 150" and 150'''. Thus, the components of this CAM 150''', that is the valve seat assembly 160''' and the seal cartridge 170''' of this CAM, having the assembly elements or fastener pattern FP3 cannot be inadvertently joined with the components of the other two CAMs 150' and 150" having the respective patterns FP1 and FP2. Again, in this manner, valve seat assemblies and seal cartridge assemblies having different pressure ratings cannot be joined with one another because the assembly elements, for example, the pattern of the fastener holes of the different components do not match.

In general, the valve seat assembly and seal cartridge assembly can include respective assembly elements uniquely associated with specific pressure ratings. In one example, the valve seat assembly can include a first assembly element. The first assembly element can be uniquely associated with the first pressure rating, for example, 10,000 psi. The first assembly element can be different from a second assembly element of another, different, separately constructed seal cartridge assembly. The second assembly element associated with the second seal cartridge assembly can be uniquely associated with a second pressure rating different from the first pressure rating. For example, the second pressure rating can be 40,000 psi. With the different first assembly element and second assembly element, the two parts, that is the valve seat assembly and the seal cartridge cannot be operatively coupled to one another. In this manner, an assembler of the cartridge assembly module is prevented or impaired from mismatching seal cartridge assemblies and valve seat assemblies of different pressure ratings, which can present a very dangerous situation.

As mentioned above, the assembly elements can be different patterns of holes defined by the valve seat assembly, the seal cartridge assembly and/or other components of the CAM. Alternatively, the assembly element can be in the form of projections and corresponding recesses (not shown) on the surfaces of the valve seat assembly 160 and seal cartridge 170 that mate with one another. In one set of assembly elements associated with a first pressure rating, for example, up to 10,000 psi, can be in the form of projections, such as pins extending from the valve seat assembly 160 at a spacing of 1 inch between each pin. A seal cartridge assembly 170 can include recesses that receive the pins with the recesses, similarly spaced at 1 inch and associated with the first pressure rating of up to 10,000 psi. Another set of valve seat assemblies and seal cartridge assemblies can include a second spacing of projections and recesses, each respectively disposed at 1.2 inches from one another. These valve assemblies and seal cartridge assemblies can be associated with a different, second pressure rating, for example, up to 20,000 psi. The components having the first assembly element (recesses and/or projections) having a first spacing associated with the first pressure rating cannot be properly or easily assembled with the components having the second assembly element (projections and/or recesses) having a second spacing associated with the second pressure rating. Again, this can prevent or impair an assembler from mismatching different parts rated for different pressures. Multiple additional seal cartridge assemblies and valve seat assemblies can be outfitted with corresponding additional unique assembly elements so that only like-pressure rated parts can be joined to form a respective CAM.

Figure 35:
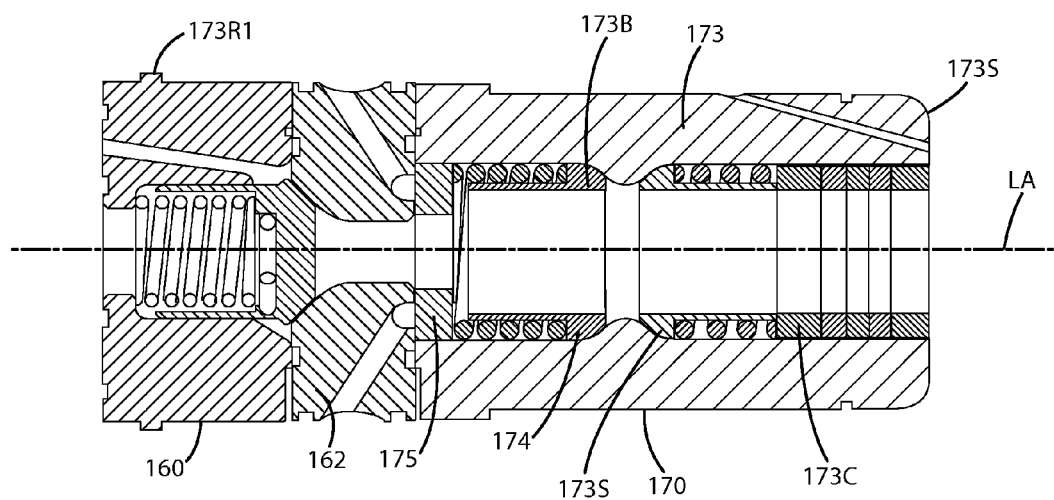
FIG. 35 is a section view of the single piece CAM removed from the assembly of the first alternative embodiment.

As shown in FIGS. 33-35, the seal cartridge assembly 170 that is joined with the valve seat assembly 160 includes a seal cartridge body 173. This seal cartridge assembly, as well as the valve seat assembly, are substantially similar in structure, components and function to the valve seat assembly 60 and seal cartridge assembly 70 as described above. Therefore, these components will only be described in brief detail here. As an example, the seal cartridge body 173 defines a bore 173B within which a plunger 171 is disposed. Optionally, the inner diameter of the bore of the seal cartridge and/or portions of the valve seat assembly can be burnished to provide compression. Within the bore, the body 173 houses packing 172 that is disposed generally between the plunger 171 and the body 173. This packing 172 is generally conventional and provides cooling liquid and/or lubrication of the plunger 171 as it reciprocates at high frequencies. The seal cartridge assembly 70 can also include a throat bushing 173C which can be disposed around the plunger 171 and located between the packing 72 and the spring stops 173S. The spring stop 173S includes a biasing spring optionally in the form of a coil spring, and further optionally a spring mount 174. The spring mount 174 can circumferentiate the plunger 171 and can extend toward the inlet valve 175. The inlet valve 175 as shown can be in the form of a washer or circular shape with a rounded hole defined centrally therein.

As with the embodiments above, the plunger 71 of the seal cartridge assembly 170 can be sized and shaped so that it fits through the retainer element 26 and retainer nut 26N when installed in the frame 120. Generally, the retainer element 126 shown in FIG. 33 defines an internal sleeve 126S which can be in the form of a bore. The plunger 171 of the seal cartridge assembly 170 projects through this sleeve 126S and generally through the retainer element 126 that secures the CAM 150 within the loading chamber in the closed position. As illustrated, the plunger 171 extends through the rearward portion of the frame and the associated retainer element 126, generally distal from the discharge manifold 130. Retainer element 126 as illustrated generally is void of any springs or internal components that actuate or move elements of the seal cartridge such as the washer or otherwise. The retainer element is constructed so that it engages a portion of the seal cartridge assembly body 173 and pushes the seal cartridge and entire CAM 150 toward and/or against discharge manifold. As mentioned, in particular, the body 173 can include a rearward shoulder 173S that mates with and generally engages the shoulder or recess 126R of the retainer element 126.

Referring now to FIGS. 39-45, the fluid end system 110 can include a quick connect system 200 to join the plunger 171 to a drive assembly piston 280. The quick connect system generally includes a quick connect retention ring 202 and a quick connect retention element, optionally in the form of a retention nut 204. The retention ring 202 is seated within an annular recess 206 in the plunger 171, and the retention nut 204 extends over the plunger 171 and over the retention ring 202. As explained below, the retention ring 202 prevents the removal of the retention nut 204 during operation, and is slightly undersized with respect to the retention ring 202 to permit alignment of the plunger 171 within the seal cartridge 170 prior to attachment to the drive assembly piston 280.

More particularly, the plunger 171 of the fluid end system 110 includes an exposed portion 208, that is, a portion extending from the seal cartridge 170. The exposed portion 208 includes a cylindrical sidewall 210. The cylindrical sidewall 210 defines the annular recess 206 therein. The annular recess 206 is offset from the end 212 of the plunger 171, and extends entirely around the plunger 171 in the present embodiment. In other embodiments, however, the annular recess 206 can extend partially around the plunger 171.

As further illustrated in FIGS. 39-40, the retention ring 202 is received within the annular recess 206. The retention ring 202 can include one or more ring segments. In the illustrated embodiment, the retention ring 202 includes first and second ring segments 214, 216, while in other embodiments the retention ring 202 includes a fewer or greater number of ring segments. The ring segments 214, 216 cooperate to at least partially encircle the plunger 171. As optionally shown in FIGS. 39-40, the ring segments 214, 216 substantially circumferentiate the plunger 171. Where two ring segments are used, each ring segment can span an arc of a circle equal to about 180 degrees. In other embodiments the ring segments can span dissimilar portions of the plunger circumference.

Figure 44:
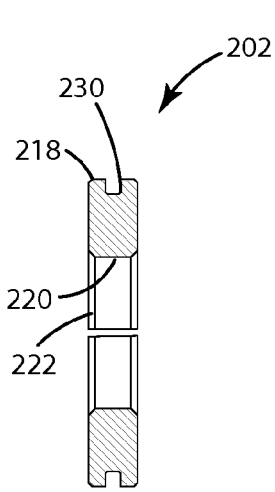
FIG. 44 is a section view of the quick connect retention ring.
Figure 45:
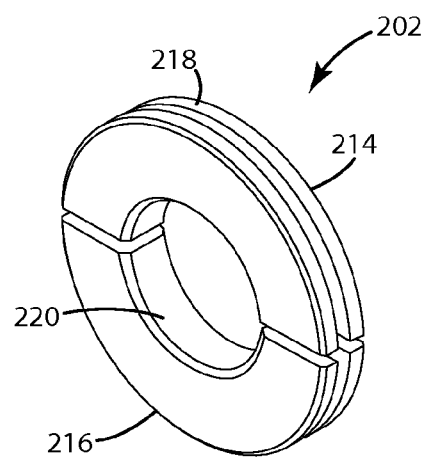
FIG. 45 is a perspective view of the quick connect retention ring.

As further illustrated in FIGS. 44-45, the ring segments 214, 216 include an outer annular surface 218, an inner annular surface 220, an upper radial surface 222, a lower radial surface 224, and lateral end portions 226. The outer annular surface 218 defines an outer diameter that is slightly less than an inner diameter of the retention nut 204. The inner annular surface 220 defines an inner diameter approximately equal to the innermost diameter of the annular recess 206 in the plunger 171. The outer annular surface 218 can include an annular groove 230 to receive a seal member therein, for example an elastomeric o-ring 232. The lateral end portions 226 of the first ring segment 214 face the lateral end portions 226 of the second ring segment 216, optionally being spaced apart from each other when seated within the plunger annular recess 206. The retention ring 202 can be formed of any suitable material, including for example stainless steel or a titanium alloy.

The quick connect retention nut 204 is generally adapted to extend over the plunger 171 and the retention ring 202. As perhaps best shown in FIGS. 42-43, the retention nut 204 includes a longitudinal opening 234 extending entirely therethrough, that is, between a proximal end 236 and a distal end 238. The longitudinal opening 234 includes a small diameter portion 240, a large diameter portion 242, and a threaded portion 244. The small diameter portion 240 is adjacent the proximal end 236, that is, the end nearest to the seal cartridge 170. The small diameter portion 240 includes an inner diameter that is approximately equal to the outer diameter of the plunger 171. The small diameter portion 240 is joined to the large diameter portion 242 by an annular shelf or shoulder 246. The large diameter portion 242 includes an inner diameter that is larger than the inner diameter of the small diameter portion 240. For example, the inner diameter of the large diameter portion 242 is optionally about 10% to about 20% greater than the inner diameter of the small diameter portion 240, and further optionally about 14% greater than the inner diameter of the small diameter portion 240. The threaded portion 244 terminates at the distal end 238, that is, the end farthest from the seal cartridge 170. The small and large diameter portions 240, 242 each include a continuous diameter throughout. The large diameter portion 242 terminates at the threaded portion 244. The threaded portion 244 includes female threads to receive a threaded piston 280 of the drive assembly.

As noted above, the large diameter portion 242 includes an inner diameter that is slightly greater than the outer diameter of the retention ring 202. Stated somewhat differently, the retention ring 202 includes an outer diameter that is slightly less than the inner diameter of the large diameter portion 242 of the longitudinal opening 234. For example, the ratio of the outer diameter of the retention ring 204 (not including the o-ring 232) to the inner diameter of the large diameter portion 242 can be between 0.99 and 0.95 in some embodiments, optionally between 0.99 and 0.98 in other embodiments, and further optionally about 0.98 in still other embodiments. This clearance permits alignment of the plunger 171 within the seal cartridge 170 prior to coupling the drive assembly to the fluid end system 110. The radial gap between the retention ring 202 and the retention nut 204 can also be described in dimensional terms. For example, the radial gap (not including the o-ring 232) can be defined as a percentage of the outer diameter of the retention ring 202. More particularly, the radial gap can be between 1% and 4%, further optionally about 2%, as a percentage of the outer diameter of the retention ring 202.

The exterior of the quick connect retention nut 204 includes a curved sidewall portion 248 and a hexagonal sidewall portion 250. The curved sidewall portion 248 transitions from the proximal end 236 in a concave manner when viewed in cross-section. The curved sidewall portion 248 allows the retention nut 204 to reciprocate within the retention element 126 of FIG. 33. The hexagonal sidewall portion 250 includes sidewalls that define a hexagonal outer cross-section. The hexagonal sidewall portion 250 is shaped to be engaged by a wrench to facilitate tightening and loosening the drive assembly piston 280 from the quick connect system 200. The retention nut 204 is generally formed of stainless steel, but can include other materials in other embodiments where desired, including for example titanium alloy. The retention nut 204 is a monolithic element in the present embodiment, but can be formed from two or more components in other embodiments.

The quick connect system 200 purposely allows the plunger 171 to float until the retention nut 202 is tightened. This allows the plunger 171 to center itself yet retain its exact position once the retention nut 202 is tightened to the piston 280. This has the potential to significantly improve the life of several wear items.

A method for coupling the drive assembly to the quick connect system will now be described. The method generally includes aligning the plunger 171 within the plunger bore 172 while the plunger 171 remains free from attachment to the drive assembly. This step can include inserting packing 173B in the region between the plunger 171 and the seal cartridge 170. The method then includes sliding the retention nut 204 over the exposed portion of the plunger 171 and past the annular recess 206, such that the annular recess 206 is not covered by the retention nut 204. The retention ring 202 is then inserted into the annular recess 206 of the plunger 171. This step generally includes inserting the first and second ring segments 214, 216 within the annular recess 206 and inserting the o-ring 232 within the annular groove 230 of the first and second ring segments 214, 216 to retain the ring segments 214, 216 in place. The method then includes sliding the retention nut 204 in the distal direction (toward the plunger end 212) until the retention nut shoulder 246 engages the retention ring 202, which limits the axial travel of the retention nut 204. The drive assembly piston 280 is then screwed into the threaded opening 244 of the retention nut 204 until the piston 280 engages the plunger end 212, optionally with the aid of a wrench or other hand tools.

Removal of the drive assembly using the quick connect is performed according to the above steps, but in the opposite order. For example, the drive assembly piston 280 is initially unscrewed from the threaded opening 244 of the retention nut 204, optionally with the aid of a wrench or other hand tools. Once the drive assembly piston 280 is removed, the retention nut 204 is retracted along the plunger 171 in the proximal direction (away from the plunger end 212) until the retention ring 202 is not covered by the retention nut 204. The o-ring 232 and the ring segments 214, 216 are then separated from the plunger 171. The retention nut 204 is then removed from the plunger 171 by sliding the retention nut 204 toward the plunger end 212. The plunger 171 and packing 172 can then be serviced and/or replaced before reapplication of the quick connect system described above.

As shown in FIGS. 27, 33 and 36, the CAM 150 can include a registration element 173R1. This registration element or feature 173R1 can precisely mate with a second registration element or feature 173R2 defined by the mounting housing 180. The interaction of these registration features can ensure that the CAM will always will be aligned perfectly within the loading chamber 182 of a mounting housing 180 so that the discharge valve outlets or ports of the CAM align properly with corresponding discharge passageways in the discharge manifold 130, and/or inlet passageway 184. The registration of feature 173R1 being with the feature 173R2 also can prevent rotation of the CAM 150 within the loading chamber 182 during operation of the plunger 171 at high frequencies.

As illustrated in FIGS. 27 and 34, the first registration feature 173R1 can be in the form of a raised projection or male key that extends from an exterior surface 160S of the valve seat assembly 160. The registration feature 173R2 of the mounting housing 180 can be in the form of a recess as shown in FIGS. 27 and 33. The recess can be the same dimensions as the key or projection 173R1 so that these components precisely match and interfit in one another with minimal tolerance between them. Of course, as desired, the projection and recesses can be reversed with the CAM defining the recess and the mounting housing including the projection or male key. Alternatively, the registration features can be disposed not on the valve seat assembly 160 but instead on the seal cartridge assembly 170 and/or the valve seat between these components.

The registration features can ensure that the CAM 150 will always have a top dead center aspect that aligns itself directly with the top dead center of the discharge manifold 130. Further, the registration feature provides anti-rotation to prevent the cartridge from rotating under loads created by the large retaining element 126 as it is tightened.

As shown in FIGS. 33-35, the cartridge assembly module 150 and the mounting housing 180 can include multiple seals configured to seal off different passageways of the CAM and its relative components. These seals can be in the form of O rings, elastomeric elements or other structures similar or identical to the current embodiment described above. Given the similarity, these components will not be described again in detail here.

The CAM 150 also can include one or more handles 150H as shown in FIG. 34. These handles can be disposed in and end of the valve seat assembly 160 adjacent the outlets 142CO and 140AO. The handles 150H can pivot about a pivot access HPA. When in their stored position, the handles 150H can fit within a recess in the shape of a handle defined by the valve seat assembly 160, generally flush with the front of the CAM. A user can grasp the exposed portion of the handle and rotate it as shown in FIG. 34 outward so that the handle rotates about the pivot axis HPA to an extended position. As shown in FIGS. 27 and 31, with the handles 150H extended, a user can grasp them and pull the respective CAM 150 out from the loading chamber 182. These handles, of course, can be absent from the CAM or otherwise replaced with other grasping mechanisms depending on the application. In some cases, the handles need not be present, and a user can simply grasp the plunger 171 and push the CAM out from the loading chamber 182 after retainer element 126 is removed from the frame 120 and the plunger 171.

Operation and replacement or removal of the CAM 150 for servicing will now be described in further detail relative to the fluid end system 110. Starting with FIG. 30, upon determining that a CAM is worn out, not operating properly or needs to be changed from a first CAM operable at a first operating pressure to a second CAM operable at a second operating pressure suitable for corresponding blasting equipment, a user can begin manipulating the fluid end system 110. In particular, the user can remove the retainer element 126 from the rearward portion of the frame 120. This can be accomplished by attaching a box end wrench to the nut 126N of the retaining element 126 and threading it out of the threaded opening 123O. After the threads of the retainer element disengage that of the opening, the retainer element 126 can be removed from the plunger 171 and any crosshead coupler associated with the end of the plunger.

Generally, in operation, the first alternative embodiment of fluid end system, like the current embodiment described above, is configured to provide quick removal of respective pressure CAMs as a single unit from the system and to provide replacement of a new CAM with minimal work. With these constructions, the discharge manifold 130 remains attached in a single configuration and orientation relative to the fluid end frame, and need not be removed from the fluid end frame for replacement of the CAM, or in general, the valve seat assembly and seal cartridge assembly.

As shown in FIG. 30, the user rotates the latch handle 181LH in the direction L. This disengages the pin end 181PE from the opening 130O defined by the discharge manifold so that the mounting housing 180 is free to pivot upwardly or tilt or otherwise move upwardly relative to the opening 121 of the frame 120. With the latch 181L so manipulated, the user exerts an upward force UF (FIG. 33) to move the housing 180 about the pivot axis PA within the loading opening 121. The housing pivots about the pivot axis PA to the open position shown in FIG. 27. Due to the configuration of the mounting housing 180, and its orientation relative to the force, as well the removal of a retainer element 126, the plunger 171 and seal cartridge assembly 170 effectively clear the opening 123O so that the CAM can be removed. When the mounting housing 180 has been moved from the closed position to the open position, optionally, the open lock element 186 engages the upper surface or edge 121E of the frame to hold the mounting housing 180 in that open position so that a user can free their hands to remove the CAM 150.

The user then extends the handles 150H from the end of the CAM 150 and grasps the handle. The user then pulls the CAM 150 in the direction R as shown in FIG. 31. The user can proceed to remove the CAM 150 from the loading opening 182. The user can then service, repair or otherwise modify and/or replace the CAM 150 with another CAM or the same CAM having repaired or replaced parts.

In some cases, the CAM 150 is changed out to operate with blasting equipment of a different pressure. In such a case, the CAM can be selected depending on the rating of the blasting equipment. In one example, a fluid end system 110 originally can be operating at pressures up to 10,000 psi with blasting equipment safely operable at maximum pressures up to 10,000 psi. The operator may determine that the pressure is not enough for a particular blasting job and the system should instead be operating at pressures up to 40,000 psi. The user then will replace the blasting equipment associated with the end plate 140 to 10,000 psi blasting equipment. The user also can replace the previous CAMs in the frame 120, rated for 10,000 psi, with a different set of CAMs, rated for 40,000 psi. To do so, the user will follow the operation and replacement methods herein.

Returning to FIG. 31, after a CAM is removed, it can be replaced with a new, replacement CAM or the same CAM reassembled with new but similarly matched components. The new CAM can be inserted in the direction R shown to install the new CAM 150 into the loading chamber 182. Due to the configuration of the mounting housing 180 and the orientation of the loading chamber 182 relative to the opening 123O, the plunger 171 and body of the seal cartridge assembly 170 fit into and through the opening 123O at an angle so the longitudinal axis LA is offset from the central axis CA. Upon insertion of the CAM 150 into the loading opening 182, the registration features 173R1 and 173R2 cooperate to precisely align the respective discharge valve outlets of the CAM with the discharge manifold 130. The user folds down the handles 150H of the CAM so that they are within their recesses, and do not interfere with closure of the mounting housing. The user then depresses the open lock 186 so that the mounting housing 180 can rotate or tilt downward about the pivot axis PA. Grasping the handle 181, the user then guides such rotation of the mounting housing. This aligns the CAM with the corresponding discharge passageways of the discharge manifold 130. The longitudinal axis LA and central axis CA can align in parallel. Upon this downward movement, the user then manipulates the latch 181 by rotating the handle 181LH to engage the pin with the opening 130O in the discharge manifold 130. This secures the mounting housing 180 in a closed position shown in FIG. 33.

In this initially closed position, the forward portion of the discharge valve assembly 160 may not be fully disposed within the recess 130R of the discharge manifold 130 as shown in FIG. 33. To insert the end of the CAM or valve seat assembly 160 within the recess 130R, a user tightens the retainer element 126 so that it threads into the opening 123O. This, in turn, causes the recess 126R of the retaining element 126 to engage the shoulder 173S of the body of the seal cartridge and generally center the CAM in the loading opening, all while pushing the CAM 150 within the loading chamber 182 so that the valve seat assembly 160 seats within the recess 130R of the discharge manifold 130.

With the interaction of the end of the valve seat assembly 160 and the discharge manifold and with the alignment of the shoulder 173S and the recess 126R of the retaining element 126, the cartridge is aligned in multiple locations. Generally, the CAM is aligned in the loading chamber and further captured by the respective recesses of the retaining element and the discharge manifold. More particularly, with this construction, the CAM is retained and aligned basically in at least three places over its length. The front of the CAM is disposed and captured and guided within the manifold recess 130R; the middle portion of the CAM is constrained within the loading chamber 182, and the end adjacent the shoulder 173S of the seal cartridge is constrained within the recess 126R of the retaining element 126 as shown in FIG. 33. This provides precise positioning of the CAM within the frame and relative to the discharge manifold. The CAM properly seats against the discharge manifold and is housed well and tightly within the mounting housing 180. With all of these components disposed and locked within the discharge manifold, mounting housing and retainer element, even upon a catastrophic failure of the CAM, these components of the CAM can be prevented from being blasted away from the fluid end system which could, of course, cause property damage or injury.

The current embodiment of the fluid end system 110 optionally can be equipped with a lubrication system 300 that uses the pumping fluid to lubricate the packing 172. Generally, this lubrication system 300 is free from exposed tubes or plumbing that might require removal before service or conversion. Instead, the lubrication system 300 includes a lubrication flow path 302 that extends through the body of the mounting housing 180 and through the body of the seal cartridge 170. The lubrication system 300 can further include an adjustable valve 304 in the lubrication flow path 302 to control the flow of the pumping fluid to the packing 172, the valve 304 being optionally adjustable from atop the mounting housing 180.

Referring now to FIG. 33, the lubrication system 300 includes a lubrication flow path 302 to direct the pumping fluid from the valve seat assembly 160 to the packing 172. The lubrication flow path 302 is generally confined to an interior portion of the fluid end system 110. As shown in FIG. 33 for example, the lubrication flow path 302 includes a first channel 306 extending through the housing 180 and a second channel 308 extending through the seal cartridge 170. The first channel 306 is in fluid communication with the valve seat assembly 160. The valve seat assembly 160 provides a desired flow rate of pumping fluid (e.g., pressurized water) to the first channel 306 through the plenum 162 surrounding the valve seat assembly 160. The first channel 306 terminates where the second channel 308 begins. The second channel 308 extends from the outer annular surface of the seal cartridge 170 to the shoulder 173S. The second channel 308 terminates at an annular pocket 310 adjacent to the packing 172. The annular pocket 310 forms part of, or is in fluid communication with, the annular region between the plunger bore 173B and the plunger 171. The annular pocket 310 is also bounded by the retainer element 126, which engages the seal cartridge shoulder 173S and the housing 180.

Movement of the reciprocating plunger 171 away from the valve seat assembly 160 draws the pumping fluid into the valve seat assembly 160. Movement of the reciprocating plunger 171 toward the valve seat assembly 160 operates to urge the pumping fluid into the lubrication flow path 302. Depending on the position of the valve seat assembly 160, the lubrication flow path 302 receives a flow rate of pumping fluid proportional to the selected output pressure of the valve seat assembly 160 and consequently the discharge manifold 130. The valve 304 provides a controlled flow-rate of pumping fluid through the lubrication flow path 302 irrespective of the selected output pressure of the valve seat assembly 160. The valve 304 is illustrated as being in fluid communication with the first channel 306, but is optionally in fluid communication with the second channel 308. The valve 304 can be any valve adapted to provide multiple flow rates (i.e., not simply open and closed), including for example a ball valve, a butterfly valve, a globe valve, or a gate valve. The valve 304 is manually operable in the illustrated embodiment, but can be automatically actuated in other embodiments, optionally as a solenoid valve that is responsive to a control voltage from a power source.

As noted above, the lubrication flow path 302 is generally contained within the interior of the fluid end system 110. The first channel 306 extends through the body of the housing 180, and the second channel 308 extends through the body of the seal cartridge 170. Other channels can extend through other portions of the fluid end system 110 as desired. First and second o-rings 312, 314 are positioned between the housing 180 and the seal cartridge 170 on either side of the junction between the first and second channels 306, 308. The second channel 308 terminates at the packing 173 in the annular region between the plunger 171 and the plunger bore 173B. The lack of exposed tubes or plumbing can reduce the incidence of leakage or damage to the lubrication system 300, thereby reducing the incidence of damage to the packing 173 or the plunger 171. The valve 304 can additionally generate a flow range with a maximum flow and a minimum flow to help assure proper lubrication values are maintained. The location of the valve 304 atop the housing 180 also improves monitoring of the lubrication, as it can be viewed and adjusted simultaneously from the same operator position.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A high pressure fluid end system comprising:
   a housing;
   a valve seat assembly joined to the housing and having a discharge valve;
   a seal cartridge assembly joined to the housing and including a plunger adapted for reciprocal movement therein and including a packing assembly adjacent the plunger;
   a lubrication flow path to direct a pumping fluid from the valve seat assembly to the packing assembly, the lubrication flow path extending through an interior portion of at least one of the housing and the seal cartridge assembly; and
   an adjustable valve in the lubrication flow path, the adjustable valve being adapted to control the flow of a pumping fluid from the valve seat assembly to the packing assembly.

2. The lubrication system of claim 1 wherein the adjustable valve is manually operable to vary a flow rate of the pumping fluid moving through the lubrication flow path based at least in part on a pressure of the pumping fluid exiting the valve seat assembly.

3. The lubrication system of claim 1 wherein the lubrication flow path includes a first channel extending through the housing and a second channel extending through the seal cartridge.

4. The lubrication system of claim 3 wherein the first channel includes an outlet in alignment with an inlet of the second channel.

5. A lubrication system for a high pressure jetting system, the lubrication system comprising:
   a valve seat assembly including a discharge valve and a plenum that at least partially circumferentiates the valve seat assembly;
   a housing joined to the valve seat assembly, the housing defining a first lubrication channel in fluid communication with the valve seat assembly plenum;
   a seal cartridge assembly including a reciprocating plunger within a plunger bore and including a seal cartridge packing about the reciprocating plunger, the seal cartridge assembly including a second lubrication channel in fluid communication with the seal cartridge packing; and
   an adjustable valve to control a flow rate of a pumping fluid moving through at least one of the first lubrication channel and the second lubrication channel, to thereby selectively lubricate the seal cartridge packing with the pumping fluid.

6. The lubrication system of claim 5 wherein the adjustable valve is manually operable to vary the flow rate of the pumping fluid moving through the first and second lubrication channels.

7. The lubrication system of claim 5 wherein the second lubrication channel originates at an outer annular surface of the seal cartridge assembly and terminates at an annular pocket adjacent the seal cartridge packing.

8. The lubrication system of claim 5 wherein the housing includes a cylindrical sidewall encompassing the valve seat assembly and the seal cartridge assembly, the first lubrication channel extending between first and second openings in the cylindrical sidewall.

9. The lubrication system of claim 8 wherein the first opening is adjacent the valve seat assembly and wherein the second opening is adjacent the seal cartridge assembly.

10. The lubrication system of claim 9 further including first and second o-rings between the housing and the seal cartridge assembly on either side of the second opening.

11. The lubrication system of claim 10 wherein the seal cartridge assembly includes an annular exterior sidewall terminating in a shoulder, the second lubrication channel extending between a third opening in the annular exterior sidewall and a fourth opening in the shoulder.

12. The lubrication system of claim 11 wherein the second opening of the housing opens to the third opening of the seal cartridge assembly for the movement of the pumping fluid therethrough.

13. The lubrication system of claim 5 wherein the adjustable valve extends within the housing.

14. The lubrication system of claim 5 wherein the pumping fluid includes water.

15. A high pressure fluid jetting system including a lubrication system using a pumping fluid, the fluid jetting system including:
   a housing having a body;
   a seal cartridge joined to the housing and defining an axial bore therein the seal cartridge having a body;
   a reciprocating plunger extending through the axial bore of the seal cartridge;
   an annular cavity between at least a portion of the reciprocating plunger and at least a portion of the seal cartridge, the annular cavity including a packing;
   a lubrication flow path directing the pumping fluid to the annular cavity, the lubrication flow path extending through the body of the housing and the body of the seal cartridge to guide the flow of the pumping fluid internally to the annular cavity; and
   an adjustable valve in the lubrication flow path, the adjustable valve being adapted to control the flow of the pumping fluid to the packing, wherein the pumping fluid is urged through the lubrication flow path to lubricate the packing within the annular cavity.

16. The lubrication system of claim 15 wherein the adjustable valve is manually operable to vary the flow rate of the pumping fluid moving through the lubrication flow path based at least in part on a pressure of the pumping fluid exiting a valve seat assembly.

17. The lubrication system of claim 15 wherein the lubrication flow path includes a first channel extending through the housing and a second channel extending through the seal cartridge.

18. The lubrication system of claim 17 wherein the first channel includes an outlet in alignment with an inlet of the second channel.

19. The lubrication system of claim 15 wherein the adjustable valve is located at least partially within the housing.

20. The lubrication system of claim 15 wherein the pumping fluid includes water.

* * * * *